United States Patent
Bobrowicz et al.

(10) Patent No.: US 12,460,004 B2
(45) Date of Patent: *Nov. 4, 2025

(54) ANTIBODIES THAT BIND CD277 AND USES THEREOF

(71) Applicant: Compass Therapeutics LLC, Brighton, MA (US)

(72) Inventors: Piotr Bobrowicz, Hanover, NH (US); Paul Widboom, Lebanon, NH (US); Michael March Schmidt, Wellesley, MA (US)

(73) Assignee: Compass Therapeutics LLC, Brighton, MA (US)

( * ) Notice: Subject to any disclaimer, the term of this patent is extended or adjusted under 35 U.S.C. 154(b) by 1234 days.

This patent is subject to a terminal disclaimer.

(21) Appl. No.: 17/267,066

(22) PCT Filed: Aug. 9, 2019

(86) PCT No.: PCT/US2019/046061
§ 371 (c)(1),
(2) Date: Feb. 9, 2021

(87) PCT Pub. No.: WO2020/033926
PCT Pub. Date: Feb. 13, 2020

(65) Prior Publication Data
US 2021/0309746 A1 Oct. 7, 2021

Related U.S. Application Data

(60) Provisional application No. 62/716,551, filed on Aug. 9, 2018.

(51) Int. Cl.
*C07K 16/28* (2006.01)
*A61K 39/395* (2006.01)
A61K 39/00 (2006.01)
C07K 14/705 (2006.01)

(52) U.S. Cl.
CPC ...... *C07K 16/2827* (2013.01); *A61K 39/3955* (2013.01); *C07K 16/2896* (2013.01); *A61K 2039/505* (2013.01); *C07K 2317/56* (2013.01); *C07K 2317/565* (2013.01); *C07K 2317/76* (2013.01); *C07K 2317/92* (2013.01)

(58) Field of Classification Search
CPC ............ C07K 16/2827; C07K 2317/76; C07K 2317/92; C07K 2317/21; C07K 2317/33; C07K 2317/55; C07K 16/2896; C07K 14/70532; C07K 14/70596; C07K 2317/56; C07K 2317/565; A61K 2039/505; A61K 39/3955; A61P 35/00
See application file for complete search history.

(56) References Cited

U.S. PATENT DOCUMENTS

2015/0353643 A1* 12/2015 Olive ............. A61K 39/001129
424/172.1

FOREIGN PATENT DOCUMENTS

WO 2012080351 A1 6/2012

OTHER PUBLICATIONS

U.S. Appl. No. 17/267,398, filed Feb. 9, 2021.*
Compte et al. Characterization of BT3 molecules belonging to the B7 family expressed on immune cells. Eur J Immunol 34: 2089-2099, 2004.*
International Search Report and Written Opinion for corresponding PCT Application No. PCT/US2019/046061 entitled "Antibodies That Bind CD277 and Uses Thereof" dated Feb. 5, 2020.
Wang et al., Butyrophilin 3AI plays an essential role in prenyl pyrophosphate stimulation of human Vgamma2Vdelta2 T cells. J. Immunol. 191:1029-1042, 2013.
Harly et al., "Key implication of CD277/butyrophilin-3, BTN3A in cellular stress sensing by a major human gamma delta T-cell subset," Blood. 120:2269-2279, 2012.
Palakodeti et al., "The molecular basis for modulation of human Vgamma9Vdelta2 T cell responses by CD277/ butyrophilin-3, BTN3A-specific antibodies," J. Biol. Chem. 287:32780-32790, 2012.

* cited by examiner

*Primary Examiner* — Bridget E Bunner
(74) *Attorney, Agent, or Firm* — Brownstein Hyatt Farber Schreck, LLP

(57) ABSTRACT

The present disclosure relates to, inter alia, compounds (e.g., antibodies, or antigen-binding fragments thereof) that bind to CD277, for treating, or ameliorating one or more symptoms of cancer.

12 Claims, 13 Drawing Sheets
Specification includes a Sequence Listing.

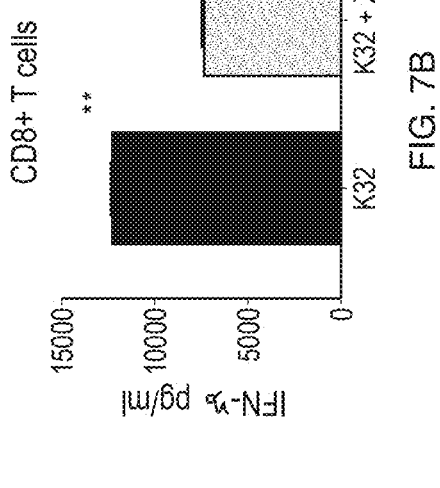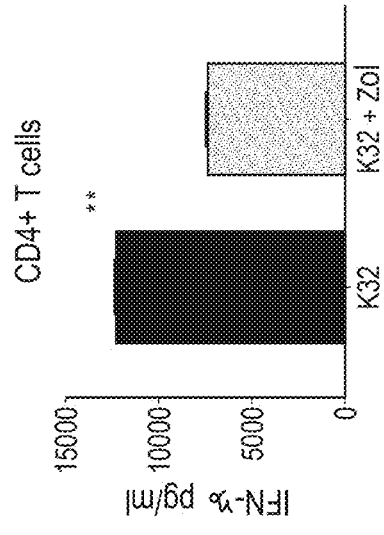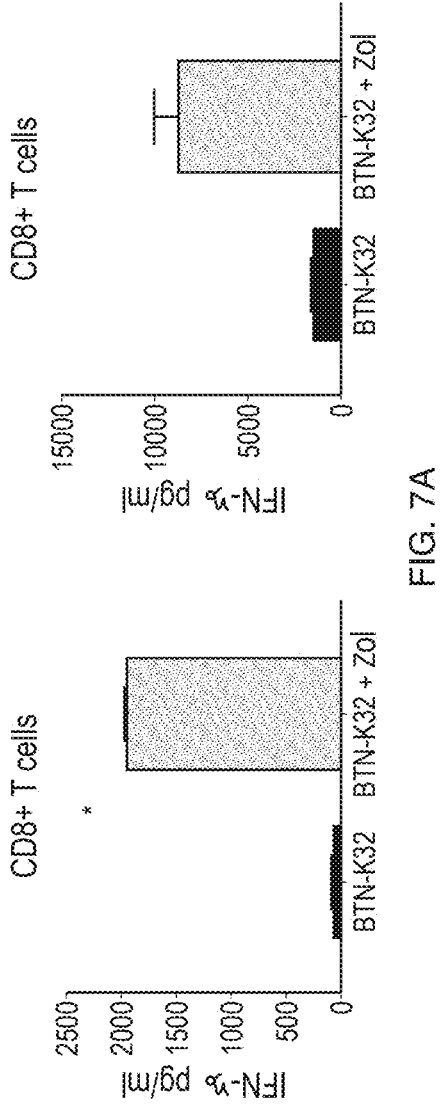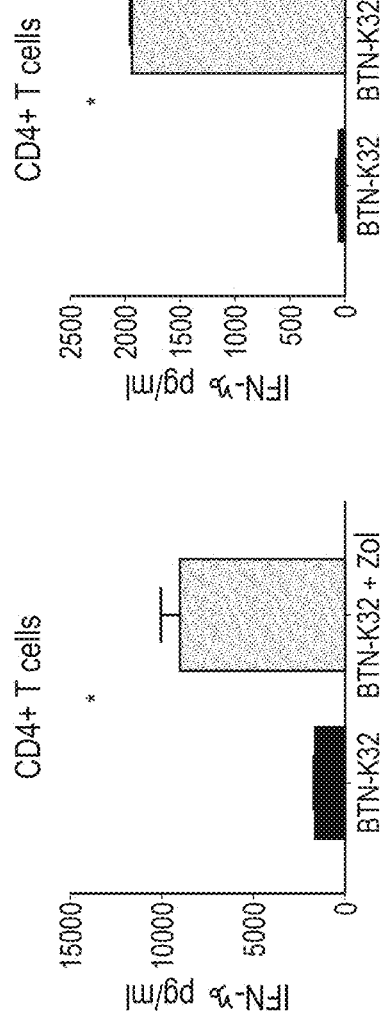
FIG. 7A  FIG. 7B
FIG. 7C  FIG. 7D

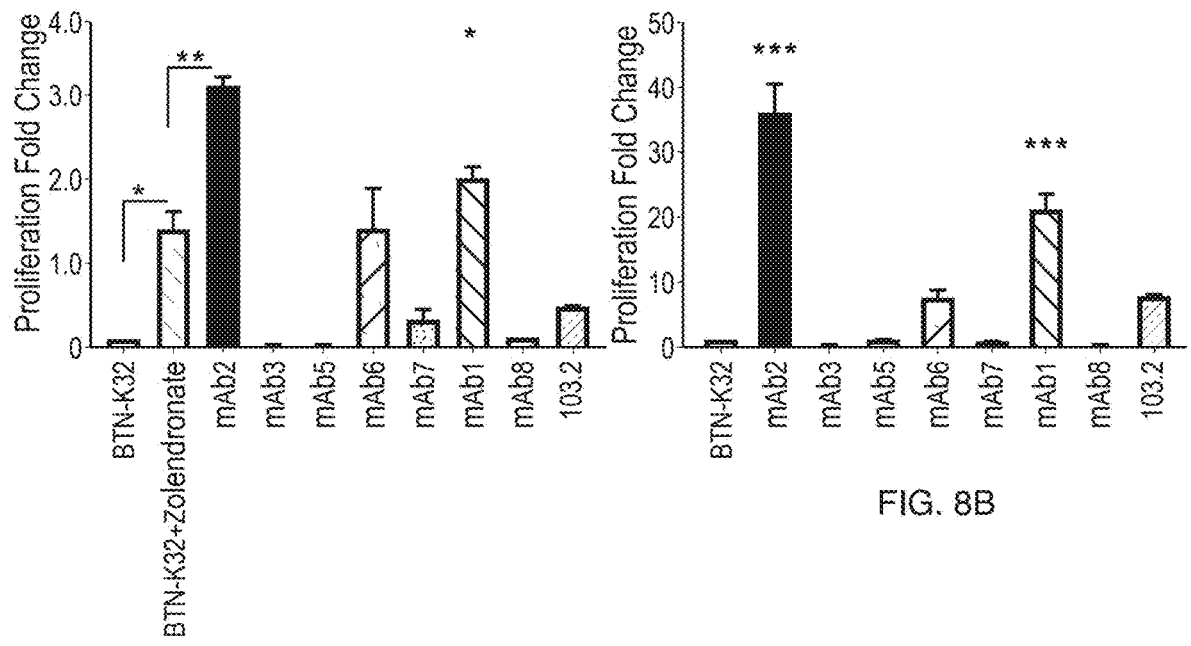
FIG. 8A
FIG. 8B
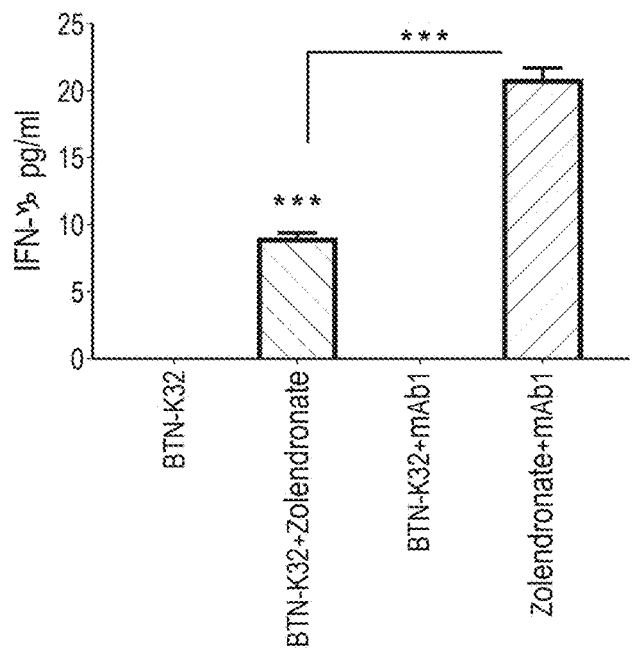
FIG. 8C

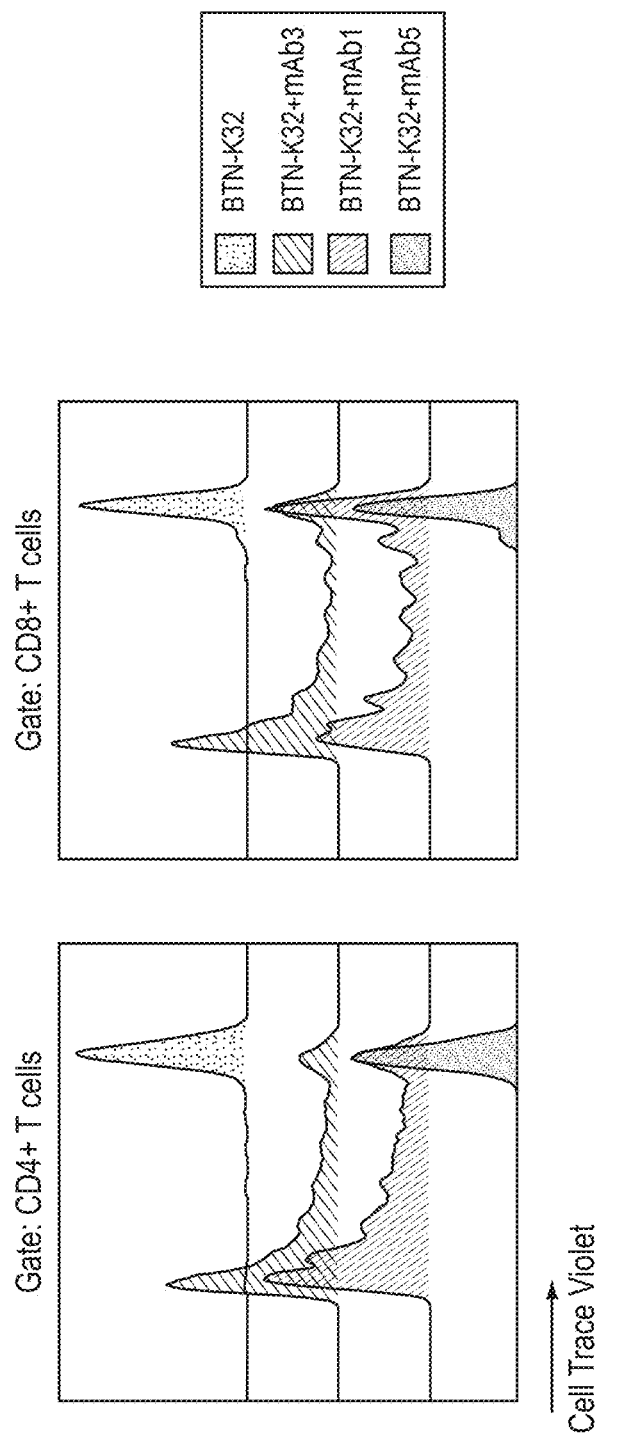

| Residue | 93 | 94 | 95 | 96 | 97 | 98 | 99 | 100 | 100a | 100b | 100c | 100d | 100e | 100f | 101 | 102 |
|---|---|---|---|---|---|---|---|---|---|---|---|---|---|---|---|---|
| WT AA | A | R | R | H | S | D | M | I | G | Y | Y | Y | G | M | D | V |
| Wasatch Kinetics | ND | ND | No | Weak | Weak | Bind | Weak | No | Weak | Weak | Weak | No | Bind | Bind | Weak | ND |
| Cell Binding | ND | ND | No | No | No | Bind | Bind | No | Weak | No | No | No | Weak | Bind | No | ND |
| Consensus | A | R | R | H | S | X | *M* | I | G | Y | Y | Y | X | X | D | V |

| Binding Analysis Key | |
|---|---|
| No | No measurable binding or >100-fold weaker affinity |
| Weak | Weak binding signal, and/or >10-fold weaker binding affinity |
| Bind | Approximately the same binding affinity as WT |
| ND | Affinity not determined |

SEQUENCE LISTING

<160> NUMBER OF SEQ ID NOS: 102

<210> SEQ ID NO 1
<211> LENGTH: 330
<212> TYPE: PRT
<213> ORGANISM: Homo sapiens
<220> FEATURE:
<221> NAME/KEY: misc_feature
<223> OTHER INFORMATION: Human IgG1

<400> SEQUENCE: 1

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

-continued

```
Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 2
<211> LENGTH: 513
<212> TYPE: PRT
<213> ORGANISM: Homo sapiens
<220> FEATURE:
<221> NAME/KEY: misc_feature
<223> OTHER INFORMATION: CD277

<400> SEQUENCE: 2

Met Lys Met Ala Ser Phe Leu Ala Phe Leu Leu Leu Asn Phe Arg Val
1               5                   10                  15

Cys Leu Leu Leu Leu Gln Leu Leu Met Pro His Ser Ala Gln Phe Ser
            20                  25                  30

Val Leu Gly Pro Ser Gly Pro Ile Leu Ala Met Val Gly Glu Asp Ala
        35                  40                  45

Asp Leu Pro Cys His Leu Phe Pro Thr Met Ser Ala Glu Thr Met Glu
    50                  55                  60

Leu Lys Trp Val Ser Ser Ser Leu Arg Gln Val Val Asn Val Tyr Ala
65                  70                  75                  80

Asp Gly Lys Glu Val Glu Asp Arg Gln Ser Ala Pro Tyr Arg Gly Arg
                85                  90                  95

Thr Ser Ile Leu Arg Asp Gly Ile Thr Ala Gly Lys Ala Ala Leu Arg
            100                 105                 110

Ile His Asn Val Thr Ala Ser Asp Ser Gly Lys Tyr Leu Cys Tyr Phe
        115                 120                 125

Gln Asp Gly Asp Phe Tyr Glu Lys Ala Leu Val Glu Leu Lys Val Ala
    130                 135                 140

Ala Leu Gly Ser Asp Leu His Val Asp Val Lys Gly Tyr Lys Asp Gly
145                 150                 155                 160

Gly Ile His Leu Glu Cys Arg Ser Thr Gly Trp Tyr Pro Gln Pro Gln
                165                 170                 175

Ile Gln Trp Ser Asn Asn Lys Gly Glu Asn Ile Pro Thr Val Glu Ala
            180                 185                 190

Pro Val Val Ala Asp Gly Val Gly Leu Tyr Ala Val Ala Ala Ser Val
        195                 200                 205
```

```
Ile Met Arg Gly Ser Ser Gly Glu Gly Val Ser Cys Thr Ile Arg Ser
            210                 215                 220

Ser Leu Leu Gly Leu Glu Lys Thr Ala Ser Ile Ser Ile Ala Asp Pro
225                 230                 235                 240

Phe Phe Arg Ser Ala Gln Arg Trp Ile Ala Ala Leu Ala Gly Thr Leu
                245                 250                 255

Pro Val Leu Leu Leu Leu Gly Gly Ala Gly Tyr Phe Leu Trp Gln
                260                 265                 270

Gln Gln Glu Glu Lys Lys Thr Gln Phe Arg Lys Lys Arg Glu Gln
            275                 280                 285

Glu Leu Arg Glu Met Ala Trp Ser Thr Met Lys Gln Glu Gln Ser Thr
290                 295                 300

Arg Val Lys Leu Leu Glu Glu Leu Arg Trp Arg Ser Ile Gln Tyr Ala
305                 310                 315                 320

Ser Arg Gly Glu Arg His Ser Ala Tyr Asn Glu Trp Lys Lys Ala Leu
                325                 330                 335

Phe Lys Pro Ala Asp Val Ile Leu Asp Pro Lys Thr Ala Asn Pro Ile
                340                 345                 350

Leu Leu Val Ser Glu Asp Gln Arg Ser Val Gln Arg Ala Lys Glu Pro
            355                 360                 365

Gln Asp Leu Pro Asp Asn Pro Glu Arg Phe Asn Trp His Tyr Cys Val
370                 375                 380

Leu Gly Cys Glu Ser Phe Ile Ser Gly Arg His Tyr Trp Glu Val Glu
385                 390                 395                 400

Val Gly Asp Arg Lys Glu Trp His Ile Gly Val Cys Ser Lys Asn Val
                405                 410                 415

Gln Arg Lys Gly Trp Val Lys Met Thr Pro Glu Asn Gly Phe Trp Thr
            420                 425                 430

Met Gly Leu Thr Asp Gly Asn Lys Tyr Arg Thr Leu Thr Glu Pro Arg
                435                 440                 445

Thr Asn Leu Lys Leu Pro Lys Pro Pro Lys Lys Val Gly Val Phe Leu
450                 455                 460

Asp Tyr Glu Thr Gly Asp Ile Ser Phe Tyr Asn Ala Val Asp Gly Ser
465                 470                 475                 480

His Ile His Thr Phe Leu Asp Val Ser Phe Ser Glu Ala Leu Tyr Pro
                485                 490                 495

Val Phe Arg Ile Leu Thr Leu Glu Pro Thr Ala Leu Thr Ile Cys Pro
                500                 505                 510

Ala

<210> SEQ ID NO 3
<211> LENGTH: 123
<212> TYPE: PRT
<213> ORGANISM: Artificial Sequence
<220> FEATURE:
<223> OTHER INFORMATION: Synthetic: VH1 amino acid sequence

<400> SEQUENCE: 3

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Gly Tyr
                20                  25                  30

Tyr Met His Trp Val Arg Gln Ala Pro Gly Gln Gly Leu Glu Trp Met
            35                  40                  45
```

Gly Trp Ile Asn Pro Asn Ser Gly Gly Thr Lys Tyr Ala Gln Lys Phe
            50                  55                  60

Gln Gly Arg Val Thr Met Thr Arg Asp Thr Ser Ile Ser Thr Ala Tyr
 65                  70                  75                  80

Met Glu Leu Ser Arg Leu Arg Ser Asp Asp Thr Ala Val Tyr Tyr Cys
                 85                  90                  95

Ala Arg Arg His Ser Asp Met Ile Gly Tyr Tyr Tyr Gly Met Asp Val
            100                 105                 110

Trp Gly Gln Gly Thr Thr Val Thr Val Ser Ser
            115                 120

<210> SEQ ID NO 4
<211> LENGTH: 107
<212> TYPE: PRT
<213> ORGANISM: Artificial Sequence
<220> FEATURE:
<223> OTHER INFORMATION: Synthetic: VL1 amino acid sequence

<400> SEQUENCE: 4

Asp Ile Gln Met Thr Gln Ser Pro Ser Ser Val Ser Ala Ser Val Gly
 1               5                  10                  15

Asp Arg Val Thr Ile Thr Cys Arg Ala Ser Gln Gly Ile Ser Ser Trp
            20                  25                  30

Leu Ala Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
 65                  70                  75                  80

Glu Asp Phe Ala Thr Tyr Tyr Cys Gln Gln Ala Thr Asp Phe Pro Pro
                 85                  90                  95

Thr Phe Gly Gly Gly Thr Lys Val Glu Ile Lys
            100                 105

<210> SEQ ID NO 5
<211> LENGTH: 369
<212> TYPE: DNA
<213> ORGANISM: Artificial Sequence
<220> FEATURE:
<223> OTHER INFORMATION: Synthetic: VH1 nucleic acid sequence

<400> SEQUENCE: 5
caagtccagc ttgtgcaatc cggggcagag gttaaaaagc ccggggcttc cgtcaaggta        60
tcatgtaagg cttcaggata tacattcaca gggtactata tgcactgggt gcgtcaggca       120
cccgggcagg gcttggaatg gatggggtgg ataaacccaa atagtggagg cactaaatat       180
gctcaaaagt tccaagggcg ggtgactatg accagggaca ccagtatctc caccgcctat       240
atggaactgt cacgactcag atcagacgat accgctgtat attactgcgc tcgtagacac       300
tcagacatga ttggatacta ctatggaatg gacgtatggg gccaagggac tacagttaca       360
gtctctagc                                                              369

<210> SEQ ID NO 6
<211> LENGTH: 321
<212> TYPE: DNA
<213> ORGANISM: Artificial Sequence
<220> FEATURE:
<223> OTHER INFORMATION: Synthetic: VL1 nucleic acid sequence

<400> SEQUENCE: 6

```
gacatacaga tgacacaaag cccaagcagc gtcagcgcaa gtgtcggtga ccgcgtcaca      60
ataacttgtc gggctagtca aggaataagc tcttggctcg cctggtatca acaaaaacct     120
ggcaaagcac ccaagctgtt gatctacgca gccagctcac ttcagagcgg agtgcccagt     180
cgcttctctg gttccggctc aggtactgat ttcacactta ctatttcatc actgcaaccc     240
gaggatttcg caacatatta ctgtcaacag gccacagact ttccaccaac ttttggtgga     300
ggcacaaagg tcgaaattaa a                                                321
```

```
<210> SEQ ID NO 7
<211> LENGTH: 9
<212> TYPE: PRT
<213> ORGANISM: Artificial Sequence
<220> FEATURE:
<223> OTHER INFORMATION: Synthetic: HCDR1

<400> SEQUENCE: 7

Tyr Thr Phe Thr Gly Tyr Tyr Met His
1               5

<210> SEQ ID NO 8
<211> LENGTH: 17
<212> TYPE: PRT
<213> ORGANISM: Artificial Sequence
<220> FEATURE:
<223> OTHER INFORMATION: Synthetic: HCDR2

<400> SEQUENCE: 8

Trp Ile Asn Pro Asn Ser Gly Gly Thr Lys Tyr Ala Gln Lys Phe Gln
1               5                   10                  15
Gly

<210> SEQ ID NO 9
<211> LENGTH: 16
<212> TYPE: PRT
<213> ORGANISM: Artificial Sequence
<220> FEATURE:
<223> OTHER INFORMATION: Synthetic: HCDR3

<400> SEQUENCE: 9

Ala Arg Arg His Ser Asp Met Ile Gly Tyr Tyr Tyr Gly Met Asp Val
1               5                   10                  15

<210> SEQ ID NO 10
<211> LENGTH: 11
<212> TYPE: PRT
<213> ORGANISM: Artificial Sequence
<220> FEATURE:
<223> OTHER INFORMATION: Synthetic: LCDR1

<400> SEQUENCE: 10

Arg Ala Ser Gln Gly Ile Ser Ser Trp Leu Ala
1               5                   10

<210> SEQ ID NO 11
<211> LENGTH: 7
<212> TYPE: PRT
<213> ORGANISM: Artificial Sequence
<220> FEATURE:
<223> OTHER INFORMATION: Synthetic: LCDR2

<400> SEQUENCE: 11

Ala Ala Ser Ser Leu Gln Ser
1               5
```

<210> SEQ ID NO 12
<211> LENGTH: 9
<212> TYPE: PRT
<213> ORGANISM: Artificial Sequence
<220> FEATURE:
<223> OTHER INFORMATION: Synthetic: LCDR3

<400> SEQUENCE: 12

Gln Gln Ala Thr Asp Phe Pro Pro Thr
1               5

<210> SEQ ID NO 13
<211> LENGTH: 225
<212> TYPE: PRT
<213> ORGANISM: Homo sapiens
<220> FEATURE:
<221> NAME/KEY: misc_feature
<223> OTHER INFORMATION: CD277 Extracellular Domain

<400> SEQUENCE: 13

Gln Phe Ser Val Leu Gly Pro Ser Gly Pro Ile Leu Ala Met Val Gly
1               5                   10                  15

Glu Asp Ala Asp Leu Pro Cys His Leu Phe Pro Thr Met Ser Ala Glu
            20                  25                  30

Thr Met Glu Leu Lys Trp Val Ser Ser Leu Arg Gln Val Val Asn
        35                  40                  45

Val Tyr Ala Asp Gly Lys Glu Val Glu Asp Arg Gln Ser Ala Pro Tyr
    50                  55                  60

Arg Gly Arg Thr Ser Ile Leu Arg Asp Gly Ile Thr Ala Gly Lys Ala
65                  70                  75                  80

Ala Leu Arg Ile His Asn Val Thr Ala Ser Asp Ser Gly Lys Tyr Leu
                85                  90                  95

Cys Tyr Phe Gln Asp Gly Asp Phe Tyr Glu Lys Ala Leu Val Glu Leu
            100                 105                 110

Lys Val Ala Ala Leu Gly Ser Asp Leu His Val Asp Val Lys Gly Tyr
        115                 120                 125

Lys Asp Gly Gly Ile His Leu Glu Cys Arg Ser Thr Gly Trp Tyr Pro
130                 135                 140

Gln Pro Gln Ile Gln Trp Ser Asn Asn Lys Gly Glu Asn Ile Pro Thr
145                 150                 155                 160

Val Glu Ala Pro Val Val Ala Asp Gly Val Gly Leu Tyr Ala Val Ala
                165                 170                 175

Ala Ser Val Ile Met Arg Gly Ser Ser Gly Glu Gly Val Ser Cys Thr
            180                 185                 190

Ile Arg Ser Ser Leu Leu Gly Leu Glu Lys Thr Ala Ser Ile Ser Ile
        195                 200                 205

Ala Asp Pro Phe Phe Arg Ser Ala Gln Arg Trp Ile Ala Ala Leu Ala
    210                 215                 220

Gly
225

<210> SEQ ID NO 14
<211> LENGTH: 8
<212> TYPE: PRT
<213> ORGANISM: Artificial Sequence
<220> FEATURE:
<223> OTHER INFORMATION: Synthetic: FLAG

<400> SEQUENCE: 14

Asp Tyr Lys Asp Asp Asp Asp Lys
1               5

<210> SEQ ID NO 15
<211> LENGTH: 6
<212> TYPE: PRT
<213> ORGANISM: Artificial Sequence
<220> FEATURE:
<223> OTHER INFORMATION: Synthetic: Polyhistidine (6-His)

<400> SEQUENCE: 15

His His His His His His
1               5

<210> SEQ ID NO 16
<211> LENGTH: 9
<212> TYPE: PRT
<213> ORGANISM: Artificial Sequence
<220> FEATURE:
<223> OTHER INFORMATION: Synthetic: Hemagglutinin (HA)

<400> SEQUENCE: 16

Tyr Pro Tyr Asp Val Pro Asp Tyr Ala
1               5

<210> SEQ ID NO 17
<211> LENGTH: 326
<212> TYPE: PRT
<213> ORGANISM: Artificial Sequence
<220> FEATURE:
<223> OTHER INFORMATION: Synthetic: Human IgG4 mutant (S228P/C-terminal
      K truncation)

<400> SEQUENCE: 17

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
        50                  55                  60

Leu Ser Ser Val Val Thr Val Pro Ser Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Pro Cys Pro Ala Pro
            100                 105                 110

Glu Phe Leu Gly Gly Pro Ser Val Phe Leu Phe Pro Pro Lys Pro Lys
        115                 120                 125

Asp Thr Leu Met Ile Ser Arg Thr Pro Glu Val Thr Cys Val Val Val
    130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

Asn Ser Thr Tyr Arg Val Val Ser Val Leu Thr Val Leu His Gln Asp
            180                 185                 190

Trp Leu Asn Gly Lys Glu Tyr Lys Cys Lys Val Ser Asn Lys Gly Leu
        195                 200                 205

```
Pro Ser Ser Ile Glu Lys Thr Ile Ser Lys Ala Lys Gly Gln Pro Arg
        210                 215                 220

Glu Pro Gln Val Tyr Thr Leu Pro Pro Ser Gln Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
            260                 265                 270

Thr Thr Pro Pro Val Leu Asp Ser Asp Gly Ser Phe Phe Leu Tyr Ser
        275                 280                 285

Arg Leu Thr Val Asp Lys Ser Arg Trp Gln Gln Gly Asn Val Phe Ser
        290                 295                 300

Cys Ser Val Met His Glu Ala Leu His Asn His Tyr Thr Gln Lys Ser
305                 310                 315                 320

Leu Ser Leu Ser Leu Gly
                325

<210> SEQ ID NO 18
<211> LENGTH: 16
<212> TYPE: PRT
<213> ORGANISM: Artificial Sequence
<220> FEATURE:
<223> OTHER INFORMATION: Synthetic: HCDR3.1

<400> SEQUENCE: 18

Ala Arg Ala His Ser Asp Met Ile Gly Tyr Tyr Tyr Gly Met Asp Val
1               5                   10                  15

<210> SEQ ID NO 19
<211> LENGTH: 16
<212> TYPE: PRT
<213> ORGANISM: Artificial Sequence
<220> FEATURE:
<223> OTHER INFORMATION: Synthetic: HCDR3.2

<400> SEQUENCE: 19

Ala Arg Arg Ala Ser Asp Met Ile Gly Tyr Tyr Tyr Gly Met Asp Val
1               5                   10                  15

<210> SEQ ID NO 20
<211> LENGTH: 16
<212> TYPE: PRT
<213> ORGANISM: Artificial Sequence
<220> FEATURE:
<223> OTHER INFORMATION: Synthetic: HCDR3.3

<400> SEQUENCE: 20

Ala Arg Arg His Ala Asp Met Ile Gly Tyr Tyr Tyr Gly Met Asp Val
1               5                   10                  15

<210> SEQ ID NO 21
<211> LENGTH: 16
<212> TYPE: PRT
<213> ORGANISM: Artificial Sequence
<220> FEATURE:
<223> OTHER INFORMATION: Synthetic: HCDR3.4

<400> SEQUENCE: 21

Ala Arg Arg His Ser Ala Met Ile Gly Tyr Tyr Tyr Gly Met Asp Val
1               5                   10                  15

<210> SEQ ID NO 22
```

```
<211> LENGTH: 16
<212> TYPE: PRT
<213> ORGANISM: Artificial Sequence
<220> FEATURE:
<223> OTHER INFORMATION: Synthetic: HCDR3.5

<400> SEQUENCE: 22

Ala Arg Arg His Ser Asp Ala Ile Gly Tyr Tyr Tyr Gly Met Asp Val
1               5                   10                  15

<210> SEQ ID NO 23
<211> LENGTH: 16
<212> TYPE: PRT
<213> ORGANISM: Artificial Sequence
<220> FEATURE:
<223> OTHER INFORMATION: Synthetic: HCDR3.6

<400> SEQUENCE: 23

Ala Arg Arg His Ser Asp Met Ala Gly Tyr Tyr Tyr Gly Met Asp Val
1               5                   10                  15

<210> SEQ ID NO 24
<211> LENGTH: 16
<212> TYPE: PRT
<213> ORGANISM: Artificial Sequence
<220> FEATURE:
<223> OTHER INFORMATION: Synthetic: HCDR3.7

<400> SEQUENCE: 24

Ala Arg Arg His Ser Asp Met Ile Ala Tyr Tyr Tyr Gly Met Asp Val
1               5                   10                  15

<210> SEQ ID NO 25
<211> LENGTH: 16
<212> TYPE: PRT
<213> ORGANISM: Artificial Sequence
<220> FEATURE:
<223> OTHER INFORMATION: Synthetic: HCDR3.8

<400> SEQUENCE: 25

Ala Arg Arg His Ser Asp Met Ile Gly Ala Tyr Tyr Gly Met Asp Val
1               5                   10                  15

<210> SEQ ID NO 26
<211> LENGTH: 16
<212> TYPE: PRT
<213> ORGANISM: Artificial Sequence
<220> FEATURE:
<223> OTHER INFORMATION: Synthetic: HCDR3.9

<400> SEQUENCE: 26

Ala Arg Arg His Ser Asp Met Ile Gly Tyr Ala Tyr Gly Met Asp Val
1               5                   10                  15

<210> SEQ ID NO 27
<211> LENGTH: 16
<212> TYPE: PRT
<213> ORGANISM: Artificial Sequence
<220> FEATURE:
<223> OTHER INFORMATION: Synthetic: HCDR3.10

<400> SEQUENCE: 27

Ala Arg Arg His Ser Asp Met Ile Gly Tyr Tyr Ala Gly Met Asp Val
1               5                   10                  15

<210> SEQ ID NO 28
<211> LENGTH: 16
```

-continued

```
<212> TYPE: PRT
<213> ORGANISM: Artificial Sequence
<220> FEATURE:
<223> OTHER INFORMATION: Synthetic: HCDR3.11

<400> SEQUENCE: 28

Ala Arg Arg His Ser Asp Met Ile Gly Tyr Tyr Tyr Ala Met Asp Val
1               5                   10                  15

<210> SEQ ID NO 29
<211> LENGTH: 16
<212> TYPE: PRT
<213> ORGANISM: Artificial Sequence
<220> FEATURE:
<223> OTHER INFORMATION: Synthetic: HCDR3.12

<400> SEQUENCE: 29

Ala Arg Arg His Ser Asp Met Ile Gly Tyr Tyr Tyr Gly Ala Asp Val
1               5                   10                  15

<210> SEQ ID NO 30
<211> LENGTH: 16
<212> TYPE: PRT
<213> ORGANISM: Artificial Sequence
<220> FEATURE:
<223> OTHER INFORMATION: Synthetic: HCDR3.13

<400> SEQUENCE: 30

Ala Arg Arg His Ser Asp Met Ile Gly Tyr Tyr Tyr Gly Met Ala Val
1               5                   10                  15

<210> SEQ ID NO 31
<211> LENGTH: 16
<212> TYPE: PRT
<213> ORGANISM: Artificial Sequence
<220> FEATURE:
<223> OTHER INFORMATION: Synthetic: HCDR3.14

<400> SEQUENCE: 31

Ala Arg Arg His Ser Asp Met Ile Gly Tyr Tyr Tyr Gly Met Asp Ala
1               5                   10                  15

<210> SEQ ID NO 32
<211> LENGTH: 452
<212> TYPE: PRT
<213> ORGANISM: Artificial Sequence
<220> FEATURE:
<223> OTHER INFORMATION: Synthetic: Heavy chain 2 amino acid sequence

<400> SEQUENCE: 32

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Ser Asn Tyr
                20                  25                  30

Tyr Ile His Trp Val Arg Gln Ala Pro Gly Gln Gly Leu Glu Trp Met
            35                  40                  45

Gly Trp Ile Asn Ala Asn Ser Gly Gly Thr Lys Tyr Ala Gln Lys Phe
        50                  55                  60

Gln Gly Arg Val Thr Met Thr Arg Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Arg Arg His Ser Asp Met Ile Gly Tyr Tyr Tyr Gly Met Asp Val
                100                 105                 110
```

Trp Gly Gln Gly Thr Thr Val Thr Val Ser Ser Ala Ser Thr Lys Gly
            115                 120                 125

Pro Ser Val Phe Pro Leu Ala Pro Ser Ser Lys Ser Thr Ser Gly Gly
        130                 135                 140

Thr Ala Ala Leu Gly Cys Leu Val Lys Asp Tyr Phe Pro Glu Pro Val
145                 150                 155                 160

Thr Val Ser Trp Asn Ser Gly Ala Leu Thr Ser Gly Val His Thr Phe
                165                 170                 175

Pro Ala Val Leu Gln Ser Ser Gly Leu Tyr Ser Leu Ser Ser Val Val
            180                 185                 190

Thr Val Pro Ser Ser Leu Gly Thr Gln Thr Tyr Ile Cys Asn Val
        195                 200                 205

Asn His Lys Pro Ser Asn Thr Lys Val Asp Lys Val Glu Pro Lys
        210                 215                 220

Ser Cys Asp Lys Thr His Thr Cys Pro Pro Cys Pro Ala Pro Glu Leu
225                 230                 235                 240

Leu Gly Gly Pro Ser Val Phe Leu Phe Pro Pro Lys Pro Lys Asp Thr
                245                 250                 255

Leu Met Ile Ser Arg Thr Pro Glu Val Thr Cys Val Val Val Asp Val
            260                 265                 270

Ser His Glu Asp Pro Glu Val Lys Phe Asn Trp Tyr Val Asp Gly Val
        275                 280                 285

Glu Val His Asn Ala Lys Thr Lys Pro Arg Glu Glu Gln Tyr Ala Ser
        290                 295                 300

Thr Tyr Arg Val Val Ser Val Leu Thr Val Leu His Gln Asp Trp Leu
305                 310                 315                 320

Asn Gly Lys Glu Tyr Lys Cys Lys Val Ser Asn Lys Ala Leu Pro Ala
                325                 330                 335

Pro Ile Glu Lys Thr Ile Ser Lys Ala Lys Gly Gln Pro Arg Glu Pro
            340                 345                 350

Gln Val Tyr Thr Leu Pro Pro Ser Arg Asp Glu Leu Thr Lys Asn Gln
        355                 360                 365

Val Ser Leu Thr Cys Leu Val Lys Gly Phe Tyr Pro Ser Asp Ile Ala
370                 375                 380

Val Glu Trp Glu Ser Asn Gly Gln Pro Glu Asn Asn Tyr Lys Thr Thr
385                 390                 395                 400

Pro Pro Val Leu Asp Ser Asp Gly Ser Phe Phe Leu Tyr Ser Lys Leu
                405                 410                 415

Thr Val Asp Lys Ser Arg Trp Gln Gln Gly Asn Val Phe Ser Cys Ser
            420                 425                 430

Val Met His Glu Ala Leu His Asn His Tyr Thr Gln Lys Ser Leu Ser
        435                 440                 445

Leu Ser Pro Gly
    450

<210> SEQ ID NO 33
<211> LENGTH: 214
<212> TYPE: PRT
<213> ORGANISM: Artificial Sequence
<220> FEATURE:
<223> OTHER INFORMATION: Synthetic: Light chain 2  amino acid sequence

<400> SEQUENCE: 33

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Asp Arg Tyr
            20                  25                  30

Leu Asn Trp Tyr Gln Gln Lys Pro Gly Lys Ala Pro Lys Leu Leu Ile
        35                  40                  45

Tyr Ala Ala Ser Arg Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ala Asn Ser Phe Pro Pro
                85                  90                  95

Thr Phe Gly Gln Gly Thr Arg Leu Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 34
<211> LENGTH: 452
<212> TYPE: PRT
<213> ORGANISM: Artificial Sequence
<220> FEATURE:
<223> OTHER INFORMATION: Synthetic: Heavy chain 3   amino acid sequence

<400> SEQUENCE: 34

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Asn Gly Tyr
            20                  25                  30

Tyr Ile His Trp Val Arg Gln Ala Pro Gly Gln Gly Leu Glu Trp Met
        35                  40                  45

Gly Trp Ile Asn Ser Asn Ser Gly Gly Thr Lys Tyr Ala Gln Lys Phe
    50                  55                  60

Gln Gly Arg Val Thr Met Thr Arg Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Arg Arg His Ser Asp Met Ile Gly Tyr Tyr Gly Met Asp Val
            100                 105                 110

Trp Gly Gln Gly Thr Thr Val Thr Val Ser Ser Ala Ser Thr Lys Gly
        115                 120                 125

Pro Ser Val Phe Pro Leu Ala Pro Ser Ser Lys Ser Thr Ser Gly Gly
    130                 135                 140

Thr Ala Ala Leu Gly Cys Leu Val Lys Asp Tyr Phe Pro Glu Pro Val
145                 150                 155                 160

Thr Val Ser Trp Asn Ser Gly Ala Leu Thr Ser Gly Val His Thr Phe
                165                 170                 175

Pro Ala Val Leu Gln Ser Ser Gly Leu Tyr Ser Leu Ser Ser Val Val
            180                 185                 190

Thr Val Pro Ser Ser Ser Leu Gly Thr Gln Thr Tyr Ile Cys Asn Val
        195                 200                 205

Asn His Lys Pro Ser Asn Thr Lys Val Asp Lys Val Glu Pro Lys
    210                 215                 220

Ser Cys Asp Lys Thr His Thr Cys Pro Pro Cys Pro Ala Pro Glu Leu
225                 230                 235                 240

Leu Gly Gly Pro Ser Val Phe Leu Phe Pro Pro Lys Pro Lys Asp Thr
                245                 250                 255

Leu Met Ile Ser Arg Thr Pro Glu Val Thr Cys Val Val Val Asp Val
            260                 265                 270

Ser His Glu Asp Pro Glu Val Lys Phe Asn Trp Tyr Val Asp Gly Val
        275                 280                 285

Glu Val His Asn Ala Lys Thr Lys Pro Arg Glu Glu Gln Tyr Ala Ser
    290                 295                 300

Thr Tyr Arg Val Val Ser Val Leu Thr Val Leu His Gln Asp Trp Leu
305                 310                 315                 320

Asn Gly Lys Glu Tyr Lys Cys Lys Val Ser Asn Lys Ala Leu Pro Ala
                325                 330                 335

Pro Ile Glu Lys Thr Ile Ser Lys Ala Lys Gly Gln Pro Arg Glu Pro
            340                 345                 350

Gln Val Tyr Thr Leu Pro Pro Ser Arg Asp Glu Leu Thr Lys Asn Gln
        355                 360                 365

Val Ser Leu Thr Cys Leu Val Lys Gly Phe Tyr Pro Ser Asp Ile Ala
    370                 375                 380

Val Glu Trp Glu Ser Asn Gly Gln Pro Glu Asn Asn Tyr Lys Thr Thr
385                 390                 395                 400

Pro Pro Val Leu Asp Ser Asp Gly Ser Phe Phe Leu Tyr Ser Lys Leu
                405                 410                 415

Thr Val Asp Lys Ser Arg Trp Gln Gln Gly Asn Val Phe Ser Cys Ser
            420                 425                 430

Val Met His Glu Ala Leu His Asn His Tyr Thr Gln Lys Ser Leu Ser
        435                 440                 445

Leu Ser Pro Gly
    450

<210> SEQ ID NO 35
<211> LENGTH: 214
<212> TYPE: PRT
<213> ORGANISM: Artificial Sequence
<220> FEATURE:
<223> OTHER INFORMATION: Synthetic: Light chain 3 amino acid sequence

<400> SEQUENCE: 35

Asp Ile Gln Met Thr Gln Ser Pro Ser Ser Val Ser Ala Ser Val Gly
1               5                   10                  15

Asp Arg Val Thr Ile Thr Cys Arg Ala Ser Gln Gly Ile Ser Ser Trp
            20                  25                  30

Leu Ala Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
    50                  55                  60

```
Ser Gly Ser Gly Thr Asp Phe Thr Leu Thr Ile Ser Ser Leu Gln Pro
 65                  70                  75                  80

Glu Asp Phe Ala Thr Tyr Tyr Cys Gln Gln Ala Thr Asp Phe Pro Pro
                 85                  90                  95

Thr Phe Gly Gly Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 36
<211> LENGTH: 452
<212> TYPE: PRT
<213> ORGANISM: Artificial Sequence
<220> FEATURE:
<223> OTHER INFORMATION: Synthetic: Heavy chain 4 amino acid sequence

<400> SEQUENCE: 36

Gln Val Gln Leu Val Gln Ser Gly Ala Glu Val Lys Lys Pro Gly Ala
 1               5                  10                  15

Ser Val Lys Val Ser Cys Lys Ala Ser Gly Tyr Thr Phe Thr Asn Tyr
             20                  25                  30

Tyr Met His Trp Val Arg Gln Ala Pro Gly Gln Gly Leu Glu Trp Met
         35                  40                  45

Gly Trp Ile Asn Val Asn Ser Gly Val Thr Lys Tyr Ala Gln Lys Phe
 50                  55                  60

Gln Gly Arg Val Thr Met Thr Arg Asp Thr Ser Ile Ser Thr Ala Tyr
 65                  70                  75                  80

Met Glu Leu Ser Arg Leu Arg Ser Asp Asp Thr Ala Val Tyr Tyr Cys
                 85                  90                  95

Ala Arg Arg His Ser Asp Met Ile Gly Tyr Tyr Tyr Gly Met Asp Val
            100                 105                 110

Trp Gly Gln Gly Thr Thr Val Thr Val Ser Ser Ala Ser Thr Lys Gly
        115                 120                 125

Pro Ser Val Phe Pro Leu Ala Pro Ser Ser Lys Ser Thr Ser Gly Gly
    130                 135                 140

Thr Ala Ala Leu Gly Cys Leu Val Lys Asp Tyr Phe Pro Glu Pro Val
145                 150                 155                 160

Thr Val Ser Trp Asn Ser Gly Ala Leu Thr Ser Gly Val His Thr Phe
                165                 170                 175

Pro Ala Val Leu Gln Ser Ser Gly Leu Tyr Ser Leu Ser Ser Val Val
            180                 185                 190

Thr Val Pro Ser Ser Ser Leu Gly Thr Gln Thr Tyr Ile Cys Asn Val
        195                 200                 205
```

```
Asn His Lys Pro Ser Asn Thr Lys Val Asp Lys Lys Val Glu Pro Lys
            210                 215                 220

Ser Cys Asp Lys Thr His Thr Cys Pro Pro Cys Pro Ala Pro Glu Leu
225                 230                 235                 240

Leu Gly Gly Pro Ser Val Phe Leu Phe Pro Pro Lys Pro Lys Asp Thr
                245                 250                 255

Leu Met Ile Ser Arg Thr Pro Glu Val Thr Cys Val Val Val Asp Val
            260                 265                 270

Ser His Glu Asp Pro Glu Val Lys Phe Asn Trp Tyr Val Asp Gly Val
        275                 280                 285

Glu Val His Asn Ala Lys Thr Lys Pro Arg Glu Glu Gln Tyr Ala Ser
    290                 295                 300

Thr Tyr Arg Val Val Ser Val Leu Thr Val Leu His Gln Asp Trp Leu
305                 310                 315                 320

Asn Gly Lys Glu Tyr Lys Cys Lys Val Ser Asn Lys Ala Leu Pro Ala
                325                 330                 335

Pro Ile Glu Lys Thr Ile Ser Lys Ala Lys Gly Gln Pro Arg Glu Pro
            340                 345                 350

Gln Val Tyr Thr Leu Pro Pro Ser Arg Asp Glu Leu Thr Lys Asn Gln
        355                 360                 365

Val Ser Leu Thr Cys Leu Val Lys Gly Phe Tyr Pro Ser Asp Ile Ala
370                 375                 380

Val Glu Trp Glu Ser Asn Gly Gln Pro Glu Asn Asn Tyr Lys Thr Thr
385                 390                 395                 400

Pro Pro Val Leu Asp Ser Asp Gly Ser Phe Phe Leu Tyr Ser Lys Leu
                405                 410                 415

Thr Val Asp Lys Ser Arg Trp Gln Gln Gly Asn Val Phe Ser Cys Ser
            420                 425                 430

Val Met His Glu Ala Leu His Asn His Tyr Thr Gln Lys Ser Leu Ser
        435                 440                 445

Leu Ser Pro Gly
        450

<210> SEQ ID NO 37
<211> LENGTH: 452
<212> TYPE: PRT
<213> ORGANISM: Artificial Sequence
<220> FEATURE:
<223> OTHER INFORMATION: Synthetic: Heavy chain 5   amino acid sequence

<400> SEQUENCE: 37

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Gly Tyr
            20                  25                  30

Tyr Met His Trp Val Arg Gln Ala Pro Gly Gln Gly Leu Glu Trp Met
        35                  40                  45

Gly Trp Ile Asn Pro Asn Ser Gly Gly Thr Lys Tyr Ala Gln Lys Phe
    50                  55                  60

Gln Gly Arg Val Thr Met Thr Arg Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Arg Arg His Ser Asp Met Ile Gly Tyr Tyr Tyr Gly Met Asp Val
            100                 105                 110
```

Trp Gly Gln Gly Thr Thr Val Thr Val Ser Ser Ala Ser Thr Lys Gly
            115                 120                 125

Pro Ser Val Phe Pro Leu Ala Pro Ser Ser Lys Ser Thr Ser Gly Gly
        130                 135                 140

Thr Ala Ala Leu Gly Cys Leu Val Lys Asp Tyr Phe Pro Glu Pro Val
145                 150                 155                 160

Thr Val Ser Trp Asn Ser Gly Ala Leu Thr Ser Gly Val His Thr Phe
                165                 170                 175

Pro Ala Val Leu Gln Ser Ser Gly Leu Tyr Ser Leu Ser Ser Val Val
            180                 185                 190

Thr Val Pro Ser Ser Leu Gly Thr Gln Thr Tyr Ile Cys Asn Val
        195                 200                 205

Asn His Lys Pro Ser Asn Thr Lys Val Asp Lys Lys Val Glu Pro Lys
        210                 215                 220

Ser Cys Asp Lys Thr His Thr Cys Pro Pro Cys Pro Ala Pro Glu Leu
225                 230                 235                 240

Leu Gly Gly Pro Ser Val Phe Leu Phe Pro Pro Lys Pro Lys Asp Thr
                245                 250                 255

Leu Met Ile Ser Arg Thr Pro Glu Val Thr Cys Val Val Val Asp Val
            260                 265                 270

Ser His Glu Asp Pro Glu Val Lys Phe Asn Trp Tyr Val Asp Gly Val
        275                 280                 285

Glu Val His Asn Ala Lys Thr Lys Pro Arg Glu Glu Gln Tyr Ala Ser
        290                 295                 300

Thr Tyr Arg Val Val Ser Val Leu Thr Val Leu His Gln Asp Trp Leu
305                 310                 315                 320

Asn Gly Lys Glu Tyr Lys Cys Lys Val Ser Asn Lys Ala Leu Pro Ala
                325                 330                 335

Pro Ile Glu Lys Thr Ile Ser Lys Ala Lys Gly Gln Pro Arg Glu Pro
            340                 345                 350

Gln Val Tyr Thr Leu Pro Pro Ser Arg Asp Glu Leu Thr Lys Asn Gln
        355                 360                 365

Val Ser Leu Thr Cys Leu Val Lys Gly Phe Tyr Pro Ser Asp Ile Ala
        370                 375                 380

Val Glu Trp Glu Ser Asn Gly Gln Pro Glu Asn Asn Tyr Lys Thr Thr
385                 390                 395                 400

Pro Pro Val Leu Asp Ser Asp Gly Ser Phe Phe Leu Tyr Ser Lys Leu
                405                 410                 415

Thr Val Asp Lys Ser Arg Trp Gln Gln Gly Asn Val Phe Ser Cys Ser
            420                 425                 430

Val Met His Glu Ala Leu His Asn His Tyr Thr Gln Lys Ser Leu Ser
        435                 440                 445

Leu Ser Pro Gly
    450

<210> SEQ ID NO 38
<211> LENGTH: 214
<212> TYPE: PRT
<213> ORGANISM: Artificial Sequence
<220> FEATURE:
<223> OTHER INFORMATION: Synthetic: Light chain 4 amino acid sequence

<400> SEQUENCE: 38

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Leu Phe
            20                  25                  30

Leu Asn Trp Tyr Gln Gln Lys Pro Gly Lys Ala Pro Lys Leu Leu Ile
        35                  40                  45

Tyr Thr Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ala Asn Ser Phe Pro Pro
                85                  90                  95

Thr Phe Gly Gly Gly Thr Lys Val Asp Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 39
<211> LENGTH: 214
<212> TYPE: PRT
<213> ORGANISM: Artificial Sequence
<220> FEATURE:
<223> OTHER INFORMATION: Synthetic: Light chain 5  amino acid sequence

<400> SEQUENCE: 39

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile Ser Val Tyr
            20                  25                  30

Leu Asn Trp Tyr Gln Gln Lys Pro Gly Lys Ala Pro Lys Leu Leu Ile
        35                  40                  45

Tyr Thr Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ala Asn Ser Phe Pro Pro
                85                  90                  95

Thr Phe Gly Gly Gly Thr Lys Val Asp Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
130                 135                 140

Lys Val Gln Trp Lys Val Asp Asn Ala Leu Gln Ser Gly Asn Ser Gln
145                 150                 155                 160

```
Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
                180                 185                 190

Ala Cys Glu Val Thr His Gln Gly Leu Ser Ser Pro Val Thr Lys Ser
            195                 200                 205

Phe Asn Arg Gly Glu Cys
        210

<210> SEQ ID NO 40
<211> LENGTH: 214
<212> TYPE: PRT
<213> ORGANISM: Artificial Sequence
<220> FEATURE:
<223> OTHER INFORMATION: Synthetic: Light chain 6  amino acid sequence

<400> SEQUENCE: 40

Asp Ile Gln Leu Thr Gln Ser Pro Ser Ser Leu Ser Ala Ser Val Gly
1               5                   10                  15

Asp Arg Val Thr Ile Thr Cys Arg Ala Ser Gln Ser Ile Ser Ser Tyr
            20                  25                  30

Leu Asn Trp Tyr Gln Gln Lys Pro Gly Lys Val Pro Lys Leu Leu Ile
        35                  40                  45

Tyr Ala Ala Ser Thr Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Ser Cys Gln Gln Thr Asn Ser Phe Pro Pro
                85                  90                  95

Thr Phe Gly Gln Gly Thr Lys Val Glu Ile Lys Arg Thr Val Ala Ala
                100                 105                 110

Pro Ser Val Phe Ile Phe Pro Pro Ser Asp Glu Gln Leu Lys Ser Gly
            115                 120                 125

Thr Ala Ser Val Val Cys Leu Leu Asn Asn Phe Tyr Pro Arg Glu Ala
        130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
                180                 185                 190

Ala Cys Glu Val Thr His Gln Gly Leu Ser Ser Pro Val Thr Lys Ser
            195                 200                 205

Phe Asn Arg Gly Glu Cys
        210

<210> SEQ ID NO 41
<211> LENGTH: 214
<212> TYPE: PRT
<213> ORGANISM: Artificial Sequence
<220> FEATURE:
<223> OTHER INFORMATION: Synthetic: Light chain 7  amino acid sequence

<400> SEQUENCE: 41

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Ser Tyr
```

```
                    20                  25                  30
Leu Asn Trp Tyr Gln Gln Lys Pro Gly Lys Ala Pro Lys Leu Leu Ile
            35                  40                  45
Tyr Ala Ala Ser Ser Leu Gln Ser Gly Val Pro Ser Arg Phe Ser Gly
        50                  55                  60
Ser Gly Ser Gly Thr Asp Phe Thr Leu Thr Ile Ser Ser Leu Gln Pro
65                  70                  75                  80
Glu Asp Phe Ala Thr Tyr Tyr Cys Gln Gln Ala Asn Thr Phe Pro Pro
                85                  90                  95
Thr Phe Gly Gln Gly Thr Arg Leu Glu Ile Lys Arg Thr Val Ala Ala
            100                 105                 110
Pro Ser Val Phe Ile Phe Pro Pro Ser Asp Glu Gln Leu Lys Ser Gly
        115                 120                 125
Thr Ala Ser Val Val Cys Leu Leu Asn Asn Phe Tyr Pro Arg Glu Ala
    130                 135                 140
Lys Val Gln Trp Lys Val Asp Asn Ala Leu Gln Ser Gly Asn Ser Gln
145                 150                 155                 160
Glu Ser Val Thr Glu Gln Asp Ser Lys Asp Ser Thr Tyr Ser Leu Ser
                165                 170                 175
Ser Thr Leu Thr Leu Ser Lys Ala Asp Tyr Glu Lys His Lys Val Tyr
            180                 185                 190
Ala Cys Glu Val Thr His Gln Gly Leu Ser Ser Pro Val Thr Lys Ser
        195                 200                 205
Phe Asn Arg Gly Glu Cys
    210

<210> SEQ ID NO 42
<211> LENGTH: 452
<212> TYPE: PRT
<213> ORGANISM: Artificial Sequence
<220> FEATURE:
<223> OTHER INFORMATION: Synthetic: Heavy chain 6 amino acid sequence

<400> SEQUENCE: 42

Gln Val Gln Leu Val Gln Ser Gly Ala Glu Val Lys Lys Pro Gly Ala
1               5                   10                  15
Ser Val Lys Val Ser Cys Lys Ala Ser Gly Tyr Thr Phe Ser Asn Tyr
            20                  25                  30
Tyr Ile His Trp Val Arg Gln Ala Pro Gly Gln Gly Leu Glu Trp Met
        35                  40                  45
Gly Trp Ile Asn Ala Asn Ser Gly Gly Thr Lys Tyr Ala Gln Lys Phe
    50                  55                  60
Gln Gly Arg Val Thr Met Thr Arg Asp Thr Ser Ile Ser Thr Ala Tyr
65                  70                  75                  80
Met Glu Leu Ser Arg Leu Arg Ser Asp Thr Ala Val Tyr Tyr Cys
                85                  90                  95
Ala Arg Arg His Ser Asp Met Ile Gly Tyr Tyr Tyr Gly Met Asp Val
            100                 105                 110
Trp Gly Gln Gly Thr Thr Val Thr Val Ser Ser Ala Ser Thr Lys Gly
        115                 120                 125
Pro Ser Val Phe Pro Leu Ala Pro Ser Ser Lys Ser Thr Ser Gly Gly
    130                 135                 140
Thr Ala Ala Leu Gly Cys Leu Val Lys Asp Tyr Phe Pro Glu Pro Val
145                 150                 155                 160
Thr Val Ser Trp Asn Ser Gly Ala Leu Thr Ser Gly Val His Thr Phe
```

```
                    165                 170                 175

Pro Ala Val Leu Gln Ser Ser Gly Leu Tyr Ser Leu Ser Ser Val Val
            180                 185                 190

Thr Val Pro Ser Ser Leu Gly Thr Gln Thr Tyr Ile Cys Asn Val
        195                 200                 205

Asn His Lys Pro Ser Asn Thr Lys Val Asp Lys Val Glu Pro Lys
210                 215                 220

Ser Cys Asp Lys Thr His Thr Cys Pro Cys Pro Ala Pro Glu Leu
225                 230                 235                 240

Leu Gly Gly Pro Ser Val Phe Leu Phe Pro Pro Lys Pro Lys Asp Thr
                245                 250                 255

Leu Met Ile Ser Arg Thr Pro Glu Val Thr Cys Val Val Val Asp Val
            260                 265                 270

Ser His Glu Asp Pro Glu Val Lys Phe Asn Trp Tyr Val Asp Gly Val
        275                 280                 285

Glu Val His Asn Ala Lys Thr Lys Pro Arg Glu Glu Gln Tyr Ala Ser
    290                 295                 300

Thr Tyr Arg Val Val Ser Val Leu Thr Val Leu His Gln Asp Trp Leu
305                 310                 315                 320

Asn Gly Lys Glu Tyr Lys Cys Lys Val Ser Asn Lys Ala Leu Pro Ala
                325                 330                 335

Pro Ile Glu Lys Thr Ile Ser Lys Ala Lys Gly Gln Pro Arg Glu Pro
            340                 345                 350

Gln Val Tyr Thr Leu Pro Pro Ser Arg Asp Glu Leu Thr Lys Asn Gln
        355                 360                 365

Val Ser Leu Thr Cys Leu Val Lys Gly Phe Tyr Pro Ser Asp Ile Ala
370                 375                 380

Val Glu Trp Glu Ser Asn Gly Gln Pro Glu Asn Asn Tyr Lys Thr Thr
385                 390                 395                 400

Pro Pro Val Leu Asp Ser Asp Gly Ser Phe Phe Leu Tyr Ser Lys Leu
                405                 410                 415

Thr Val Asp Lys Ser Arg Trp Gln Gln Gly Asn Val Phe Ser Cys Ser
            420                 425                 430

Val Met His Glu Ala Leu His Asn His Tyr Thr Gln Lys Ser Leu Ser
        435                 440                 445

Leu Ser Pro Gly
    450

<210> SEQ ID NO 43
<211> LENGTH: 9
<212> TYPE: PRT
<213> ORGANISM: Artificial Sequence
<220> FEATURE:
<223> OTHER INFORMATION: Synthetic: HCDR1.1

<400> SEQUENCE: 43

Tyr Thr Phe Ser Asn Tyr Tyr Ile His
1               5

<210> SEQ ID NO 44
<211> LENGTH: 9
<212> TYPE: PRT
<213> ORGANISM: Artificial Sequence
<220> FEATURE:
<223> OTHER INFORMATION: Synthetic: HCDR1.2

<400> SEQUENCE: 44
```

Tyr Thr Phe Asn Gly Tyr Tyr Ile His
1               5

<210> SEQ ID NO 45
<211> LENGTH: 9
<212> TYPE: PRT
<213> ORGANISM: Artificial Sequence
<220> FEATURE:
<223> OTHER INFORMATION: Synthetic: HCDR1.3

<400> SEQUENCE: 45

Tyr Thr Phe Thr Asn Tyr Tyr Met His
1               5

<210> SEQ ID NO 46
<211> LENGTH: 9
<212> TYPE: PRT
<213> ORGANISM: Artificial Sequence
<220> FEATURE:
<223> OTHER INFORMATION: Synthetic: HCDR1.4

<400> SEQUENCE: 46

Tyr Thr Phe Thr Gly Tyr Tyr Met His
1               5

<210> SEQ ID NO 47
<211> LENGTH: 10
<212> TYPE: PRT
<213> ORGANISM: Artificial Sequence
<220> FEATURE:
<223> OTHER INFORMATION: Synthetic: HCDR2.1

<400> SEQUENCE: 47

Trp Ile Asn Ala Asn Ser Gly Gly Thr Lys
1               5                   10

<210> SEQ ID NO 48
<211> LENGTH: 10
<212> TYPE: PRT
<213> ORGANISM: Artificial Sequence
<220> FEATURE:
<223> OTHER INFORMATION: Synthetic: HCDR2.2

<400> SEQUENCE: 48

Trp Ile Asn Ser Asn Ser Gly Gly Thr Lys
1               5                   10

<210> SEQ ID NO 49
<211> LENGTH: 10
<212> TYPE: PRT
<213> ORGANISM: Artificial Sequence
<220> FEATURE:
<223> OTHER INFORMATION: Synthetic: HCDR2.3

<400> SEQUENCE: 49

Trp Ile Asn Val Asn Ser Gly Val Thr Lys
1               5                   10

<210> SEQ ID NO 50
<211> LENGTH: 10
<212> TYPE: PRT
<213> ORGANISM: Artificial Sequence
<220> FEATURE:
<223> OTHER INFORMATION: Synthetic: HCDR2.4

<400> SEQUENCE: 50

Trp Ile Asn Pro Asn Ser Gly Gly Thr Lys 1               5                   10

<210> SEQ ID NO 51

<400> SEQUENCE: 51

000

<210> SEQ ID NO 52
<211> LENGTH: 11
<212> TYPE: PRT
<213> ORGANISM: Artificial Sequence
<220> FEATURE:
<223> OTHER INFORMATION: Synthetic: LCDR1.1

<400> SEQUENCE: 52

Arg Ala Ser Gln Ser Ile Asp Arg Tyr Leu Asn
1               5                   10

<210> SEQ ID NO 53
<211> LENGTH: 11
<212> TYPE: PRT
<213> ORGANISM: Artificial Sequence
<220> FEATURE:
<223> OTHER INFORMATION: Synthetic: LCDR1.2

<400> SEQUENCE: 53

Arg Ala Ser Gln Gly Ile Ser Ser Trp Leu Ala
1               5                   10

<210> SEQ ID NO 54
<211> LENGTH: 11
<212> TYPE: PRT
<213> ORGANISM: Artificial Sequence
<220> FEATURE:
<223> OTHER INFORMATION: Synthetic: LCDR1.3

<400> SEQUENCE: 54

Arg Ala Ser Gln Ser Ile Ser Leu Phe Leu Asn
1               5                   10

<210> SEQ ID NO 55
<211> LENGTH: 11
<212> TYPE: PRT
<213> ORGANISM: Artificial Sequence
<220> FEATURE:
<223> OTHER INFORMATION: Synthetic: LCDR1.4

<400> SEQUENCE: 55

Arg Ala Ser Gln Asp Ile Ser Val Tyr Leu Asn
1               5                   10

<210> SEQ ID NO 56
<211> LENGTH: 11
<212> TYPE: PRT
<213> ORGANISM: Artificial Sequence
<220> FEATURE:
<223> OTHER INFORMATION: Synthetic: LCDR1.5

<400> SEQUENCE: 56

Arg Ala Ser Gln Ser Ile Asp Arg Tyr Leu Asn
1               5                   10

<210> SEQ ID NO 57
<211> LENGTH: 11
<212> TYPE: PRT
<213> ORGANISM: Artificial Sequence

```
<220> FEATURE:
<223> OTHER INFORMATION: Synthetic: LCDR1.6

<400> SEQUENCE: 57

Arg Ala Ser Gln Ser Ile Ser Ser Tyr Leu Asn
1               5                   10

<210> SEQ ID NO 58
<211> LENGTH: 8
<212> TYPE: PRT
<213> ORGANISM: Artificial Sequence
<220> FEATURE:
<223> OTHER INFORMATION: Synthetic: LCDR2.1

<400> SEQUENCE: 58

Tyr Ala Ala Ser Arg Leu Gln Ser
1               5

<210> SEQ ID NO 59
<211> LENGTH: 8
<212> TYPE: PRT
<213> ORGANISM: Artificial Sequence
<220> FEATURE:
<223> OTHER INFORMATION: Synthetic: LCDR2 .2

<400> SEQUENCE: 59

Tyr Ala Ala Ser Ser Leu Gln Ser
1               5

<210> SEQ ID NO 60
<211> LENGTH: 8
<212> TYPE: PRT
<213> ORGANISM: Artificial Sequence
<220> FEATURE:
<223> OTHER INFORMATION: Synthetic: LCDR2.3

<400> SEQUENCE: 60

Tyr Thr Ala Ser Ser Leu Gln Ser
1               5

<210> SEQ ID NO 61
<211> LENGTH: 8
<212> TYPE: PRT
<213> ORGANISM: Artificial Sequence
<220> FEATURE:
<223> OTHER INFORMATION: Synthetic: LCDR2.4

<400> SEQUENCE: 61

Tyr Ala Ala Ser Thr Leu Gln Ser
1               5

<210> SEQ ID NO 62
<211> LENGTH: 9
<212> TYPE: PRT
<213> ORGANISM: Artificial Sequence
<220> FEATURE:
<223> OTHER INFORMATION: Synthetic: LCDR3.1

<400> SEQUENCE: 62

Gln Gln Ala Asn Ser Phe Pro Pro Thr
1               5

<210> SEQ ID NO 63
<211> LENGTH: 9
<212> TYPE: PRT
<213> ORGANISM: Artificial Sequence
<220> FEATURE:
```

<223> OTHER INFORMATION: Synthetic: LCDR3.2

<400> SEQUENCE: 63

Gln Gln Ala Thr Asp Phe Pro Pro Thr
1               5

<210> SEQ ID NO 64
<211> LENGTH: 9
<212> TYPE: PRT
<213> ORGANISM: Artificial Sequence
<220> FEATURE:
<223> OTHER INFORMATION: Synthetic: LCDR3.3

<400> SEQUENCE: 64

Gln Gln Thr Asn Ser Phe Pro Pro Thr
1               5

<210> SEQ ID NO 65
<211> LENGTH: 9
<212> TYPE: PRT
<213> ORGANISM: Artificial Sequence
<220> FEATURE:
<223> OTHER INFORMATION: Synthetic: LCDR3.4

<400> SEQUENCE: 65

Gln Gln Ala Asn Thr Phe Pro Pro Thr
1               5

<210> SEQ ID NO 66
<211> LENGTH: 26
<212> TYPE: PRT
<213> ORGANISM: Artificial Sequence
<220> FEATURE:
<223> OTHER INFORMATION: Synthetic: VHFR1

<400> SEQUENCE: 66

Gln Val Gln Leu Val Gln Ser Gly Ala Glu Val Lys Lys Pro Gly Ala
1               5                   10                  15

Ser Val Lys Val Ser Cys Lys Ala Ser Gly
            20                  25

<210> SEQ ID NO 67
<211> LENGTH: 14
<212> TYPE: PRT
<213> ORGANISM: Artificial Sequence
<220> FEATURE:
<223> OTHER INFORMATION: Synthetic: VHFR2

<400> SEQUENCE: 67

Trp Val Arg Gln Ala Pro Gly Gln Gly Leu Glu Trp Met Gly
1               5                   10

<210> SEQ ID NO 68
<211> LENGTH: 30
<212> TYPE: PRT
<213> ORGANISM: Artificial Sequence
<220> FEATURE:
<223> OTHER INFORMATION: Synthetic: VHFR3

<400> SEQUENCE: 68

Arg Val Thr Met Thr Arg Asp Thr Ser Ile Ser Thr Ala Tyr Met Glu
1               5                   10                  15

Leu Ser Arg Leu Arg Ser Asp Asp Thr Ala Val Tyr Tyr Cys
            20                  25                  30

```
<210> SEQ ID NO 69
<211> LENGTH: 11
<212> TYPE: PRT
<213> ORGANISM: Artificial Sequence
<220> FEATURE:
<223> OTHER INFORMATION: Synthetic: VHFR4

<400> SEQUENCE: 69

Trp Gly Gln Gly Thr Thr Val Thr Val Ser Ser
1               5                   10

<210> SEQ ID NO 70
<211> LENGTH: 23
<212> TYPE: PRT
<213> ORGANISM: Artificial Sequence
<220> FEATURE:
<223> OTHER INFORMATION: Synthetic: VLFR1

<400> SEQUENCE: 70

Asp Ile Gln Met Thr Gln Ser Pro Ser Ser Val Ser Ala Ser Val Gly
1               5                   10                  15

Asp Arg Val Thr Ile Thr Cys
            20

<210> SEQ ID NO 71
<211> LENGTH: 15
<212> TYPE: PRT
<213> ORGANISM: Artificial Sequence
<220> FEATURE:
<223> OTHER INFORMATION: Synthetic: VLFR2

<400> SEQUENCE: 71

Trp Tyr Gln Gln Lys Pro Gly Lys Ala Pro Lys Leu Leu Ile Tyr
1               5                   10                  15

<210> SEQ ID NO 72
<211> LENGTH: 32
<212> TYPE: PRT
<213> ORGANISM: Artificial Sequence
<220> FEATURE:
<223> OTHER INFORMATION: Synthetic: VLFR3

<400> SEQUENCE: 72

Gly Val Pro Ser Arg Phe Ser Gly Ser Gly Ser Gly Thr Asp Phe Thr
1               5                   10                  15

Leu Thr Ile Ser Ser Leu Gln Pro Glu Asp Phe Ala Thr Tyr Tyr Cys
            20                  25                  30

<210> SEQ ID NO 73
<211> LENGTH: 10
<212> TYPE: PRT
<213> ORGANISM: Artificial Sequence
<220> FEATURE:
<223> OTHER INFORMATION: Synthetic: VLFR4

<400> SEQUENCE: 73

Phe Gly Gly Gly Thr Lys Val Glu Ile Lys
1               5                   10

<210> SEQ ID NO 74
<211> LENGTH: 452
<212> TYPE: PRT
<213> ORGANISM: Artificial Sequence
<220> FEATURE:
<223> OTHER INFORMATION: Synthetic: mAb1 heavy chain

<400> SEQUENCE: 74
```

```
Gln Val Gln Leu Val Gln Ser Gly Ala Glu Lys Lys Pro Gly Ala
1               5                   10                  15

Ser Val Lys Val Ser Cys Lys Ala Ser Gly Tyr Thr Phe Thr Gly Tyr
            20                  25                  30

Tyr Met His Trp Val Arg Gln Ala Pro Gly Gln Gly Leu Glu Trp Met
            35                  40                  45

Gly Trp Ile Asn Pro Asn Ser Gly Gly Thr Lys Tyr Ala Gln Lys Phe
50                  55                  60

Gln Gly Arg Val Thr Met Thr Arg Asp Thr Ser Ile Ser Thr Ala Tyr
65                  70                  75                  80

Met Glu Leu Ser Arg Leu Arg Ser Asp Asp Thr Ala Val Tyr Tyr Cys
            85                  90                  95

Ala Arg Arg His Ser Asp Met Ile Gly Tyr Tyr Tyr Gly Met Asp Val
            100                 105                 110

Trp Gly Gln Gly Thr Thr Val Thr Val Ser Ser Ala Ser Thr Lys Gly
            115                 120                 125

Pro Ser Val Phe Pro Leu Ala Pro Ser Ser Lys Ser Thr Ser Gly Gly
            130                 135                 140

Thr Ala Ala Leu Gly Cys Leu Val Lys Asp Tyr Phe Pro Glu Pro Val
145                 150                 155                 160

Thr Val Ser Trp Asn Ser Gly Ala Leu Thr Ser Gly Val His Thr Phe
            165                 170                 175

Pro Ala Val Leu Gln Ser Ser Gly Leu Tyr Ser Leu Ser Ser Val Val
            180                 185                 190

Thr Val Pro Ser Ser Ser Leu Gly Thr Gln Thr Tyr Ile Cys Asn Val
            195                 200                 205

Asn His Lys Pro Ser Asn Thr Lys Val Asp Lys Lys Val Glu Pro Lys
            210                 215                 220

Ser Cys Asp Lys Thr His Thr Cys Pro Pro Cys Pro Ala Pro Glu Leu
225                 230                 235                 240

Leu Gly Gly Pro Ser Val Phe Leu Phe Pro Pro Lys Pro Lys Asp Thr
            245                 250                 255

Leu Met Ile Ser Arg Thr Pro Glu Val Thr Cys Val Val Val Asp Val
            260                 265                 270

Ser His Glu Asp Pro Glu Val Lys Phe Asn Trp Tyr Val Asp Gly Val
            275                 280                 285

Glu Val His Asn Ala Lys Thr Lys Pro Arg Glu Glu Gln Tyr Ala Ser
290                 295                 300

Thr Tyr Arg Val Val Ser Val Leu Thr Val Leu His Gln Asp Trp Leu
305                 310                 315                 320

Asn Gly Lys Glu Tyr Lys Cys Lys Val Ser Asn Lys Ala Leu Pro Ala
            325                 330                 335

Pro Ile Glu Lys Thr Ile Ser Lys Ala Lys Gly Gln Pro Arg Glu Pro
            340                 345                 350

Gln Val Tyr Thr Leu Pro Pro Ser Arg Asp Glu Leu Thr Lys Asn Gln
            355                 360                 365

Val Ser Leu Thr Cys Leu Val Lys Gly Phe Tyr Pro Ser Asp Ile Ala
370                 375                 380

Val Glu Trp Glu Ser Asn Gly Gln Pro Glu Asn Asn Tyr Lys Thr Thr
385                 390                 395                 400

Pro Pro Val Leu Asp Ser Asp Gly Ser Phe Phe Leu Tyr Ser Lys Leu
            405                 410                 415
```

```
Thr Val Asp Lys Ser Arg Trp Gln Gln Gly Asn Val Phe Ser Cys Ser
            420                 425                 430

Val Met His Glu Ala Leu His Asn His Tyr Thr Gln Lys Ser Leu Ser
        435                 440                 445

Leu Ser Pro Gly
        450

<210> SEQ ID NO 75
<211> LENGTH: 214
<212> TYPE: PRT
<213> ORGANISM: Artificial Sequence
<220> FEATURE:
<223> OTHER INFORMATION: Synthetic: mAb1 light chain

<400> SEQUENCE: 75

Asp Ile Gln Met Thr Gln Ser Pro Ser Ser Val Ser Ala Ser Val Gly
1               5                   10                  15

Asp Arg Val Thr Ile Thr Cys Arg Ala Ser Gln Gly Ile Ser Ser Trp
            20                  25                  30

Leu Ala Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ala Thr Asp Phe Pro Pro
                85                  90                  95

Thr Phe Gly Gly Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
        210

<210> SEQ ID NO 76
<211> LENGTH: 13
<212> TYPE: PRT
<213> ORGANISM: Artificial Sequence
<220> FEATURE:
<223> OTHER INFORMATION: Synthetic: HCDR2.a

<400> SEQUENCE: 76

Gly Trp Ile Asn Pro Asn Ser Gly Gly Thr Lys Tyr Ala
1               5                   10

<210> SEQ ID NO 77
<211> LENGTH: 13
<212> TYPE: PRT
<213> ORGANISM: Artificial Sequence
```

```
<220> FEATURE:
<223> OTHER INFORMATION: Synthetic: HCDR2.1a

<400> SEQUENCE: 77

Gly Trp Ile Asn Ala Asn Ser Gly Gly Thr Lys Tyr Ala
1               5                   10

<210> SEQ ID NO 78
<211> LENGTH: 13
<212> TYPE: PRT
<213> ORGANISM: Artificial Sequence
<220> FEATURE:
<223> OTHER INFORMATION: Synthetic: HCDR2.2a

<400> SEQUENCE: 78

Gly Trp Ile Asn Ser Asn Ser Gly Gly Thr Lys Tyr Ala
1               5                   10

<210> SEQ ID NO 79
<211> LENGTH: 13
<212> TYPE: PRT
<213> ORGANISM: Artificial Sequence
<220> FEATURE:
<223> OTHER INFORMATION: Synthetic: HCDR2.3a

<400> SEQUENCE: 79

Gly Trp Ile Asn Val Asn Ser Gly Val Thr Lys Tyr Ala
1               5                   10

<210> SEQ ID NO 80
<211> LENGTH: 13
<212> TYPE: PRT
<213> ORGANISM: Artificial Sequence
<220> FEATURE:
<223> OTHER INFORMATION: Synthetic: HCDR2.4a

<400> SEQUENCE: 80

Gly Trp Ile Asn Pro Asn Ser Gly Gly Thr Lys Tyr Ala
1               5                   10

<210> SEQ ID NO 81
<211> LENGTH: 7
<212> TYPE: PRT
<213> ORGANISM: Artificial Sequence
<220> FEATURE:
<223> OTHER INFORMATION: Synthetic: LCDR2.1a

<400> SEQUENCE: 81

Ala Ala Ser Arg Leu Gln Ser
1               5

<210> SEQ ID NO 82
<211> LENGTH: 7
<212> TYPE: PRT
<213> ORGANISM: Artificial Sequence
<220> FEATURE:
<223> OTHER INFORMATION: Synthetic: LCDR2.2a

<400> SEQUENCE: 82

Ala Ala Ser Ser Leu Gln Ser
1               5

<210> SEQ ID NO 83
<211> LENGTH: 7
<212> TYPE: PRT
<213> ORGANISM: Artificial Sequence
<220> FEATURE:
```

<223> OTHER INFORMATION: Synthetic: LCDR2.3a

<400> SEQUENCE: 83

Thr Ala Ser Ser Leu Gln Ser
1               5

<210> SEQ ID NO 84
<211> LENGTH: 7
<212> TYPE: PRT
<213> ORGANISM: Artificial Sequence
<220> FEATURE:
<223> OTHER INFORMATION: Synthetic: LCDR2.4a

<400> SEQUENCE: 84

Ala Ala Ser Thr Leu Gln Ser
1               5

<210> SEQ ID NO 85
<211> LENGTH: 35
<212> TYPE: PRT
<213> ORGANISM: Artificial Sequence
<220> FEATURE:
<223> OTHER INFORMATION: Synthetic: VHFR3.a

<400> SEQUENCE: 85

Gln Lys Phe Gln Gly Arg Val Thr Met Thr Arg Asp Thr Ser Ile Ser
1               5                   10                  15

Thr Ala Tyr Met Glu Leu Ser Arg Leu Arg Ser Asp Asp Thr Ala Val
            20                  25                  30

Tyr Tyr Cys
        35

<210> SEQ ID NO 86
<211> LENGTH: 107
<212> TYPE: PRT
<213> ORGANISM: Artificial Sequence
<220> FEATURE:
<223> OTHER INFORMATION: Synthetic: VL1a amino acid sequence

<400> SEQUENCE: 86

Asp Ile Gln Met Thr Gln Ser Pro Ser Ser Val Ser Ala Ser Val Gly
1               5                   10                  15

Asp Arg Val Thr Ile Thr Cys Arg Ala Ser Gln Gly Ile Ser Ser Trp
            20                  25                  30

Leu Ala Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ala Thr Asp Phe Pro Pro
                85                  90                  95

Thr Phe Gly Gly Gly Thr Lys Val Glu Ile Lys
            100                 105

<210> SEQ ID NO 87
<211> LENGTH: 123
<212> TYPE: PRT
<213> ORGANISM: Artificial Sequence
<220> FEATURE:
<223> OTHER INFORMATION: Synthetic: VH2 amino acid sequence

<400> SEQUENCE: 87

```
Gln Val Gln Leu Val Gln Ser Gly Ala Glu Val Lys Pro Gly Ala
1               5                   10                  15

Ser Val Lys Val Ser Cys Lys Ala Ser Gly Tyr Thr Phe Ser Asn Tyr
            20                  25                  30

Tyr Ile His Trp Val Arg Gln Ala Pro Gly Gln Gly Leu Glu Trp Met
            35                  40                  45

Gly Trp Ile Asn Ala Asn Ser Gly Gly Thr Lys Tyr Ala Gln Lys Phe
        50                  55                  60

Gln Gly Arg Val Thr Met Thr Arg Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Arg Arg His Ser Asp Met Ile Gly Tyr Tyr Gly Met Asp Val
            100                 105                 110

Trp Gly Gln Gly Thr Thr Val Thr Val Ser Ser
        115                 120
```

<210> SEQ ID NO 88
<211> LENGTH: 107
<212> TYPE: PRT
<213> ORGANISM: Artificial Sequence
<220> FEATURE:
<223> OTHER INFORMATION: Synthetic: VL2 amino acid sequence

<400> SEQUENCE: 88

```
Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Asp Arg Tyr
            20                  25                  30

Leu Asn Trp Tyr Gln Gln Lys Pro Gly Lys Ala Pro Lys Leu Leu Ile
            35                  40                  45

Tyr Ala Ala Ser Arg Leu Gln Ser Gly Val Pro Ser Arg Phe Ser Gly
        50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ala Asn Ser Phe Pro Pro
                85                  90                  95

Thr Phe Gly Gln Gly Thr Arg Leu Glu Ile Lys
            100                 105
```

<210> SEQ ID NO 89
<211> LENGTH: 123
<212> TYPE: PRT
<213> ORGANISM: Artificial Sequence
<220> FEATURE:
<223> OTHER INFORMATION: Synthetic: VH3 amino acid sequence

<400> SEQUENCE: 89

```
Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Asn Gly Tyr
            20                  25                  30

Tyr Ile His Trp Val Arg Gln Ala Pro Gly Gln Gly Leu Glu Trp Met
            35                  40                  45

Gly Trp Ile Asn Ser Asn Ser Gly Gly Thr Lys Tyr Ala Gln Lys Phe
        50                  55                  60

Gln Gly Arg Val Thr Met Thr Arg Asp Thr Ser Ile Ser Thr Ala Tyr
```

```
            65                  70                  75                  80
Met Glu Leu Ser Arg Leu Arg Ser Asp Asp Thr Ala Val Tyr Tyr Cys
                    85                  90                  95

Ala Arg Arg His Ser Asp Met Ile Gly Tyr Tyr Tyr Gly Met Asp Val
                100                 105                 110

Trp Gly Gln Gly Thr Thr Val Thr Val Ser Ser
            115                 120
```

<210> SEQ ID NO 90
<211> LENGTH: 107
<212> TYPE: PRT
<213> ORGANISM: Artificial Sequence
<220> FEATURE:
<223> OTHER INFORMATION: Synthetic: VL3 amino acid sequence

<400> SEQUENCE: 90

```
Asp Ile Gln Met Thr Gln Ser Pro Ser Ser Val Ser Ala Ser Val Gly
1               5                   10                  15

Asp Arg Val Thr Ile Thr Cys Arg Ala Ser Gln Gly Ile Ser Ser Trp
            20                  25                  30

Leu Ala Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ala Thr Asp Phe Pro Pro
                85                  90                  95

Thr Phe Gly Gly Gly Thr Lys Val Glu Ile Lys
            100                 105
```

<210> SEQ ID NO 91
<211> LENGTH: 123
<212> TYPE: PRT
<213> ORGANISM: Artificial Sequence
<220> FEATURE:
<223> OTHER INFORMATION: Synthetic: VH4 amino acid sequence

<400> SEQUENCE: 91

```
Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Asn Tyr
            20                  25                  30

Tyr Met His Trp Val Arg Gln Ala Pro Gly Gln Gly Leu Glu Trp Met
        35                  40                  45

Gly Trp Ile Asn Val Asn Ser Gly Val Thr Lys Tyr Ala Gln Lys Phe
    50                  55                  60

Gln Gly Arg Val Thr Met Thr Arg Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Arg Arg His Ser Asp Met Ile Gly Tyr Tyr Tyr Gly Met Asp Val
            100                 105                 110

Trp Gly Gln Gly Thr Thr Val Thr Val Ser Ser
        115                 120
```

<210> SEQ ID NO 92
<211> LENGTH: 123

```
<212> TYPE: PRT
<213> ORGANISM: Artificial Sequence
<220> FEATURE:
<223> OTHER INFORMATION: Synthetic: VH5 amino acid sequence

<400> SEQUENCE: 92

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Gly Tyr
            20                  25                  30

Tyr Met His Trp Val Arg Gln Ala Pro Gly Gln Gly Leu Glu Trp Met
        35                  40                  45

Gly Trp Ile Asn Pro Asn Ser Gly Gly Thr Lys Tyr Ala Gln Lys Phe
    50                  55                  60

Gln Gly Arg Val Thr Met Thr Arg Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Arg Arg His Ser Asp Met Ile Gly Tyr Tyr Gly Met Asp Val
            100                 105                 110

Trp Gly Gln Gly Thr Thr Val Thr Val Ser Ser
        115                 120

<210> SEQ ID NO 93
<211> LENGTH: 107
<212> TYPE: PRT
<213> ORGANISM: Artificial Sequence
<220> FEATURE:
<223> OTHER INFORMATION: Synthetic: VL4 amino acid sequence

<400> SEQUENCE: 93

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Leu Phe
            20                  25                  30

Leu Asn Trp Tyr Gln Gln Lys Pro Gly Lys Ala Pro Lys Leu Leu Ile
        35                  40                  45

Tyr Thr Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ala Asn Ser Phe Pro Pro
                85                  90                  95

Thr Phe Gly Gly Gly Thr Lys Val Asp Ile Lys
            100                 105

<210> SEQ ID NO 94
<211> LENGTH: 107
<212> TYPE: PRT
<213> ORGANISM: Artificial Sequence
<220> FEATURE:
<223> OTHER INFORMATION: Synthetic: VL5 amino acid sequence

<400> SEQUENCE: 94

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile Ser Val Tyr
            20                  25                  30

Leu Asn Trp Tyr Gln Gln Lys Pro Gly Lys Ala Pro Lys Leu Leu Ile
```

```
                35                  40                  45
Tyr Thr Ala Ser Ser Leu Gln Ser Gly Val Pro Ser Arg Phe Ser Gly
        50                  55                  60
Ser Gly Ser Gly Thr Asp Phe Thr Leu Thr Ile Ser Ser Leu Gln Pro
 65                  70                  75                  80
Glu Asp Phe Ala Thr Tyr Tyr Cys Gln Gln Ala Asn Ser Phe Pro Pro
                85                  90                  95
Thr Phe Gly Gly Gly Thr Lys Val Asp Ile Lys
            100                 105
```

<210> SEQ ID NO 95
<211> LENGTH: 107
<212> TYPE: PRT
<213> ORGANISM: Artificial Sequence
<220> FEATURE:
<223> OTHER INFORMATION: Synthetic: VL6 amino acid sequence

<400> SEQUENCE: 95

```
Asp Ile Gln Leu Thr Gln Ser Pro Ser Ser Leu Ser Ala Ser Val Gly
 1               5                  10                  15
Asp Arg Val Thr Ile Thr Cys Arg Ala Ser Gln Ser Ile Ser Ser Tyr
            20                  25                  30
Leu Asn Trp Tyr Gln Gln Lys Pro Gly Lys Val Pro Lys Leu Leu Ile
        35                  40                  45
Tyr Ala Ala Ser Thr Leu Gln Ser Gly Val Pro Ser Arg Phe Ser Gly
        50                  55                  60
Ser Gly Ser Gly Thr Asp Phe Thr Leu Thr Ile Ser Ser Leu Gln Pro
 65                  70                  75                  80
Glu Asp Phe Ala Thr Tyr Ser Cys Gln Gln Thr Asn Ser Phe Pro Pro
                85                  90                  95
Thr Phe Gly Gln Gly Thr Lys Val Glu Ile Lys
            100                 105
```

<210> SEQ ID NO 96
<211> LENGTH: 107
<212> TYPE: PRT
<213> ORGANISM: Artificial Sequence
<220> FEATURE:
<223> OTHER INFORMATION: Synthetic: VL7 amino acid sequence

<400> SEQUENCE: 96

```
Asp Ile Gln Met Thr Gln Ser Pro Ser Ser Leu Ser Ala Ser Val Gly
 1               5                  10                  15
Asp Arg Val Thr Ile Thr Cys Arg Ala Ser Gln Ser Ile Ser Ser Tyr
            20                  25                  30
Leu Asn Trp Tyr Gln Gln Lys Pro Gly Lys Ala Pro Lys Leu Leu Ile
        35                  40                  45
Tyr Ala Ala Ser Ser Leu Gln Ser Gly Val Pro Ser Arg Phe Ser Gly
        50                  55                  60
Ser Gly Ser Gly Thr Asp Phe Thr Leu Thr Ile Ser Ser Leu Gln Pro
 65                  70                  75                  80
Glu Asp Phe Ala Thr Tyr Tyr Cys Gln Gln Ala Asn Thr Phe Pro Pro
                85                  90                  95
Thr Phe Gly Gln Gly Thr Arg Leu Glu Ile Lys
            100                 105
```

<210> SEQ ID NO 97
<211> LENGTH: 123

```
<212> TYPE: PRT
<213> ORGANISM: Artificial Sequence
<220> FEATURE:
<223> OTHER INFORMATION: Synthetic: VH6 amino acid sequence

<400> SEQUENCE: 97

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Ser Asn Tyr
            20                  25                  30

Tyr Ile His Trp Val Arg Gln Ala Pro Gly Gln Gly Leu Glu Trp Met
        35                  40                  45

Gly Trp Ile Asn Ala Asn Ser Gly Gly Thr Lys Tyr Ala Gln Lys Phe
    50                  55                  60

Gln Gly Arg Val Thr Met Thr Arg Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Arg Arg His Ser Asp Met Ile Gly Tyr Tyr Gly Met Asp Val
            100                 105                 110

Trp Gly Gln Gly Thr Thr Val Thr Val Ser Ser
        115                 120

<210> SEQ ID NO 98
<211> LENGTH: 13
<212> TYPE: PRT
<213> ORGANISM: Artificial Sequence
<220> FEATURE:
<223> OTHER INFORMATION: Synthetic: VHFR2.a

<400> SEQUENCE: 98

Trp Val Arg Gln Ala Pro Gly Gln Gly Leu Glu Trp Met
1               5                   10

<210> SEQ ID NO 99
<211> LENGTH: 13
<212> TYPE: PRT
<213> ORGANISM: Artificial Sequence
<220> FEATURE:
<223> OTHER INFORMATION: Synthetic: peptide
<220> FEATURE:
<221> NAME/KEY: misc_feature
<222> LOCATION: (4)..(5)
<223> OTHER INFORMATION: Xaa can be any naturally occurring amino acid
<220> FEATURE:
<221> NAME/KEY: misc_feature
<222> LOCATION: (7)..(7)
<223> OTHER INFORMATION: Xaa can be any naturally occurring amino acid
<220> FEATURE:
<221> NAME/KEY: misc_feature
<222> LOCATION: (11)..(12)
<223> OTHER INFORMATION: Xaa can be any naturally occurring amino acid

<400> SEQUENCE: 99

Arg His Ser Xaa Xaa Ile Xaa Tyr Tyr Tyr Xaa Xaa Asp
1               5                   10

<210> SEQ ID NO 100
<211> LENGTH: 13
<212> TYPE: PRT
<213> ORGANISM: Artificial Sequence
<220> FEATURE:
<223> OTHER INFORMATION: Synthetic: peptide
<220> FEATURE:
<221> NAME/KEY: misc_feature
<222> LOCATION: (4)..(4)
```

```
<223> OTHER INFORMATION: Xaa can be any naturally occurring amino acid
<220> FEATURE:
<221> NAME/KEY: misc_feature
<222> LOCATION: (11)..(12)
<223> OTHER INFORMATION: Xaa can be any naturally occurring amino acid

<400> SEQUENCE: 100

Arg His Ser Xaa Met Ile Gly Tyr Tyr Tyr Xaa Xaa Asp
1               5                   10

<210> SEQ ID NO 101
<211> LENGTH: 13
<212> TYPE: PRT
<213> ORGANISM: Artificial Sequence
<220> FEATURE:
<223> OTHER INFORMATION: Synthetic: peptide
<220> FEATURE:
<221> NAME/KEY: misc_feature
<222> LOCATION: (4)..(4)
<223> OTHER INFORMATION: Xaa can be any naturally occurring amino acid
<220> FEATURE:
<221> NAME/KEY: misc_feature
<222> LOCATION: (5)..(5)
<223> OTHER INFORMATION: Xaa can be any non-polar amino acid; in some
    embodiments, Xaa is methionine
<220> FEATURE:
<221> NAME/KEY: misc_feature
<222> LOCATION: (7)..(7)
<223> OTHER INFORMATION: Xaa can be any non-polar amino acid; in some
    embodiments, Xaa is glycine
<220> FEATURE:
<221> NAME/KEY: misc_feature
<222> LOCATION: (11)..(11)
<223> OTHER INFORMATION: Xaa can be any naturally occurring amino acid
<220> FEATURE:
<221> NAME/KEY: misc_feature
<222> LOCATION: (12)..(12)
<223> OTHER INFORMATION: Xaa can be any naturally occurring amino acid

<400> SEQUENCE: 101

Arg His Ser Xaa Xaa Ile Xaa Tyr Tyr Tyr Xaa Xaa Asp
1               5                   10

<210> SEQ ID NO 102
<211> LENGTH: 9
<212> TYPE: PRT
<213> ORGANISM: Artificial Sequence
<220> FEATURE:
<223> OTHER INFORMATION: Synthetic: peptide

<400> SEQUENCE: 102

Ser Leu Leu Met Trp Ile Thr Gln Cys
1               5
```

ANTIBODIES THAT BIND CD277 AND USES THEREOF

CROSS REFERENCE TO RELATED APPLICATIONS

This application is a 35 U.S.C. § 371 U.S. National Stage Entry of International Application No. PCT/US2019/046061 filed Aug. 9, 2019, which claims the benefit of priority to U.S. Provisional Patent Application No. 62/716,551, filed Aug. 9, 2018, entitled "ANTIBODIES THAT BIND CD277 AND USES THEREOF", the contents of each of which are herein incorporated by reference in their entirety.

REFERENCE TO APPENDIX

The present application contains a Sequence Listing in electronic .txt format. The Sequence Listing file, entitled "520097_5010155_Seq_Listing_ST25.txt," was created on Jul. 10, 2024, and is 83,546 bytes in size. The information in electronic format of the Sequence Listing is incorporated herein by reference in its entirety.

BACKGROUND

Immune cells, such as T cells, macrophages, and natural killer (NK) cells, can exhibit anti-tumor activity and effectively control the occurrence and growth of malignant tumors. Tumor-specific or -associated antigens can induce immune cells to recognize and eliminate malignancies (Chen & Mellman, (2013) *Immunity* 39 (1): 1-10). In spite of the existence of tumor-specific immune responses, malignant tumors often evade or avoid immune attack through a variety of immunomodulatory mechanisms resulting in the failure to control tumor occurrence and progression (Motz & Coukos, (2013) *Immunity* 39 (1): 61-73).

T cells play critical roles in effective immune responses by acting as effector cells, influencing B cell production of antibodies, and providing immune memory within the host. T cells can be subdivided into two major subpopulations, αβ T cells and γδ T cells, which reflect the corresponding surface expression of T cell receptors (TCR) αβ and γδ. Among others, αβ T cells recognize non-self-peptide fragments restricted by MHC molecules; γδ T cells recognize unconventional antigens.

γδ T cells are important effectors in an immune response. These T cells lyse pathogen-infected cell and abnormal cells. In addition, these T cells regulate immune responses by inducing dendritic cell (DC) maturation as well as the isotypic switching and immunoglobulin production. This aspect of the immune system is regulated by surface receptors, chemokines and cytokines. Modulation of T cell activity may offer opportunities for improved therapies for cancer.

SUMMARY OF DISCLOSURE

The present disclosure is based, in part, on the discovery of novel antibodies that bind to CD277. As described herein, the antibodies have anti-tumor efficacy in vivo. Moreover, the antibodies induce or enhance CD277-mediated γδ T cell stimulation. The antibodies also relieve or reduce CD277-mediated inhibition of αβ T cells. Without wishing to be bound by theory, the increased activity of one or both of γδ T cells and αβ T cells enhance anti-tumor immune responses in a subject, resulting in the observed anti-tumor efficacy of the antibodies. Thus, the antibodies (and antigen-binding fragments thereof) described herein are useful for, among other things, treating cancer.

Accordingly, the disclosure provides an isolated monoclonal antibody that specifically binds human CD277, or an antigen-binding portion thereof, wherein the antibody or antigen-binding portion comprises a heavy chain CDR3 comprising the amino acid sequence RHSXXIXYYYXXD (SEQ ID NO: 99), wherein X is any amino acid. In some aspects, the disclosure provides an isolated monoclonal antibody that specifically binds human CD277, or an antigen-binding portion thereof, wherein the antibody or antigen-binding portion comprises a heavy chain CDR3 comprising the amino acid sequence RHSXMIGYYYXXD (SEQ ID NO: 100), wherein X is any amino acid. In any of the foregoing aspects and embodiments, X is any amino acid except for alanine.

In other aspects, the disclosure provides an isolated monoclonal antibody that specifically binds human CD277, or an antigen-binding portion thereof, wherein the antibody or antigen-binding portion comprises a heavy chain CDR3 comprising the amino acid sequence RHSX$_1$X$_2$IX$_3$YYYX$_4$X$_5$D (SEQ ID NO: 101), wherein X$_1$ is any amino acid, X$_2$ is a non-polar amino acid, wherein Xx is a non-polar amino acid, wherein X$_4$ is any amino acid, and wherein X$_5$ is any amino acid. In some embodiments of these aspects, X$_2$ is methionine and X$_3$ is glycine.

In any of the foregoing aspects and embodiments thereof, mutation of residues R95, H96, S97, I100, Y100B, Y100C, Y100D, D101, or combinations thereof, of the heavy chain CDR3, results in loss of binding to human CD277. In some embodiments of these aspects, mutation of residues M99, G100A or combinations thereof, to alanine, results in reduction of binding to human CD277. In other embodiments of these aspects, mutation of residues M99, G100A or combinations thereof, to any residue except alanine results in an increase in binding to human CD277.

In any of the foregoing aspects and embodiments thereof, the antibody or antigen binding portion thereof comprises heavy and light chain CDRs selected from the group consisting of:

(a) heavy chain CDR1, CDR2 and CDR3 sequences set forth in SEQ ID NOs: 7-9, respectively, and light chain CDR1, CDR2 and CDR3 sequences set forth in SEQ ID NOs: 10-12, respectively;

(b) heavy chain CDR1, CDR2 and CDR3 sequences set forth in SEQ ID NOs: 43, 47 and 9, respectively, and light chain CDR1, CDR2 and CDR3 sequences set forth in SEQ ID NOs: 52, 58 and 62, respectively;

(c) heavy chain CDRI, CDR2 and CDR3 sequences set forth in SEQ ID NOs: 45, 49 and 9, respectively, and light chain CDR1, CDR2 and CDR3 sequences set forth in SEQ ID NOs: 57, 59 and 65, respectively;

(d) heavy chain CDR1, CDR2 and CDR3 sequences set forth in SEQ ID NOs: 44, 48 and 9 respectively, and light chain CDR1, CDR2 and CDR3 sequences set forth in SEQ ID NOs: 57, 61 and 64, respectively:

(e) heavy chain CDR1, CDR2 and CDR3 sequences set forth in SEQ ID NOs: 46, 50 and 9, respectively, and light chain CDR1, CDR2 and CDR3 sequences set forth in SEQ ID NOs: 56, 58 and 61, respectively;

(f) heavy chain CDR1, CDR2 and CDR3 sequences set forth in SEQ ID NOs: 46, 50 and 9, respectively, and light chain CDR1, CDR2 and CDR3 sequences set forth in SEQ ID NOs: 55, 60 and 62, respectively;

(g) heavy chain CDR1. CDR2 and CDR3 sequences set forth in SEQ ID NOs: 46, 50 and 9, respectively, and light chain CDR1, CDR2 and CDR3 sequences set forth in SEQ ID NOs: 54, 60 and 62, respectively;
(h) heavy chain CDR1, CDR2 and CDR3 sequences set forth in SEQ ID NOs: 43, 47 and 9, respectively, and light chain CDR1, CDR2 and CDR3 sequences set forth in SEQ ID NOs: 53, 59 and 63, respectively;
(i) heavy chain CDR1, CDR2 and CDR3 sequences set forth in SEQ ID NOs: 45, 49 and 9, respectively, and light chain CDR1, CDR2 and CDR3 sequences set forth in SEQ ID NOs: 53, 59 and 63, respectively;
(j) heavy chain CDR1, CDR2 and CDR3 sequences set forth in SEQ ID NOs: 44, 48 and 9, respectively, and light chain CDR1, CDR2 and CDR3 sequences set forth in SEQ ID NOs: 53, 59 and 63, respectively; and
(k) heavy chain CDR1, CDR2 and CDR3 sequences set forth in SEQ ID NOs: 43, 47 and 9, respectively, and light chain CDR1, CDR2 and CDR3 sequences set forth in SEQ ID NOs: 52, 58 and 62, respectively.

In other aspects, the antibody or antigen binding portion thereof comprises heavy and light chain variable regions, wherein the heavy chain variable region comprises an amino acid sequence selected from the group consisting of SEQ ID NOs: 3, 32, 34, 36, 37, and 42; and wherein the light chain variable region comprises an amino acid sequence selected from the group consisting of SEQ ID NOs: 4, 33, 35, 38, 39, 40 and 41.

In other aspects, the antibody or antigen binding portion thereof comprises a heavy chain variable region of an amino acid sequence selected from the group consisting of SEQ ID NOs: 3, 32, 34, 36, 37, and 42; and a light chain variable region of an amino acid sequence selected from the group consisting of SEQ ID NOs: 4, 33, 35, 38, 39, 40 and 41.

In yet further aspects, the antibody or antigen binding portion thereof comprises heavy and light chain variable regions of an amino acid sequence selected from the group consisting of:
(a) SEQ ID NO: 3 and 4, respectively;
(b) SEQ ID NO: 42 and 41, respectively;
(c) SEQ ID NO:36 and 41, respectively;
(d) SEQ ID NO: 34 and 40, respectively;
(e) SEQ ID NO: 37 and 33, respectively;
(f) SEQ ID NO: 37 and 39, respectively;
(g) SEQ ID NO: 37 and 38, respectively;
(h) SEQ ID NO: 32 and 35, respectively;
(i) SEQ ID NO: 36 and 35, respectively;
(j) SEQ ID NO: 34 and 35, respectively; and
(k) SEQ ID NO: 32 and 33, respectively.

In other aspects, the antibody or antigen binding portion thereof comprises heavy and light chain variable regions, wherein the heavy chain variable region comprises an amino acid sequence which is at least 90% identical to the amino acid sequence selected from the group consisting of SEQ ID NOs: 3, 32, 34, 36, 37, and 42; and wherein the light chain variable region comprises an amino acid sequence which is at least 90% identical to the amino acid sequence selected from the group consisting of SEQ ID NOs: 4, 33, 35, 38, 39, 40 and 41.

In other aspects, the antibody or antigen binding portion thereof comprises heavy and light chain variable regions, wherein the heavy chain variable region is at least 90% identical to the heavy chain variable region of an amino acid sequence selected from the group consisting of SEQ ID NOs: 3, 32, 34, 36, 37, and 42; and wherein the light chain variable region is at least 90% identical to the light chain variable region of an amino acid sequence selected from the group consisting of SEQ ID NOs: 4, 33, 35, 38, 39, 40 and 41.

In some aspects, the antibody or antigen binding portion thereof comprises heavy and light chain variable regions comprising amino acid sequences at least 90% identical to the amino acid sequences selected from the group consisting of:
(a) SEQ ID NO: 3 and 4, respectively;
(b) SEQ ID NO: 42 and 41, respectively;
(c) SEQ ID NO: 36 and 41, respectively;
(d) SEQ ID NO: 34 and 40, respectively;
(e) SEQ ID NO: 37 and 33, respectively;
(f) SEQ ID NO: 37 and 39, respectively;
(g) SEQ ID NO: 37 and 38, respectively;
(h) SEQ ID NO: 32 and 35, respectively;
(i) SEQ ID NO: 36 and 35, respectively;
(j) SEQ ID NO: 34 and 35, respectively; and
(k) SEQ ID NO: 32 and 33, respectively.

In some aspects, the antibody or antigen binding portion thereof comprises heavy and light chain variable regions comprising amino acid sequences at least 90% identical to the heavy and light chain variable regions of amino acid sequences selected from the group consisting of:
(a) SEQ ID NO: 3 and 4, respectively;
(b) SEQ ID NO: 42 and 41, respectively;
(c) SEQ ID NO: 36 and 41, respectively;
(d) SEQ ID NO: 34 and 40, respectively;
(e) SEQ ID NO: 37 and 33, respectively;
(f) SEQ ID NO: 37 and 39, respectively;
(g) SEQ ID NO: 37 and 38, respectively;
(h) SEQ ID NO: 32 and 35, respectively;
(i) SEQ ID NO: 36 and 35, respectively;
(j) SEQ ID NO: 34 and 35, respectively; and
(k) SEQ ID NO: 32 and 33, respectively.

In any of the foregoing aspects, the antibody comprises a heavy chain comprising the amino acid sequence set forth in SEQ ID NO: 74, and a light chain comprising the amino acid sequence set forth in SEQ ID NO: 75.

In other aspects, the antibody comprises a heavy chain comprising an amino acid sequence at least 90% identical to SEQ ID NO: 74, and a light chain comprising an amino acid sequence at least 90% identical to SEQ ID NO: 75.

In other aspects, the disclosure provides an isolated monoclonal antibody that specifically binds human CD277, or an antigen-binding portion thereof, wherein the antibody or antigen binding portion thereof comprises heavy and light chain CDRs selected from the group consisting of:
(a) heavy chain CDR1, CDR2 and CDR3 sequences set forth in SEQ ID NOs: 7-9, respectively, and light chain CDR1, CDR2 and CDR3 sequences set forth in SEQ ID NOs: 10-12, respectively;
(b) heavy chain CDR1, CDR2 and CDR3 sequences set forth in SEQ ID NOs: 43, 47 and 9, respectively, and light chain CDR1, CDR2 and CDR3 sequences set forth in SEQ ID NOs: 52, 58 and 62, respectively;
(c) heavy chain CDR1, CDR2 and CDR3 sequences set forth in SEQ ID NOs: 45, 49 and 9, respectively, and light chain CDR1, CDR2 and CDR3 sequences set forth in SEQ ID NOs: 57, 59 and 65, respectively;
(d) heavy chain CDR1, CDR2 and CDR3 sequences set forth in SEQ ID NOs: 44, 48 and 9 respectively, and light chain CDR1, CDR2 and CDR3 sequences set forth in SEQ ID NOs: 57, 61 and 64, respectively;
(e) heavy chain CDR1, CDR2 and CDR3 sequences set forth in SEQ ID NOs: 46, 50 and 9, respectively, and light chain CDR1, CDR2 and CDR3 sequences set forth in SEQ ID NOs: 56, 58 and 61, respectively;
(f) heavy chain CDR1, CDR2 and CDR3 sequences set forth in SEQ ID NOs: 46, 50 and 9, respectively, and light chain CDR1, CDR2 and CDR3 sequences set forth in SEQ ID NOs: 55, 60 and 62, respectively;
(g) heavy chain CDR1. CDR2 and CDR3 sequences set forth in SEQ ID NOs: 46, 50 and 9, respectively, and light chain CDR1, CDR2 and CDR3 sequences set forth in SEQ ID NOs: 54, 60 and 62, respectively:
(h) heavy chain CDR1, CDR2 and CDR3 sequences set forth in SEQ ID NOs: 43, 47 and 9, respectively, and light chain CDR1, CDR2 and CDR3 sequences set forth in SEQ ID NOs: 53, 59 and 63, respectively;
(i) heavy chain CDR1, CDR2 and CDR3 sequences set forth in SEQ ID NOs: 45, 49 and 9, respectively, and light chain CDR1, CDR2 and CDR3 sequences set forth in SEQ ID NOs: 53, 59 and 63, respectively;
(j) heavy chain CDR1, CDR2 and CDR3 sequences set forth in SEQ ID NOs: 44, 48 and 9, respectively, and light chain CDR1, CDR2 and CDR3 sequences set forth in SEQ ID NOs: 53, 59 and 63, respectively; and
(k) heavy chain CDR1, CDR2 and CDR3 sequences set forth in SEQ ID NOs: 43, 47 and 9, respectively, and light chain CDR1, CDR2 and CDR3 sequences set forth in SEQ ID NOs: 52, 58 and 62, respectively.

In yet other aspects, the disclosure provides an isolated monoclonal antibody that specifically binds human CD277, or an antigen-binding portion thereof, wherein the antibody or antigen binding portion thereof comprises heavy and light chain variable regions, wherein the heavy chain variable region comprises an amino acid sequence selected from the group consisting of SEQ ID NOs: 3, 32, 34, 36, 37, and 42; and wherein the light chain variable region comprises an amino acid sequence selected from the group consisting of SEQ ID NOs: 4, 33, 35, 38, 39, 40 and 41.

In yet other aspects, the disclosure provides an isolated monoclonal antibody that specifically binds human CD277, or an antigen-binding portion thereof, wherein the antibody or antigen binding portion thereof comprises a heavy chain variable region of an amino acid sequence selected from the group consisting of SEQ ID NOs: 3, 32, 34, 36, 37, and 42; and a light chain variable region of an amino acid sequence selected from the group consisting of SEQ ID NOs: 4, 33, 35, 38, 39, 40 and 41.

In some aspects, the disclosure provides an isolated monoclonal antibody that specifically binds human CD277, or an antigen-binding portion thereof, wherein the antibody or antigen binding portion thereof comprises heavy and light chain variable regions comprising amino acid sequences selected from the group consisting of:
(a) SEQ ID NO: 3 and 4, respectively;
(b) SEQ ID NO: 42 and 41, respectively;
(c) SEQ ID NO:36 and 41, respectively;
(d) SEQ ID NO: 34 and 40, respectively;
(e) SEQ ID NO: 37 and 33, respectively;
(f) SEQ ID NO: 37 and 39, respectively;
(g) SEQ ID NO: 37 and 38, respectively;
(h) SEQ ID NO: 32 and 35, respectively;
(i) SEQ ID NO: 36 and 35, respectively;
(j) SEQ ID NO: 34 and 35, respectively; and
(k) SEQ ID NO: 32 and 33, respectively.

In some aspects, the disclosure provides an isolated monoclonal antibody that specifically binds human CD277, or an antigen-binding portion thereof, wherein the antibody or antigen binding portion thereof comprises heavy and light chain variable regions of amino acid sequences selected from the group consisting of:
(a) SEQ ID NO: 3 and 4, respectively;
(b) SEQ ID NO: 42 and 41, respectively;
(c) SEQ ID NO:36 and 41, respectively;
(d) SEQ ID NO: 34 and 40, respectively;
(e) SEQ ID NO: 37 and 33, respectively;
(f) SEQ ID NO: 37 and 39, respectively;
(g) SEQ ID NO: 37 and 38, respectively;
(h) SEQ ID NO: 32 and 35, respectively;
(i) SEQ ID NO: 36 and 35, respectively;
(j) SEQ ID NO: 34 and 35, respectively; and
(k) SEQ ID NO: 32 and 33, respectively.

In other aspects, the disclosure provides an isolated monoclonal antibody that specifically binds human CD277, or an antigen-binding portion thereof, wherein the antibody or antigen binding portion thereof comprises heavy and light chain variable regions, wherein the heavy chain variable region comprises an amino acid sequence which is at least 90% identical to the amino acid sequence selected from the group consisting of SEQ ID NOs: 3, 32, 34, 36, 37, and 42; and wherein the light chain variable region comprises an amino acid sequence which is at least 90% identical to the amino acid sequence selected from the group consisting of SEQ ID NOs: 4, 33, 35, 38, 39, 40 and 41.

In other aspects, the disclosure provides an isolated monoclonal antibody that specifically binds human CD277, or an antigen-binding portion thereof, wherein the antibody or antigen binding portion thereof comprises a heavy chain variable region having an amino acid sequence which is at least 90% identical to the heavy chain variable region of an amino acid sequence selected from the group consisting of SEQ ID NOs: 3, 32, 34, 36, 37, and 42; and a light chain variable region having an amino acid sequence which is at least 90% identical to the light chain variable region of an amino acid sequence selected from the group consisting of SEQ ID NOs: 4, 33, 35, 38, 39, 40 and 41.

In yet other aspects, the disclosure provides an isolated monoclonal antibody that specifically binds human CD277, or an antigen-binding portion thereof, wherein the antibody or antigen binding portion thereof comprises heavy and light chain variable regions comprising amino acid sequences at least 90% identical to the amino acid sequences selected from the group consisting of:
(a) SEQ ID NO: 3 and 4, respectively;
(b) SEQ ID NO: 42 and 41, respectively;
(c) SEQ ID NO:36 and 41, respectively;
(d) SEQ ID NO: 34 and 40, respectively;
(e) SEQ ID NO: 37 and 33, respectively;
(f) SEQ ID NO: 37 and 39, respectively:
(g) SEQ ID NO: 37 and 38, respectively;
(h) SEQ ID NO: 32 and 35, respectively;
(i) SEQ ID NO: 36 and 35, respectively;
(j) SEQ ID NO: 34 and 35, respectively; and
(k) SEQ ID NO: 32 and 33, respectively.

In yet other aspects, the disclosure provides an isolated monoclonal antibody that specifically binds human CD277, or an antigen-binding portion thereof, wherein the antibody or antigen binding portion thereof comprises heavy and light chain variable regions comprising amino acid sequences at least 90% identical to the heavy and light variable regions of amino acid sequences selected from the group consisting of:
(a) SEQ ID NO: 3 and 4, respectively;
(b) SEQ ID NO: 42 and 41, respectively;
(c) SEQ ID NO:36 and 41, respectively;
(d) SEQ ID NO: 34 and 40, respectively;
(e) SEQ ID NO: 37 and 33, respectively;
(f) SEQ ID NO: 37 and 39, respectively;
(g) SEQ ID NO: 37 and 38, respectively:
(h) SEQ ID NO: 32 and 35, respectively;
(i) SEQ ID NO: 36 and 35, respectively:
(j) SEQ ID NO: 34 and 35, respectively; and
(k) SEQ ID NO: 32 and 33, respectively.

In some aspects, the disclosure provides an isolated monoclonal antibody that specifically binds human CD277, or an antigen-binding portion thereof, wherein the antibody or antigen-binding portion thereof comprises heavy and light chain CDRs, wherein
  (i) heavy chain CDR1 comprises SEQ ID NO: 7;
  (ii) heavy chain CDR2 comprises SEQ ID NO: 8 or SEQ ID 76;
  (iii) heavy chain CDR3 comprises SEQ ID NO: 9;
  (iv) light chain CDR1 comprises SEQ ID NO: 10;
  (v) light chain CDR2 comprises SEQ ID NO: 11; and
  (vi) light chain CDR3 comprises SEQ ID NO: 12.

In other aspects, the disclosure provides an isolated monoclonal antibody that specifically binds human CD277, or an antigen-binding portion thereof, comprising heavy and light chain variable regions, wherein the heavy chain variable region comprises an amino acid sequence set forth in SEQ ID NO: 3, and wherein the light chain variable region comprises an amino acid sequence set forth in SEQ ID NO: 4.

In other aspects, the disclosure provides an isolated monoclonal antibody that specifically binds human CD277, or an antigen-binding portion thereof, comprising heavy and light chain variable regions, wherein the heavy chain variable region comprises an amino acid sequence set forth in SEQ ID NO: 3, and wherein the light chain variable region comprises an amino acid sequence set forth in SEQ ID NO: 86.

In some aspects, the disclosure provides an isolated monoclonal antibody that specifically binds human CD277, or an antigen-binding portion thereof, comprising heavy and light chain variable regions, wherein the heavy chain variable region comprises an amino acid sequence at least 90% identical to SEQ ID NO: 3, and wherein the light chain variable region comprises an amino acid sequence at least 90% identical to SEQ ID NO: 4.

In some aspects, the disclosure provides an isolated monoclonal antibody that specifically binds human CD277, or an antigen-binding portion thereof, comprising heavy and light chain variable regions, wherein the heavy chain variable region comprises an amino acid sequence at least 90% identical to SEQ ID NO: 3, and wherein the light chain variable region comprises an amino acid sequence at least 90% identical to SEQ ID NO: 86.

In some aspects, the disclosure provides an isolated monoclonal antibody that specifically binds human CD277, wherein the antibody comprises a heavy chain comprising the amino acid sequence set forth in SEQ ID NO: 74, and a light chain comprising the amino acid sequence set forth in SEQ ID NO: 75.

In other aspects, the disclosure provides an isolated monoclonal antibody that specifically binds human CD277, wherein the antibody comprises a heavy chain comprising an amino acid sequence at least 90% identical to SEQ ID NO: 74, and a light chain comprising an amino acid sequence at least 90% identical to SEQ ID NO: 75.

In any of the foregoing aspects, the antibody or antigen-binding portion thereof is chimeric or humanized. In other aspects, the antibody or antigen-binding portion thereof is a fully human antibody or antigen-binding portion thereof.

In any of the foregoing aspects or embodiments thereof, the antibody or antigen-binding portion thereof binds to cynomolgus macaque CD277.

In any of the foregoing aspects or embodiments thereof, the antibody is selected from the group consisting of an IgG1, an IgG2, and IgG3, an IgG4, and IgM, and IgA1, and IgA2, and IgD, and an IgE antibody. In some aspects, the antibody is an IgG1 antibody or IgG4 antibody.

In yet other aspects, the disclosure provides a pharmaceutical composition comprising an isolated monoclonal antibody or antigen-binding portion thereof, as described herein and a pharmaceutically acceptable carrier.

In yet other aspects, the disclosure provides a nucleic acid comprising a nucleotide sequence encoding the light chain, heavy chain, or both light and heavy chains of the isolated monoclonal antibody, or antigen binding portion thereof, described herein. In further aspects, the disclosure provides an expression vector comprising the nucleic acid described herein. In other aspects, the disclosure provides a cell transformed with the expression vector described herein.

In other aspects, the disclosure provides a method for producing a monoclonal antibody that specifically binds human CD277, or an antigen-binding portion thereof, the method comprising maintaining a cell described herein under conditions permitting expression of the monoclonal antibody or antigen binding portion thereof. In some aspects, the method comprises obtaining the monoclonal antibody or antigen-binding portion thereof.

In any of the foregoing aspects and embodiments thereof, the antibody or antigen binding portion thereof comprises heavy and light chain CDRs selected from the group consisting of:
  (a) heavy chain CDR1, CDR2 and CDR3 sequences set forth in SEQ ID NOs: 7, 76, and 9, respectively, and light chain CDR1, CDR2 and CDR3 sequences set forth in SEQ ID NOs: 10-12, respectively;
  (b) heavy chain CDR1, CDR2 and CDR3 sequences set forth in SEQ ID NOs: 43, 77, and 9, respectively, and light chain CDR1, CDR2 and CDR3 sequences set forth in SEQ ID NOs: 52, 81, and 62, respectively;
  (c) heavy chain CDR1, CDR2 and CDR3 sequences set forth in SEQ ID NOs: 45, 79, and 9, respectively, and light chain CDR1, CDR2 and CDR3 sequences set forth in SEQ ID NOs: 57, 82, and 65, respectively;
  (d) heavy chain CDR1, CDR2 and CDR3 sequences set forth in SEQ ID NOs: 44, 78, and 9 respectively, and light chain CDR1, CDR2 and CDR3 sequences set forth in SEQ ID NOs: 57, 84, and 64, respectively;
  (e) heavy chain CDR1, CDR2 and CDR3 sequences set forth in SEQ ID NOs: 46, 80, and 9, respectively, and light chain CDR1, CDR2 and CDR3 sequences set forth in SEQ ID NOs: 56, 81, and 62, respectively;
  (f) heavy chain CDR1, CDR2 and CDR3 sequences set forth in SEQ ID NOs: 46, 80, and 9, respectively, and light chain CDR1, CDR2 and CDR3 sequences set forth in SEQ ID NOs: 55, 83, and 62, respectively;
  (g) heavy chain CDR1, CDR2 and CDR3 sequences set forth in SEQ ID NOs: 46, 80, and 9, respectively, and light chain CDR1, CDR2 and CDR3 sequences set forth in SEQ ID NOs: 54, 83, and 62, respectively;
  (h) heavy chain CDR1, CDR2 and CDR3 sequences set forth in SEQ ID NOs: 43, 77, and 9, respectively, and light chain CDR1, CDR2 and CDR3 sequences set forth in SEQ ID NOs: 53, 82, and 63, respectively;
  (i) heavy chain CDR1, CDR2 and CDR3 sequences set forth in SEQ ID NOs: 45, 79, and 9, respectively, and light chain CDR1, CDR2 and CDR3 sequences set forth in SEQ ID NOs: 53, 82, and 63, respectively;
  (j) heavy chain CDR1, CDR2 and CDR3 sequences set forth in SEQ ID NOs: 44, 78, and 9, respectively, and light chain CDR1, CDR2 and CDR3 sequences set forth in SEQ ID NOs: 53, 82, and 63, respectively;

(k) heavy chain CDR1, CDR2 and CDR3 sequences set forth in SEQ ID NOs: 43, 77, and 9, respectively, and light chain CDR1, CDR2 and CDR3 sequences set forth in SEQ ID NOs: 52, 81, and 62, respectively; and (l) heavy chain CDR1, CDR2 and CDR3 sequences set forth in SEQ ID NOs: 46, 50 and 9, respectively, and light chain CDR1, CDR2 and CDR3 sequences set forth in SEQ ID NOs: 56, 58 and 62, respectively.

In any of the foregoing aspects and embodiments thereof, the antibody or antigen binding portion thereof comprises a heavy chain variable region from an amino acid sequence selected from the group consisting of SEQ ID NOs: 3, 87, 89, 91, 92, and 97; and a light chain variable region from an amino acid sequence selected from the group consisting of SEQ ID NOs: 4, 86, 88, 90, 93, 94, 95, and 96.

In any of the foregoing aspects and embodiments thereof, the disclosure provides an isolated monoclonal antibody that specifically binds human CD277, or an antigen-binding portion thereof, wherein the antibody or antigen binding portion thereof comprises heavy and light chain variable regions of amino acid sequences selected from the group consisting of:

(a) SEQ ID NO: 3 and 86, respectively;
(b) SEQ ID NO: 97 and 96, respectively;
(c) SEQ ID NO: 91 and 96, respectively;
(d) SEQ ID NO: 89 and 95, respectively;
(e) SEQ ID NO: 92 and 88, respectively;
(f) SEQ ID NO: 92 and 94, respectively;
(g) SEQ ID NO: 92 and 93, respectively;
(h) SEQ ID NO: 87 and 90, respectively;
(i) SEQ ID NO: 91 and 90, respectively;
(j) SEQ ID NO: 89 and 90, respectively; and
(k) SEQ ID NO: 87 and 88, respectively.

In other aspects, the disclosure provides an isolated monoclonal antibody that specifically binds human CD277, or an antigen-binding portion thereof, wherein the antibody or antigen binding portion thereof comprises a heavy chain variable region having an amino acid sequence which is at least 90% identical to the heavy chain variable region of an amino acid sequence selected from the group consisting of SEQ ID NOs: 3, 87, 89, 91, 92, and 97; a light chain variable region having an amino acid sequence which is at least 90% identical to the light chain variable region of an amino acid sequence selected from the group consisting of SEQ ID NOs: 4, 86, 88, 90, 93, 94, 95 and 96.

BRIEF DESCRIPTION OF THE FIGURES

FIG. 1A depicts CD1c and CD11c expression on gated CD45+ cells. FIG. 1B depicts CD277 expression on tumor cells, T cells, macrophages, and dendritic cells. FIG. 1C depicts a summary of mean fluorescent intensity (MFI) for CD277 for tumor cells, T cells, macrophages, and dendritic cells.

FIGS. 7A-7D depict IFN-γ production data for stimulated CD8+T and CD4+ T cells. FIG. 7A shows purified CD8+ T cells from two different donors stimulated with BTNA31-K32 cells with and without zoledronate. FIG. 7B shows purified CD8+ T cells stimulated with K32 cells with and without zoledronate. FIG. 7C shows purified CD4+ T cells from two different donors stimulated with BTNA31-K32 cells with and without zoledronate. FIG. 7D shows purified CD4+ T cells stimulated with K32 cells with and without zoledronate.

FIGS. 8A-8B depicts proliferation fold change data for PBMCs stimulated with BTNA31-K32 cells in the presence of a panel of anti-CD277 antibodies without (FIG. 8A) and with (FIG. 8B) zoledronate. FIG. 8C depicts IFN-γ production data for PBMCs under various described conditions.

FIGS. 9A-9B depict cell proliferation data for gated CD4+ T cells (FIG. 9A) and gated CD8+ T cells (FIG. 9B) under experimental conditions described herein.

FIG. 10 provides a schematic showing the results of anti-CD277 antibody mAb1 CDRH3 (SEQ ID NO: 9) alanine scanning as measured by binding affinity ($K_D$) to human CD277 using two different methods.

Figures 1A, 1B, 1C:
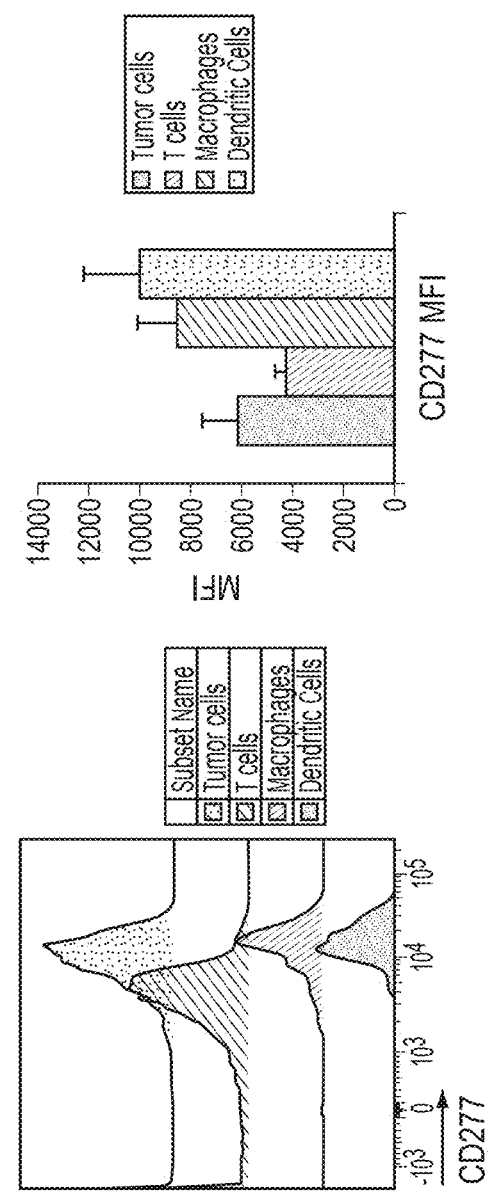
FIGS. 1A-1C provide data demonstrating the expression of CD277 in an ovarian tumor microenvironment.

12B is a bar graph showing the percentage of live cells in mice having OVCAR3 tumors that received γδ T cells in addition to anti-CD277 antibody mAb1 or IgG control.

DETAILED DESCRIPTION

Overview

Various diseases are characterized by the development of progressive immunosuppression in a patient. The presence of an impaired immune response in patients with malignancies has been particularly well-documented. Cancer patients exhibit a variety of altered immune functions such as a decrease in delayed hypersensitivity, and decrease in lytic function and proliferation response of lymphocytes. Augmenting immune functions in cancer patients may have beneficial effects for tumor control.

In one aspect, the present disclosure provides novel anti-CD277 antibodies. In other aspects, the disclosure provides methods for treating a disorder, such as cancer.

Definitions

Terms used in the claims and specification are defined as set forth below unless otherwise specified.

It must be noted that, as used in the specification and the appended claims, the singular forms "a," "an" and "the" include plural referents unless the context clearly dictates otherwise. Further, unless otherwise required by context, singular terms shall include pluralities and plural terms shall include the singular.

As used herein, "αβ T cell" refers to a T cell having a T cell receptor comprised of the highly variable α and β chains, which are expressed in a complex with invariant CD3 chain molecules. An αβ T cell can further be distinguished into "helper T cell" and "cytotoxic T cell" subsets. Helper T cells express the CD4 molecule and play a role in modulating B cell-directed immune responses. Cytotoxic T cells express the CD8 molecule and play an active role in killing damaged cells such as, for example, cancer cells and virally infected cells.

As used herein, "about" will be understood by persons of ordinary skill and will vary to some extent depending on the context in which it is used. If there are uses of the term which are not clear to persons of ordinary skill given the context in which it is used, "about" will mean up to plus or minus 10% of the particular value.

The term "ameliorating" refers to any therapeutically beneficial result in the treatment of a disease state, e.g., cancer, including prophylaxis, lessening in the severity or progression, remission, or cure thereof.

As used herein, the term "amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, γ-carboxyglutamate, and O-phosphoserine. Amino acid analogs refers to compounds that have the same basic chemical structure as a naturally occurring amino acid, i.e., an α carbon that is bound to a hydrogen, a carboxyl group, an amino group, and an R group, e.g., homoserine, norleucine, methionine sulfoxide, methionine methyl sulfonium. Such analogs have modified R groups {e.g., norleucine) or modified peptide backbones, but retain the same basic chemical structure as a naturally occurring amino acid. Amino acid mimetics refers to chemical compounds that have a structure that is different from the general chemical structure of an amino acid, but that function in a manner similar to a naturally occurring amino acid.

Amino acids can be referred to herein by either their commonly known three letter symbols or by the one-letter symbols recommended by the IUPAC-IUB Biochemical Nomenclature Commission. Nucleotides, likewise, can be referred to by their commonly accepted single-letter codes.

As used herein, an "amino acid substitution" refers to the replacement of at least one existing amino acid residue in a predetermined amino acid sequence (an amino acid sequence of a starting polypeptide) with a second, different "replacement" amino acid residue. An "amino acid insertion" refers to the incorporation of at least one additional amino acid into a predetermined amino acid sequence. While the insertion will usually consist of the insertion of one or two amino acid residues, larger "peptide insertions," can also be made, e.g. insertion of about three to about five or even up to about ten, fifteen, or twenty amino acid residues. The inserted residue(s) may be naturally occurring or non-naturally occurring as disclosed above. An "amino acid deletion" refers to the removal of at least one amino acid residue from a predetermined amino acid sequence.

As used herein, the term "angiogenesis" or "neovascularization" refers to the process by which new blood vessels develop from pre-existing vessels (Varner et al., (1999) Angiogen. 3:53-60; Mousa et al., (2000) Angiogen. Stim. Inhib. 35:42-44; Kim et al., (2000) Amer. J. Path. 156:1345-1362; Kim et al., (2000) J. Biol. Chem. 275:33920-33928: Kumar et al. (2000) Angiogenesis: From Molecular to Integrative Pharm. 169-180). Endothelial cells from pre-existing blood vessels or from circulating endothelial stem cells (Takahashi et al., (1995) Nat. Med. 5:434-438; Isner et al., (1999) J. Clin. Invest. 103:1231-1236) become activated to migrate, proliferate, and differentiate into structures with lumens, forming new blood vessels, in response to growth factor or hormonal cues, or hypoxic or ischemic conditions. During ischemia, such as occurs in cancer, the need to increase oxygenation and delivery of nutrients apparently induces the secretion of angiogenic factors by the affected tissue; these factors stimulate new blood vessel formation. Several additional terms are related to angiogenesis.

As used herein, the term "antibody" refers to a whole antibody comprising two light chain polypeptides and two heavy chain polypeptides. Whole antibodies include different antibody isotypes including IgM, IgG, IgA, IgD, and IgE antibodies. The term "antibody" includes a polyclonal antibody, a monoclonal antibody, a chimerized or chimeric antibody, a humanized antibody, a primatized antibody, a deimmunized antibody, and a fully human antibody. The antibody can be made in or derived from any of a variety of species, e.g., mammals such as humans, non-human primates (e.g., orangutan, baboons, or chimpanzees), horses, cattle, pigs, sheep, goats, dogs, cats, rabbits, guinea pigs, gerbils, hamsters, rats, and mice. The antibody can be a purified or a recombinant antibody.

As used herein, the term "antibody fragment," "antigen-binding fragment," or similar terms refer to a fragment of an antibody that retains the ability to bind to a target antigen (e.g., CD277) and inhibit the activity of the target antigen. Such fragments include, e.g., a single chain antibody, a single chain Fv fragment (scFv), an Fd fragment, an Fab fragment, an Fab' fragment, or an F(ab')$_2$ fragment. An scFv fragment is a single polypeptide chain that includes both the heavy and light chain variable regions of the antibody from which the scFv is derived. In addition, intrabodies, minibodies, triabodies, and diabodies are also included in the definition of antibody and are compatible for use in the methods described herein. See, e.g., Todorovska et al., (2001) J. Immunol. Methods 248 (1): 47-66; Hudson and Kortt, (1999) *J. Immunol. Methods* 231 (1): 177-189; Poljak. (1994) *Structure* 2 (12): 1121-1123; Rondon and Marasco, (1997) *Annu. Rev. Microbiol.* 51:257-283, the disclosures of each of which are incorporated herein by reference in their entirety.

As used herein, the term "antibody fragment" also includes, e.g., single domain antibodies such as camelized single domain antibodies. See, e.g., Muyldermans et al., (2001) *Trends Biochem. Sci.* 26:230-235; Nuttall et al., (2000) *Curr. Pharm. Biotech.* 1:253-263; Reichmann et al., (1999) *J. Immunol. Meth.* 231:25-38; PCT application publication nos. WO 94/04678 and WO 94/25591; and U.S. Pat. No. 6,005,079, all of which are incorporated herein by reference in their entireties. In some embodiments, the disclosure provides single domain antibodies comprising two VH domains with modifications such that single domain antibodies are formed.

In some embodiment, an antigen-binding fragment includes the variable region of a heavy chain polypeptide and the variable region of a light chain polypeptide. In some embodiments, an antigen-binding fragment described herein comprises the CDRs of the light chain and heavy chain polypeptide of an antibody.

As used herein, the term "bispecific" or "bifunctional antibody" refers to an artificial hybrid antibody having two different heavy/light chain pairs and two different binding sites. Bispecific antibodies can be produced by a variety of methods including fusion of hybridomas or linking of Fab' fragments. See. e.g., Songsivilai & Lachmann, (1990) *Clin. Exp. Immunol.* 79:315-321; Kostelny et al., (1992) *J. Immunol.* 148:1547-1553.

Traditionally, the recombinant production of bispecific antibodies is based on the co-expression of two immunoglobulin heavy-chain/light-chain pairs, where the two heavy chain/light-chain pairs have different specificities (Milstein and Cuello, (1983) *Nature* 305:537-539). Antibody variable domains with the desired binding specificities (antibody-antigen combining sites) can be fused to immunoglobulin constant domain sequences. The fusion of the heavy chain variable region is preferably with an immunoglobulin heavy-chain constant domain, including at least part of the hinge, CH2, and CH3 regions. For further details of illustrative currently known methods for generating bispecific antibodies see, e.g., Suresh et al., (1986) *Methods Enzymol.* 121:210; PCT Publication No. WO 96/27011; Brennan et al., (1985) *Science* 229:81; Shalaby et al., *J. Exp. Med.* (1992) 175:217-225; Kostelny et al., (1992) *J. Immunol.* 148 (5): 1547-1553; Hollinger et al., (1993) *Proc. Natl. Acad. Sci. USA* 90:6444-6448; Gruber et al., (1994) *J. Immunol.* 152: 5368; and Tutt et al., (1991) *J. Immunol.* 147:60. Bispecific antibodies also include cross-linked or heteroconjugate antibodies. Heteroconjugate antibodies may be made using any convenient cross-linking methods. Suitable cross-linking agents are well known in the art, and are disclosed in U.S. Pat. No. 4,676,980, along with a number of cross-linking techniques.

Various techniques for making and isolating bispecific antibody fragments directly from recombinant cell culture have also been described. For example, bispecific antibodies have been produced using leucine zippers. Sec, e.g., Kostelny et al. (1992) *J Immunol* 148 (5): 1547-1553. The leucine zipper peptides from the Fos and Jun proteins may be linked to the Fab' portions of two different antibodies by gene fusion. The antibody homodimers may be reduced at the hinge region to form monomers and then re-oxidized to form the antibody heterodimers. This method can also be utilized for the production of antibody homodimers. The "diabody" technology described by Hollinger et al. (1993) *Proc Natl Acad Sci USA* 90:6444-6448 has provided an alternative mechanism for making bispecific antibody fragments. The fragments comprise a heavy-chain variable domain (VH) connected to a light-chain variable domain (VL) by a linker which is too short to allow pairing between the two domains on the same chain. Accordingly, the VH and VL domains of one fragment are forced to pair with the complementary VL and VH domains of another fragment, thereby forming two antigen-binding sites. Another strategy for making bispecific antibody fragments by the use of single-chain Fv (scFv) dimers has also been reported. See, e.g., Gruber et al. (1994) *J Immunol* 152:5368. Alternatively, the antibodies can be "linear antibodies" as described in, e.g., Zapata et al. (1995) *Protein Eng.* 8 (10): 1057-1062. Briefly, these antibodies comprise a pair of tandem Fd segments (VH-CH1-VH-CH1) which form a pair of antigen binding regions. Linear antibodies can be bispecific or monospecific.

Antibodies with more than two valencies (e.g., trispecific antibodies) are contemplated and described in, e.g., Tutt et al. (1991) *J Immunol* 147:60.

The disclosure also embraces variant forms of multi-specific antibodies such as the dual variable domain immunoglobulin (DVD-Ig) molecules described in Wu et al. (2007) *Nat Biotechnol* 25 (11): 1290-1297. The DVD-Ig molecules are designed such that two different light chain variable domains (VL) from two different parent antibodies are linked in tandem directly or via a short linker by recombinant DNA techniques, followed by the light chain constant domain. Similarly, the heavy chain comprises two different heavy chain variable domains (VH) linked in tandem, followed by the constant domain CH1 and Fc region. Methods for making DVD-Ig molecules from two parent antibodies are further described in, e.g., PCT Publication Nos. WO 08/024188 and WO 07/024715. In some embodiments, the bispecific antibody is a Fabs-in-Tandem immunoglobulin, in which the light chain variable region with a second specificity is fused to the heavy chain variable region of a whole antibody. Such antibodies are described in, e.g., International Patent Application Publication No. WO 2015/103072.

As used herein, the term "cancer" means cells having the capacity for autonomous growth, i.e., an abnormal state or condition characterized by rapidly proliferating cell growth.

As used herein, "cancer antigen" refers to (i) tumor-specific antigens, (ii) tumor-associated antigens, (iii) cells that express tumor-specific antigens, (iv) cells that express tumor-associated antigens, (v) embryonic antigens on tumors, (vi) autologous tumor cells, (vii) tumor-specific membrane antigens, (viii) tumor-associated membrane antigens, (ix) growth factor receptors, (x) growth factor ligands, and (xi) any other type of antigen or antigen-presenting cell or material that is associated with a cancer.

The term "carcinoma" is art recognized and refers to malignancies of epithelial or endocrine tissues including respiratory system carcinomas, gastrointestinal system carcinomas, genitourinary system carcinomas, testicular carcinomas, breast carcinomas, prostatic carcinomas, endocrine system carcinomas, and melanomas. The anti-CD277 antibodies described herein can be used to treat patients who have, who are suspected of having, or who may be at high risk for developing any type of cancer, including renal carcinoma or melanoma. Exemplary carcinomas include those forming from tissue of the cervix, lung, prostate, breast, head and neck, colon and ovary. The term also includes carcinosarcomas, which include malignant tumors composed of carcinomatous and sarcomatous tissues. An "adenocarcinoma" refers to a carcinoma derived from glandular tissue or in which the tumor cells form recognizable glandular structures.

As used herein, the term antigen "cross-presentation" refers to presentation of exogenous protein antigens to T cells via MHC class I and class II molecules on APCs.

As used herein, the term "CDR" means a complementarity-determining region. One system of CDR numbering is the system described by Kabat, also referred to as "numbered according to Kabat." "Kabat numbering", "Kabat definitions", and "Kabat labeling." and provides an unambiguous residue numbering system applicable to any variable domain of an antibody, and provides precise residue boundaries defining the three CDRs of each chain. (Kabat et al., Sequences of Proteins of Immunological Interest, National Institutes of Health, Bethesda, Md. (1987) and (1991), the contents of which are incorporated by reference in their entirety. These CDRs are referred to as Kabat CDRs and comprise about residues 24-34 (CDR1), 50-56 (CDR2), and 89-97 (CDR3) in the light chain variable domain, and 31-35 (CDR1), 50-65 (CDR2), and 95-102 (CDR3) in the heavy chain variable domain. When the CDRs are defined according to Kabat, the light chain FR residues are positioned at about residues 1-23 (LCFR1), 35-49 (LCFR2), 57-88 (LCFR3), and 98-107 (LCFR4), and the heavy chain FR residues are positioned about at residues 1-30 (HCFR1), 36-49 (HCFR2), 66-94 (HCFR3), and 103-113 (HCFR4) in the heavy chain residues. The "EU index as in Kabat" refers to the residue numbering of the human IgG1 EU antibody.

Other CDR numbering systems are also used in the art (see, for example, Table A). Chothia and coworkers found that certain sub-portions within Kabat CDRs adopt nearly identical peptide backbone conformations, despite having great diversity at the level of amino acid sequence. (Chothia et al. (1987) J. Mol. Biol. 196:901-917; and Chothia et al. (1989) Nature 342:877-883). These sub-portions were designated as L1, L2, and L3 or H1, H2, and H3 where the "L" and the "H" designates the light chain and the heavy chains regions, respectively. These CDRs can be referred to as "Chothia CDRs," "Chothia numbering," or "numbered according to Chothia," and comprise about residues 24-34 (CDR1), 50-56 (CDR2), and 89-97 (CDR3) in the light chain variable domain, and 26-32 (CDR1), 50-56 or 52-56 (CDR2), and 95-102 (CDR3) in the heavy chain variable domain. Mol. Biol. 196:901-917 (1987).

The system described by MacCallum, also referred to as "numbered according to MacCallum," or "MacCallum numbering" comprises about residues 30-36 (CDR1), 46-55 (CDR2), and 89-96 (CDR3) in the light chain variable domain, and 30-35 (CDR1), 47-58 (CDR2), and 93-101 (CDR3) in the heavy chain variable domain. MacCallum et al. ((1996) J. Mol. Biol. 262 (5): 732-745).

The system described by AbM, also referred to as "numbering according to AbM," or "AbM numbering" comprises about residues 24-34 (CDR1), 50-56 (CDR2) and 89-97 (CDR3) in the light chain variable domain, and 26-35 (CDR1), 50-58 (CDR2), and 95-102 (CDR3) in the heavy chain variable domain.

The IMGT (INTERNATIONAL IMMUNOGENETICS INFORMATION SYSTEM) numbering of variable regions can also be used, which is the numbering of the residues in an immunoglobulin variable heavy or light chain according to the methods of the IMGT, as described in Lefranc, M.-P., "The IMGT unique numbering for immunoglobulins, T cell Receptors and Ig-like domains", The Immunologist, 7, 132-136 (1999), and is expressly incorporated herein in its entirety by reference. As used herein, "IMGT sequence numbering" or "numbered according to IMTG," refers to numbering of the sequence encoding a variable region according to the IMGT. For the heavy chain variable domain, when numbered according to IMGT, the hypervariable region ranges from amino acid positions 27 to 38 for CDR1, amino acid positions 56 to 65 for CDR2, and amino acid positions 105 to 117 for CDR3. For the light chain variable domain, when numbered according to IMGT, the hypervariable region ranges from amino acid positions 27 to 38 for CDR1, amino acid positions 56 to 65 for CDR2, and amino acid positions 105 to 117 for CDR3.

Other CDR numbering systems and methods are known in the art and can be used herein, such as, for example, those described in A. Sivasubramanian et al. (2017) Broad epitope coverage of a human in vitro antibody library, mAbs, 9:1, 29-42, the contents of which are herein incorporated by reference in its entirety. Combinations of the various CDR numbering systems can also be used in some embodiments.

In some embodiments of the anti-CD277 antibodies described herein, the CDRs recited herein comprise about residues 24-34 (CDR1), 50-56 (CDR2), and 89-97 (CDR3) in the light chain variable domain, and 27-35 (CDR1), 49-60 (CDR2), and 93-102 (CDR3) in the heavy chain variable domain, when numbered according to Chothia numbering. In some embodiments, CDR2 in the light chain variable domain can comprise amino acids 49-56, when numbered according to Chothia numbering. In some embodiments, CDR2 in the heavy chain domain can comprise about residues 50-65, when numbered according to Kabat.

TABLE A

CDR Definitions

| | CDRH1 | CDRH2 | CDRH3 | CDRL1 | CDRL2 | CDRL3 |
|---|---|---|---|---|---|---|
| Kabat | 31-35 | 50-65 | 95-102 | 24-34 | 50-56 | 89-97 |
| Alternative CDRs numbered according to Chothia | 27-35 | 49-60 | 93-102 | 24-34 | 50-56 | 89-97 |
| Chothia | 26-32 | 52-56 or 50-56 | 95-102 | 24-34 | 50-56 | 89-97 |
| MacCallum | 30-35 | 47-58 | 93-101 | 30-36 | 46-55 | 89-96 |
| AbM | 26-35 | 50-58 | 95-102 | 24-34 | 50-56 | 89-97 |
| IMGT | 27-38 | 56-65 | 105-117 | 27-38 | 56-65 | 105-117 |

As used herein, the term "chimeric antibody" means a genetically engineered fusion of parts of an animal antibody, typically a mouse antibody, with parts of a human antibody. Chimeric antibodies are developed to reduce the human anti-animal antibody response elicited by animal antibodies, as they combine the specificity of the animal antibody with the efficient human immune system interaction of a human antibody.

As used herein, the term "chimeric antibody" means a genetically engineered fusion of parts of an animal antibody, typically a mouse antibody, with parts of a human antibody. Chimeric antibodies are developed to reduce a human anti-animal antibody response.

As used herein, the term "co-stimulatory signal" means a signal required for effective activation of a lymphocyte. A non-limiting example of a co-stimulatory signal is a signal generated from engagement of CD28 with one of its cognate ligands CD80 (B7-1) or CD86 (B7-2).

As used herein, the term "cross-reacts" refers to the ability of an antibody of the disclosure to bind to an antigen from a different species. For example, an antibody of the present disclosure which binds human CD277 may also bind another species of CD277. As used herein, cross-reactivity is measured by detecting a specific reactivity with purified antigen in binding assays (e.g., SPR, ELISA) or binding to, or otherwise functionally interacting with, cells physiologically expressing CD277. Methods for determining crossreactivity include standard binding assays as described herein, for example, by BIACORE™ surface plasmon resonance (SPR) analysis using a BIACORE™ 2000 SPR instrument (Biacore AB, Uppsala, Sweden), or flow cytometric techniques.

As used herein, the term "cytotoxic T lymphocyte (CTL) response" refers to an immune response induced by cytotoxic T cells. CTL responses are mediated primarily by $CD8^+$ T cells.

A polypeptide or amino acid sequence "derived from" a designated polypeptide or protein refers to the origin of the polypeptide. Preferably, the polypeptide or amino acid sequence which is derived from a particular sequence has an amino acid sequence that is essentially identical to that sequence or a portion thereof, wherein the portion consists of at least 10-20 amino acids, preferably at least 20-30 amino acids, more preferably at least 30-50 amino acids, or which is otherwise identifiable to one of ordinary skill in the art as having its origin in the sequence. Polypeptides derived from another peptide may have one or more mutations relative to the starting polypeptide, e.g., one or more amino acid residues which have been substituted with another amino acid residue or which has one or more amino acid residue insertions or deletions.

A polypeptide can comprise an amino acid sequence which is not naturally occurring. Such variants necessarily have less than 100% sequence identity or similarity with the starting molecule. In certain embodiments, the variant will have an amino acid sequence from about 75% to less than 100% amino acid sequence identity or similarity with the amino acid sequence of the starting polypeptide, more preferably from about 80% to less than 100%, more preferably from about 85% to less than 100%, more preferably from about 90% to less than 100% (e.g., 91%, 92%, 93%, 94%, 95%, 96%, 97%, 98%, 99%) and most preferably from about 95% to less than 100%, e.g., over the length of the variant molecule.

In certain embodiments, there is one amino acid difference between a starting polypeptide sequence and the sequence derived there from. Identity or similarity with respect to this sequence is defined herein as the percentage of amino acid residues in the candidate sequence that are identical (i.e., same residue) with the starting amino acid residues, after aligning the sequences and introducing gaps, if necessary, to achieve the maximum percent sequence identity. In certain embodiments, a polypeptide consists of, consists essentially of, or comprises an amino acid sequence selected from a sequence set forth in Table 3 or Table 4. In certain embodiments, a polypeptide includes an amino acid sequence at least 80%, 81%, 82%, 83%, 84%, 85%, 86%, 87%, 88%, 89%, 90%, 91%, 92%, 93%, 94%, 95%, 96%, 97%, 98%, or 99% identical to an amino acid sequence selected from a sequence set forth in Table 3 or Table 4. In certain embodiments, a polypeptide includes a contiguous amino acid sequence at least 80%, 81%, 82%, 83%, 84%, 85%, 86%, 87%, 88%, 89%, 90%, 91%, 92%, 93%, 94%, 95%, 96%, 97%, 98%, or 99% identical to a contiguous amino acid sequence selected from a sequence set forth in Table 3 or Table 4. In certain embodiments, a polypeptide includes an amino acid sequence having at least 10, 15, 20, 25, 30, 35, 40, 45, 50, 55, 60, 65, 70, 75, 80, 85, 90, 95, 100, 200, 300, 400, or 500 (or any integer within these numbers) contiguous amino acids of an amino acid sequence selected from a sequence set forth in Table 3 or Table 4.

In certain embodiments, the antibodies of the disclosure are encoded by a nucleotide sequence. Nucleotide sequences of the invention can be useful for a number of applications, including: cloning, gene therapy, protein expression and purification, mutation introduction, DNA vaccination of a host in need thereof, antibody generation for, e.g., passive immunization, PCR, primer and probe generation, and the like. In certain embodiments, the nucleotide sequence of the invention comprises, consists of, or consists essentially of, a nucleotide sequence selected from a sequence set forth in Table 3 or Table 4. In certain embodiments, a nucleotide sequence includes a nucleotide sequence at least 80%, 81%, 82%, 83%, 84%, 85%, 86%, 87%, 88%, 89%, 90%, 91%, 92%, 93%, 949%, 95%, 96%, 97%, 98%, or 99% identical to a nucleotide sequence selected from a sequence set forth in Table 3 or Table 4. In certain embodiments, a nucleotide sequence includes a contiguous nucleotide sequence at least 80%, 81%, 82%, 83%, 84%, 85%, 86%, 87%, 88%, 89%, 90%, 91%, 92%, 93%, 94%, 95%, 96%, 97%, 98%, or 99% identical to a contiguous nucleotide sequence selected from a sequence set forth in Table 3 or Table 4. In certain embodiments, a nucleotide sequence includes a nucleotide sequence having at least 10, 15, 20, 25, 30, 35, 40, 45, 50, 55, 60, 65, 70, 75, 80, 85, 90, 95, 100, 200, 300, 400, or 500 (or any integer within these numbers) contiguous nucleotides of a nucleotide sequence selected from a sequence set forth in Table 3 or Table 4.

It will also be understood by one of ordinary skill in the art that the antibodies suitable for use in the methods disclosed herein may be altered such that they vary in sequence from the naturally occurring or native sequences from which they were derived, while retaining the desirable activity of the native sequences. For example, nucleotide or amino acid substitutions leading to conservative substitutions or changes at "non-essential" amino acid residues may be made. Mutations may be introduced by standard techniques, such as site-directed mutagenesis and PCR-mediated mutagenesis.

The antibodies suitable for use in the methods disclosed herein can comprise conservative amino acid substitutions at one or more amino acid residues, e.g., at essential or non-essential amino acid residues. A "conservative amino acid substitution" is one in which the amino acid residue is replaced with an amino acid residue having a similar side chain. Families of amino acid residues having similar side chains have been defined in the art, including basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine), nonpolar side chains (e.g., alanine, valine, leucine, isoleucine, proline, phenylalanine, methionine, tryptophan), beta-branched side chains (e.g., threonine, valine, isoleucine) and aromatic side chains (e.g., tyrosine, phenylalanine, tryptophan, histidine). Thus, a nonessential amino acid residue in a binding polypeptide is preferably replaced with another amino acid residue from the same side chain family. In certain embodiments, a string of amino acids can be replaced with a structurally similar string that differs in order and/or composition of side chain family members. Alternatively, in certain embodiments, mutations can be introduced randomly along all or part of a coding sequence, such as by saturation mutagenesis, and the resultant mutants can be incorporated into binding polypeptides of the invention and screened for their ability to bind to the desired target.

As used herein, the term "dimerization" refers to the formation of a macromolecular complex by two, usually non-covalently bound, macromolecules, such as proteins or multimers of proteins. Homodimerization refers to the process of dimerization when the macromolecules (e.g., proteins) are identical in nature. Heterodimerization refers to the process of dimerization when the macromolecules (e.g., proteins) are non-identical in nature.

As used herein, the term "$EC_{50}$" refers to the concentration of an antibody or an antigen-binding portion thereof, which induces a response, either in an in vitro or an in vivo assay, which is 50% of the maximal response, i.e., halfway between the maximal response and the baseline.

As used herein, the term "effective dose" or "effective dosage" is defined as an amount sufficient to achieve or at least partially achieve the desired effect. The term "therapeutically effective dose" is defined as an amount sufficient to cure or at least partially arrest the disease and its complications in a patient already suffering from the disease. Amounts effective for this use will depend upon the severity of the disorder being treated and the general state of the patient's own immune system.

As used herein, the term "epitope" or "antigenic determinant" refers to a site on an antigen to which an immunoglobulin, antibody, or antigen-binding fragment, specifically binds. Epitopes can be formed both from contiguous amino acids or noncontiguous amino acids juxtaposed by tertiary folding of a protein. Epitopes formed from contiguous amino acids are typically retained on exposure to denaturing solvents, whereas epitopes formed by tertiary folding are typically lost on treatment with denaturing solvents. An epitope typically includes at least 3, 4, 5, 6, 7, 8, 9, 10, 11, 12, 13, 14 or 15 amino acids in a unique spatial conformation. Methods for determining what epitopes are bound by a given antibody (i.e., epitope mapping) are well known in the art and include, for example, immunoblotting and immunoprecipitation assays, wherein overlapping or contiguous peptides from CD277 are tested for reactivity with the given anti-CD277 antibody. Methods of determining spatial conformation of epitopes include techniques in the art and those described herein, for example, x-ray crystallography and 2-dimensional nuclear magnetic resonance (see, e.g., *Epitope Mapping Protocols in Methods in Molecular Biology*, Vol. 66, G. E. Morris, Ed. (1996)).

Also encompassed by the present disclosure are antibodies that bind to an epitope on CD277 that comprises all or a portion of an epitope recognized by the particular antibodies described herein (e.g., the same or an overlapping region or a region between or spanning the region).

Also encompassed by the present disclosure are antibodies that bind the same epitope and/or antibodies that compete for binding to human CD277 with the antibodies described herein. Antibodies that recognize the same epitope or compete for binding can be identified using routine techniques. Such techniques include, for example, an immunoassay, which shows the ability of one antibody to block the binding of another antibody to a target antigen, i.e., a competitive binding assay. Competitive binding is determined in an assay in which the immunoglobulin under test inhibits specific binding of a reference antibody to a common antigen, such as CD277. Numerous types of competitive binding assays are known, for example: solid phase direct or indirect radioimmunoassay (RIA), solid phase direct or indirect enzyme immunoassay (EIA), sandwich competition assay (see Stahli et al., *Methods in Enzymology* 9:242 (1983)); solid phase direct biotin-avidin EIA (see Kirkland et al., *J. Immunol.* 137:3614 (1986)); solid phase direct labeled assay, solid phase direct labeled sandwich assay (see Harlow and Lane, *Antibodies: A Laboratory Manual*, Cold Spring Harbor Press (1988)); solid phase direct label RIA using I-125 label (see Morel et al., *Mol. Immunol.* 25 (1): 7 (1988)); solid phase direct biotin-avidin EIA (Cheung et al., *Virology* 176:546 (1990)); and direct labeled RIA. (Moldenhauer et al., *Scand. J. Immunol.* 32:77 (1990)). Typically, such an assay involves the use of purified antigen bound to a solid surface or cells bearing either of these, an unlabeled test immunoglobulin and a labeled reference immunoglobulin. Competitive inhibition is measured by determining the amount of label bound to the solid surface or cells in the presence of the test immunoglobulin. Usually the test immunoglobulin is present in excess. Usually, when a competing antibody is present in excess, it will inhibit specific binding of a reference antibody to a common antigen by at least 50-55%, 55-60%, 60-65%, 65-70% 70-75% or more.

Other techniques include, for example, epitope mapping methods, such as, x-ray analyses of crystals of antigen:antibody complexes which provides atomic resolution of the epitope and mass spectrometry combined with hydrogen/deuterium (H/D) exchange which studies the conformation and dynamics of antigen:antibody interactions. Other methods monitor the binding of the antibody to antigen fragments or mutated variations of the antigen where loss of binding due to a modification of an amino acid residue within the antigen sequence is often considered an indication of an epitope component. In addition, computational combinatorial methods for epitope mapping can also be used. These methods rely on the ability of the antibody of interest to affinity isolate specific short peptides from combinatorial phage display peptide libraries. The peptides are then regarded as leads for the definition of the epitope corresponding to the antibody used to screen the peptide library. For epitope mapping, computational algorithms have also been developed which have been shown to map conformational discontinuous epitopes.

As used herein, the term "FR" means a framework region.

As used herein, "γδ T cell" refers to a subset of T cells having T cell receptors that express γ and δ chains. Unlike αβ T cells, a γδ T cell recognizes non-common antigens, such as lipid antigens, and plays numerous immune-modulatory roles and immune effector roles by, for example, producing cytokines, such as IFN-γ (see e.g.: Vantourout and Hayday (2013) Nat. Rev. Immunol 13 (2): 88-100).

As used herein, the term "glycosylation pattern" is defined as the pattern of carbohydrate units that are covalently attached to a protein, more specifically to an immunoglobulin protein. A glycosylation pattern of a heterologous antibody can be characterized as being substantially similar to glycosylation patterns which occur naturally on antibodies produced by the species of the nonhuman transgenic animal, when one of ordinary skill in the art would recognize the glycosylation pattern of the heterologous antibody as being more similar to said pattern of glycosylation in the species of the nonhuman transgenic animal than to the species from which the CH genes of the transgene were derived.

As used herein, the term "HCDR" means a heavy chain complementarity-determining region.

As used herein, the term "humanized antibody" means an antibody that has variable region framework and constant regions from a human antibody but retains the CDRs of the animal antibody.

As used herein, the term "human antibody" includes antibodies having variable and constant regions (if present) of human germline immunoglobulin sequences. Human antibodies of the disclosure can include amino acid residues not encoded by human germline immunoglobulin sequences (e.g., mutations introduced by random or site-specific mutagenesis in vitro or by somatic mutation in vivo) (See, e.g., Lonberg et al., (1994) *Nature* 368 (6474): 856-859); Lonberg, (1994) *Handbook of Experimental Pharmacology* 113: 49-101; Lonberg & Huszar, (1995) *Intern. Rev. Immunol.* 13:65-93, and Harding & Lonberg, (1995) *Ann. N.Y. Acad. Sci.* 764:536-546). However, the term "human antibody" does not include antibodies in which CDR sequences derived from the germline of another mammalian species, such as a mouse, have been grafted onto human framework sequences (i.e. humanized antibodies).

As used herein, the term a "heterologous antibody" is defined in relation to the transgenic non-human organism producing such an antibody. This term refers to an antibody having an amino acid sequence or an encoding nucleic acid sequence corresponding to that found in an organism not consisting of the transgenic non-human animal, and generally from a species other than that of the transgenic non-human animal.

The terms "inducing an immune response" and "enhancing an immune response" are used interchangeably and refer to the stimulation of an immune response (i.e., either passive or adaptive) to a particular antigen. The term "induce" as used with respect to inducing CDC or ADCC refer to the stimulation of particular direct cell killing mechanisms.

As used herein, the terms "inhibits", "blocks", or "reduces" (e.g., when referring to inhibition/blocking of the CD277-mediated inhibition of an αβ T cell) are used interchangeably and encompass both partial and complete inhibition/blocking as well as direct and allosteric inhibition/blocking. For example, the inhibition/blocking of CD277 reduces or alters the normal level or type of activity that occurs from CD277 in a given system in the absence of inhibition or blocking. As used herein, "inhibition", "blocking", or "reduces" are also intended to include any measurable decrease in biological function and/or activity of a target (e.g. CD277). For example, when an antibody, or an antigen-binding fragment thereof (e.g., an anti-CD277 is in contact with the target as compared to the target not in contact with an antibody, an antigen-binding fragment. In some embodiments, an antibody, or antigen-binding fragment thereof, that targets CD277 inhibits or reduces CD277 function and/or activity in a given system by at least about 10%, 15%, 20%, 25%, 30%, 35%, 40%, 45%, 50%, 55%, 60%, 65%, 70%, 75%, 80%, 85%, 90%, 95%, 96%, 97%, 98%, 99%, or 100%.

As used herein, the term "inhibits growth" (e.g., referring to cells) is intended to include any measurable decrease in the growth of a cell. e.g., the inhibition of growth of a cell by at least about 10%, 20%, 30%, 40%, 50%, 60%, 70%, 80%, 90%, 99%, or 100%.

As used herein, a subject "in need of prevention," "in need of treatment," or "in need thereof," refers to one, who by the judgment of an appropriate medical practitioner (e.g., a doctor, a nurse, or a nurse practitioner in the case of humans; a veterinarian in the case of non-human mammals), would reasonably benefit from a given treatment (such as treatment with a composition comprising an anti-CD277 antibody).

The term "in vivo" refers to processes that occur in a living organism.

As used herein, the terms "induces", "increases", "enhances", or "stimulates" (e.g., when referring to an increase in one or both of αβ T cell and γδ T cell activity or T cell response) are used interchangeably and encompass both increases in activity and de novo activity (e.g., inducing activity from a previously undetectable level). The enhancement of CD277 increases the normal level or type of activity that occurs from CD277 in a given system in the absence of an anti-CD277 antibody or fragment thereof as the enhancer. Enhancement, induction, or stimulation are also intended to include any measurable increase in CD277 activity (or effect on a given cell type) when in contact with an anti-CD277 antibody as compared to CD277 not in contact with an anti-CD277 antibody, e.g., enhances/increases CD277 activity in a given system (CD277-mediated increases in T cell activity) by at least about 10%, 15%, 20%, 25%, 30%, 35%, 40%, 45%, 50%, 55%, 60%, 65%, 70%, 75%, 80%, 85%, 90%, 95%, 96%, 97%, 98%, 99%, or 100%, or at least about 1.5-fold, 2-fold, 3-fold, 4-fold, 5-fold, 10-fold, 20-fold, 50-fold, and the like.

The terms "inducing an immune response" and "enhancing an immune response" are used interchangeably and refer the stimulation of an immune response (i.e., either passive or adaptive) to a particular antigen.

As used herein, the term "isolated antibody" is intended to refer to an antibody which is substantially free of other antibodies having different antigenic specificities (e.g., an isolated antibody that specifically binds to human CD277 is substantially free of antibodies that specifically bind antigens other than CD277). An isolated antibody that specifically binds to an epitope may, however, have cross-reactivity to other CD277 proteins from different species. However, the antibody continues to display specific binding to human CD277 in a specific binding assay as described herein. In addition, an isolated antibody is typically substantially free of other cellular material and/or chemicals. In some embodiments, a combination of "isolated" antibodies having different CD277 specificities is combined in a well-defined composition.

As used herein, the term "isolated nucleic acid molecule" refers to nucleic acids encoding antibodies or antibody portions (e.g., $V_H$, $V_L$, CDR3) that bind to CD277, is intended to refer to a nucleic acid molecule in which the nucleotide sequences encoding the antibody or antibody portion are free of other nucleotide sequences encoding antibodies or antibody portions that bind antigens other than CD277, which other sequences may naturally flank the nucleic acid in human genomic DNA. For example, a sequence selected from a sequence set forth in Table 3 or Table 4 corresponds to the nucleotide sequences comprising the heavy chain ($V_H$) and light chain ($V_L$) variable regions of anti-CD277 antibody monoclonal antibodies described herein.

As used herein, "isotype" refers to the antibody class (e.g., IgM or IgG1) that is encoded by heavy chain constant region genes. In some embodiments, a human monoclonal antibody of the disclosure is of the IgG1 isotype. In some embodiments, a human monoclonal antibody of the disclosure is of the IgG2 isotype. In some embodiments, a human monoclonal antibody of the disclosure is of the IgG3 isotype. In some embodiments, a human monoclonal antibody of the disclosure is of the IgG4 isotype.

As used herein, the term "isotype switching" refers to the phenomenon by which the class, or isotype, of an antibody changes from one Ig class to one of the other Ig classes.

As used herein the term "KD" or "$K_D$" refers to the equilibrium dissociation constant of a binding reaction between an antibody and an antigen. The value of $K_D$ is a numeric representation of the ratio of the antibody off-rate constant (kd) to the antibody on-rate constant (ka). The value of KD is inversely related to the binding affinity of an antibody to an antigen. The smaller the $K_D$ value the greater the affinity of the antibody for its antigen. Affinity is the strength of binding of a single molecule to its ligand and is typically measured and reported by the equilibrium dissociation constant ($K_D$), which is used to evaluate and rank order strengths of bimolecular interactions.

As used herein, the term "kd" or "$k_d$" (alternatively "koff" or "$k_{off}$") is intended to refer to the off-rate constant for the dissociation of an antibody from an antibody/antigen complex. The value of kd is a numeric representation of the fraction of complexes that decay or dissociate per second, and is expressed in units sec-1.

As used herein, the term "ka" or "$k_a$" (alternatively "kon" or "$k_{on}$") is intended to refer to the on-rate constant for the association of an antibody with an antigen. The value of ka is a numeric representation of the number of antibody/antigen complexes formed per second in a 1 molar (1M) solution of antibody and antigen, and is expressed in units M-1 sec-1.

As used herein, the term "LCDR" means a light chain complementarity-determining region.

As used herein, the terms "linked," "fused", or "fusion", are used interchangeably. These terms refer to the joining together of two more elements or components or domains, by whatever means including chemical conjugation or recombinant means. Methods of chemical conjugation (e.g., using heterobifunctional crosslinking agents) are known in the art.

As used herein, "local administration" or "local delivery," refers to delivery that does not rely upon transport of the composition or agent to its intended target tissue or site via the vascular system. For example, the composition may be delivered by injection or implantation of the composition or agent or by injection or implantation of a device containing the composition or agent. Following local administration in the vicinity of a target tissue or site, the composition or agent, or one or more components thereof, may diffuse to the intended target tissue or site.

As used herein, "MHC molecules" refers to two types of molecules, MHC class I and MHC class II. MHC class I molecules present antigen to specific CD8+ T cells and MHC class II molecules present antigen to specific CD4+ T cells. Antigens delivered exogenously to APCs are processed primarily for association with MHC class II. In contrast, antigens delivered endogenously to APCs are processed primarily for association with MHC class I.

As used herein, the term "monoclonal antibody" refers to an antibody which displays a single binding specificity and affinity for a particular epitope. Accordingly, the term "human monoclonal antibody" refers to an antibody which displays a single binding specificity and which has variable and optional constant regions derived from human germline immunoglobulin sequences. In some embodiments, human monoclonal antibodies are produced by a hybridoma which includes a B cell obtained from a transgenic non-human animal, e.g., a transgenic mouse, having a genome comprising a human heavy chain transgene and a light chain transgene fused to an immortalized cell.

As used herein, the term "naturally-occurring" as applied to an object refers to the fact that an object can be found in nature. For example, a polypeptide or polynucleotide sequence that is present in an organism (including viruses) that can be isolated from a source in nature and which has not been intentionally modified by man in the laboratory is naturally-occurring.

As used herein, the term "nonswitched isotype" refers to the isotypic class of heavy chain that is produced when no isotype switching has taken place; the CH gene encoding the nonswitched isotype is typically the first CH gene immediately downstream from the functionally rearranged VDJ gene. Isotype switching has been classified as classical or non-classical isotype switching. Classical isotype switching occurs by recombination events which involve at least one switch sequence region in the transgene. Non-classical isotype switching may occur by, for example, homologous recombination between human $\sigma_\mu$ and human $\Sigma_\mu$ ($\delta$-associated deletion). Alternative non-classical switching mechanisms, such as intertransgene and/or interchromosomal recombination, among others, may occur and effectuate isotype switching.

As used herein, the term "nucleic acid" refers to deoxyribonucleotides or ribonucleotides and polymers thereof in either single- or double-stranded form. Unless specifically limited, the term encompasses nucleic acids containing known analogues of natural nucleotides that have similar binding properties as the reference nucleic acid and are metabolized in a manner similar to naturally occurring nucleotides. Unless otherwise indicated, a particular nucleic acid sequence also implicitly encompasses conservatively modified variants thereof (e.g., degenerate codon substitutions) and complementary sequences and as well as the sequence explicitly indicated. Specifically, degenerate codon substitutions can be achieved by generating sequences in which the third position of one or more selected (or all) codons is substituted with mixed-base and/or deoxyinosine residues (Batzer et al., Nucleic Acid Res. 19:5081, 1991; Ohtsuka et al., Biol. Chem. 260:2605-2608, 1985; and Cassol et al, 1992; Rossolini et al, Mol. Cell. Probes 8:91-98, 1994). For arginine and leucine, modifications at the second base can also be conservative. The term nucleic acid is used interchangeably with gene, cDNA, and mRNA encoded by a gene.

Polynucleotides used herein can be composed of any polyribonucleotide or polydeoxribonucleotide, which can be unmodified RNA or DNA or modified RNA or DNA. For example, polynucleotides can be composed of single- and double-stranded DNA, DNA that is a mixture of single- and double-stranded regions, single- and double-stranded RNA, and RNA that is mixture of single- and double-stranded regions, hybrid molecules comprising DNA and RNA that can be single-stranded or, more typically, double-stranded or a mixture of single- and double-stranded regions. In addition, the polynucleotide can be composed of triple-stranded regions comprising RNA or DNA or both RNA and DNA. A polynucleotide can also contain one or more modified bases or DNA or RNA backbones modified for stability or for other reasons. "Modified" bases include, for example, tritylated bases and unusual bases such as inosine. A variety of modifications can be made to DNA and RNA; thus, "polynucleotide" embraces chemically, enzymatically, or metabolically modified forms.

A nucleic acid is "operably linked" when it is placed into a functional relationship with another nucleic acid sequence. For instance, a promoter or enhancer is operably linked to a coding sequence if it affects the transcription of the sequence. With respect to transcription regulatory sequences, operably linked means that the DNA sequences being linked are contiguous and, where necessary to join two protein coding regions, contiguous and in reading frame. For switch sequences, operably linked indicates that the sequences are capable of effecting switch recombination.

As used herein, "parenteral administration," "administered parenterally," and other grammatically equivalent phrases, refer to modes of administration other than enteral and topical administration, usually by injection, and include, without limitation, intravenous, intranasal, intraocular, intramuscular, intraarterial, intrathecal, intracapsular, intraorbital, intracardiac, intradermal, intraperitoneal, transtracheal, subcutaneous, subcuticular, intraarticular, subcapsular, subarachnoid, intraspinal, epidural, intracerebral, intracranial, intracarotid and intrasternal injection and infusion.

As used herein, the term "patient" includes human and other mammalian subjects that receive either prophylactic or therapeutic treatment.

The term "percent identity." in the context of two or more nucleic acid or polypeptide sequences, refer to two or more sequences or subsequences that have a specified percentage of nucleotides or amino acid residues that are the same, when compared and aligned for maximum correspondence, as measured using one of the sequence comparison algorithms described below (e.g., BLASTP and BLASTN or other algorithms available to persons of skill) or by visual inspection. Depending on the application, the "percent identity" can exist over a region of the sequence being compared, e.g., over a functional domain, or, alternatively, exist over the full length of the two sequences to be compared. For sequence comparison, typically one sequence acts as a reference sequence to which test sequences are compared. When using a sequence comparison algorithm, test and reference sequences are input into a computer, subsequence coordinates are designated, if necessary, and sequence algorithm program parameters are designated. The sequence comparison algorithm then calculates the percent sequence identity for the test sequence(s) relative to the reference sequence, based on the designated program parameters.

Optimal alignment of sequences for comparison can be conducted, e.g., by the local homology algorithm of Smith & Waterman, Adv. Appl. Math. 2:482 (1981), by the homology alignment algorithm of Needleman & Wunsch, J. Mol. Biol. 48:443 (1970), by the search for similarity method of Pearson & Lipman, Proc. Nat'l. Acad. Sci. USA 85:2444 (1988), by computerized implementations of these algorithms (GAP, BESTFIT, FASTA, and TFASTA in the Wisconsin Genetics Software Package, Genetics Computer Group, 575 Science Dr., Madison, Wis.), or by visual inspection (see generally Ausubel et al., infra).

One example of an algorithm that is suitable for determining percent sequence identity and sequence similarity is the BLAST algorithm, which is described in Altschul et al., J. Mol. Biol. 215:403-410 (1990). Software for performing BLAST analyses is publicly available through the National Center for Biotechnology Information website.

As generally used herein. "pharmaceutically acceptable" refers to those compounds, materials, compositions, and/or dosage forms which are, within the scope of sound medical judgment, suitable for use in contact with the tissues, organs, and/or bodily fluids of human beings and animals without excessive toxicity, irritation, allergic response, or other problems or complications commensurate with a reasonable benefit/risk ratio.

As used herein, a "pharmaceutically acceptable carrier" refers to, and includes, any and all solvents, dispersion media, coatings, antibacterial and antifungal agents, isotonic and absorption delaying agents, and the like that are physiologically compatible. The compositions can include a pharmaceutically acceptable salt, e.g., an acid addition salt or a base addition salt (see, e.g., Berge et al. (1977) *J Pharm Sci* 66:1-19).

As used herein, the term "phosphoantigen" means any non-peptidie antigens that include organic pyrophosphates.

As used herein, the terms "polypeptide," "peptide", and "protein" are used interchangeably to refer to a polymer of amino acid residues. The terms apply to amino acid polymers in which one or more amino acid residue is an artificial chemical mimetic of a corresponding naturally occurring amino acid, as well as to naturally occurring amino acid polymers and non-naturally occurring amino acid polymer.

As used herein, the term "preventing" when used in relation to a condition, refers to administration of a composition which reduces the frequency of, or delays the onset of, symptoms of a medical condition in a subject relative to a subject which does not receive the composition.

As used herein, the term "purified" or "isolated" as applied to any of the proteins (antibodies or fragments) described herein refers to a polypeptide that has been separated or purified from components (e.g., proteins or other naturally-occurring biological or organic molecules) which naturally accompany it, e.g., other proteins, lipids, and nucleic acid in a prokaryote expressing the proteins. Typically, a polypeptide is purified when it constitutes at least 60 (e.g., at least 65, 70, 75, 80, 85, 90, 92, 95, 97, or 99) %, by weight, of the total protein in a sample.

As used herein, the term "rearranged" refers to a configuration of a heavy chain or light chain immunoglobulin locus wherein a V segment is positioned immediately adjacent to a D-J or J segment in a conformation encoding essentially a complete $V_H$ or $V_L$ domain, respectively. A rearranged immunoglobulin gene locus can be identified by comparison to germline DNA; a rearranged locus will have at least one recombined heptamer/nonamer homology element.

As used herein, the term "receptor clustering" refers to a cellular process that results in grouping or local accumulation of a set of receptors at a particular cellular location, often to induce or amplify a signaling response. Many protein receptors bind cognate ligands and cluster, i.e., form dimers, trimers, oligomers or multimers, upon binding their cognate ligands. Cognate ligand-induced clustering (e.g., dimerization, multimerization) induces signal transduction through the receptor. Accordingly, in some embodiments, the antibodies, or antigen-binding fragments thereof, of the present disclosure can activate a receptor by binding to more than one receptor and induce or stabilize dimerization, trimerization, and/or multimerization with or without cognate ligand binding.

As used herein, the term "recombinant host cell" (or simply "host cell") is intended to refer to a cell into which a recombinant expression vector has been introduced. It should be understood that such terms are intended to refer not only to the particular subject cell but to the progeny of such a cell. Because certain modifications may occur in succeeding generations due to either mutation or environmental influences, such progeny may not, in fact, be identical to the parent cell, but are still included within the scope of the term "host cell" as used herein.

As used herein, the term "recombinant human antibody" includes all human antibodies that are prepared, expressed, created or isolated by recombinant means, such as (a) antibodies isolated from an animal (e.g., a mouse) that is transgenic or transchromosomal for human immunoglobulin genes or a hybridoma prepared therefrom, (b) antibodies isolated from a host cell transformed to express the antibody, e.g., from a transfectoma, (c) antibodies isolated from a recombinant, combinatorial human antibody library, and (d) antibodies prepared, expressed, created or isolated by any other means that involve splicing of human immunoglobulin gene sequences to other DNA sequences. Such recombinant human antibodies comprise variable and constant regions that utilize particular human germline immunoglobulin sequences are encoded by the germline genes, but include subsequent rearrangements and mutations which occur, for example, during antibody maturation. As known in the art (see, e.g., Lonberg (2005) Nature Biotech. 23 (9): 1117-1125), the variable region contains the antigen binding domain, which is encoded by various genes that rearrange to form an antibody specific for a foreign antigen. In addition to rearrangement, the variable region can be further modified by multiple single amino acid changes (referred to as somatic mutation or hypermutation) to increase the affinity of the antibody to the foreign antigen. The constant region will change in further response to an antigen (i.e., isotype switch). Therefore, the rearranged and somatically mutated nucleic acid molecules that encode the light chain and heavy chain immunoglobulin polypeptides in response to an antigen may not have sequence identity with the original nucleic acid molecules, but instead will be substantially identical or similar (i.e., have at least 80% identity).

As used herein, the term "SEQ ID NO" is synonymous with the term "Sequence ID No."

As used herein, the terms "specific binding," "selective binding," "selectively binds," and "specifically binds," refer to an antibody binding to an epitope on a predetermined antigen. The terms also apply to an antagonist binding to a target. Typically, the antibody or antagonist binds with an equilibrium dissociation constant (Kd) of approximately less than 10-6 M, such as approximately less than 10-7, 10-8 M. 10-9 M or 10-10 M or even lower when determined by surface plasmon resonance (SPR) technology in a BIA-CORE 2000 instrument. For example, when using the recombinant human CD277 extracellular domain as the analyte/predetermined antigen and an anti-CD277 antibody as the ligand, SPR can be used to measure binding of the ligand/antibody to the analyte/predetermined antigen with an affinity that is at least about two-fold greater than its affinity for binding to a non-specific antigen (e.g., BSA, casein) other than the predetermined antigen or a closely-related antigen. The phrases "an antibody recognizing an antigen" and "an antibody specific for an antigen" are used interchangeably herein with the term "an antibody which binds specifically to an antigen."

As used herein, the term "switch sequence" refers to those DNA sequences responsible for switch recombination. A "switch donor" sequence, typically a µ switch region, will be 5' (i.e., upstream) of the construct region to be deleted during the switch recombination. The "switch acceptor" region will be between the construct region to be deleted and the replacement constant region (e.g., γ, ε, etc.). As there is no specific site where recombination always occurs, the final gene sequence will typically not be predictable from the construct.

As used herein, the term "subject" includes any human or non-human animal. For example, the methods and compositions of the present invention can be used to treat a subject with an immune disorder. The term "non-human animal" includes all vertebrates, e.g., mammals and non-mammals, such as non-human primates, sheep, dog, cow, chickens, amphibians, reptiles, etc.

For nucleic acids, the term "substantial homology" indicates that two nucleic acids, or designated sequences thereof, when optimally aligned and compared, are identical, with appropriate nucleotide insertions or deletions, in at least about 80% of the nucleotides, usually at least about 90% to 95%, and more preferably at least about 98% to 99.5% of the nucleotides. Alternatively, substantial homology exists when the segments will hybridize under selective hybridization conditions, to the complement of the strand.

The percent identity between two sequences is a function of the number of identical positions shared by the sequences (i.e., % homology=#of identical positions/total #of positions×100), taking into account the number of gaps, and the length of each gap, which need to be introduced for optimal alignment of the two sequences. The comparison of sequences and determination of percent identity between two sequences can be accomplished using a mathematical algorithm, as described in the non-limiting examples below.

The percent identity between two nucleotide sequences can be determined using the GAP program in the GCG software package (available at www.gcg.com), using a NWSgapdna.CMP matrix and a gap weight of 40, 50, 60, 70, or 80 and a length weight of 1, 2, 3, 4, 5, or 6. The percent identity between two nucleotide or amino acid sequences can also be determined using the algorithm of E. Meyers and W. Miller (CABIOS. 4:11-17 (1989)) which has been incorporated into the ALIGN program (version 2.0), using a PAM120 weight residue table, a gap length penalty of 12 and a gap penalty of 4. In addition, the percent identity between two amino acid sequences can be determined using the Needleman and Wunsch (J. Mol. Biol. (48): 444-453 (1970)) algorithm which has been incorporated into the GAP program in the GCG software package (available at www.geg-.com), using either a Blossum 62 matrix or a PAM250 matrix, and a gap weight of 16, 14, 12, 10, 8, 6, or 4 and a length weight of 1, 2, 3, 4, 5, or 6.

The nucleic acid and protein sequences of the present disclosure can further be used as a "query sequence" to perform a search against public databases to, for example, identify related sequences. Such searches can be performed using the NBLAST and XBLAST programs (version 2.0) of Altschul, et al. (1990) J. Mol. Biol. 215:403-10. BLAST nucleotide searches can be performed with the NBLAST program, score=100, wordlength=12 to obtain nucleotide sequences homologous to the nucleic acid molecules of the invention. BLAST protein searches can be performed with the XBLAST program, score=50, wordlength=3 to obtain amino acid sequences homologous to the protein molecules of the invention. To obtain gapped alignments for comparison purposes. Gapped BLAST can be utilized as described in Altschul et al., (1997) Nucleic Acids Res. 25 (17): 3389-3402. When utilizing BLAST and Gapped BLAST programs, the default parameters of the respective programs (e.g., XBLAST and NBLAST) can be used. See www.ncbi.nlm.nih.gov.

The nucleic acids may be present in whole cells, in a cell lysate, or in a partially purified or substantially pure form. A nucleic acid is "isolated" or "rendered substantially pure" when purified away from other cellular components or other contaminants, e.g., other cellular nucleic acids or proteins, by standard techniques, including alkaline/SDS treatment, CsCl banding, column chromatography, agarose gel electrophoresis and others well known in the art. See, F. Ausubel, et al., ed. Current Protocols in Molecular Biology, Greene Publishing and Wiley Interscience, New York (1987).

The nucleic acid compositions of the present disclosure, while often in a native sequence (except for modified restriction sites and the like), from either cDNA, genomic or mixtures thereof may be mutated, in accordance with standard techniques to provide gene sequences. For coding sequences, these mutations, may affect amino acid sequence as desired. In particular, DNA sequences substantially homologous to or derived from native V, D. J, constant, switches and other such sequences described herein are contemplated (where "derived" indicates that a sequence is identical or modified from another sequence).

As used herein, the term "tumor microenvironment" (alternatively "cancer microenvironment"; abbreviated TME) refers to the cellular environment or milieu in which the tumor or neoplasm exists, including surrounding blood vessels as well as non-cancerous cells including, but not limited to, immune cells, fibroblasts, bone marrow-derived inflammatory cells, and lymphocytes. Signaling molecules and the extracellular matrix also comprise the TME. The tumor and the surrounding microenvironment are closely related and interact constantly. Tumors can influence the microenvironment by releasing extracellular signals, promoting tumor angiogenesis and inducing peripheral immune tolerance, while the immune cells in the microenvironment can affect the growth and evolution of tumor cells.

The term "T cell" refers to a type of white blood cell that can be distinguished from other white blood cells by the presence of a T cell receptor on the cell surface. There are several subsets of T cells, including, but not limited to, T helper cells (a.k.a. $T_H$ cells or $CD4^+$ T cells) and subtypes, including $T_H1$, $T_H2$, $T_H3$, $T_H17$, $T_H9$, and $T_{FH}$ cells, cytotoxic T cells (a.k.a $T_C$ cells, $CD8^+$ T cells, cytotoxic T lymphocytes, T-killer cells, killer T cells), memory T cells and subtypes, including central memory T cells ($T_{CM}$ cells), effector memory T cells ($T_{EM}$ and $T_{EMRA}$ cells), and resident memory T cells ($T_{RM}$ cells), regulatory T cells (a.k.a. $T_{reg}$ cells or suppressor T cells) and subtypes, including $CD4^+$ $FOXP3^+$ $T_{reg}$ cells, $CD4^+FOXP3^-$ $T_{reg}$ cells, Tr1 cells, Th3 cells, and $T_{reg}$ 17 cells, natural killer T cells (a.k.a. NKT cells), mucosal associated invariant T cells (MAITs), and gamma delta T cells (γδ T cells), including Vγ9/Vδ2 T cells. Any one or more of the aforementioned or unmentioned T cells can be the target cell type for a method of use of the invention.

As used herein, the term "T cell activation" or "activation of T cells" refers to a cellular process in which mature T cells, which express antigen-specific T cell receptors on their surfaces, recognize their cognate antigens and respond by entering the cell cycle, secreting cytokines or lytic enzymes, and initiating or becoming competent to perform cell-based effector functions. T cell activation requires at least two signals to become fully activated. The first occurs after engagement of the T cell antigen-specific receptor (TCR) by the antigen-major histocompatibility complex (MHC), and the second by subsequent engagement of co-stimulatory molecules (e.g., CD28). These signals are transmitted to the nucleus and result in clonal expansion of T cells, upregulation of activation markers on the cell surface, differentiation into effector cells, induction of cytotoxicity or cytokine secretion, induction of apoptosis, or a combination thereof.

As used herein, the term "T cell-mediated response" refers to any response mediated by T cells, including, but not limited to, effector T cells (e.g., $CD8^+$ cells) and helper T cells (e.g., $CD4^+$ cells). T cell mediated responses include, for example, T cell cytotoxicity and proliferation.

As used herein, the terms "therapeutically effective amount" or "therapeutically effective dose," or similar terms used herein are intended to mean an amount of an agent (e.g., an anti-CD277 antibody or an antigen-binding fragment thereof) that will elicit the desired biological or medical response (e.g., an improvement in one or more symptoms of a cancer).

The terms "treat," "treating," and "treatment," as used herein, refer to therapeutic or preventative measures described herein. The methods of "treatment" employ administration to a subject, in need of such treatment, a human antibody of the present disclosure, for example, a subject in need of an enhanced immune response against a particular antigen or a subject who ultimately may acquire such a disorder, in order to prevent, cure, delay, reduce the severity of, or ameliorate one or more symptoms of the disorder or recurring disorder, or in order to prolong the survival of a subject beyond that expected in the absence of such treatment.

As used herein, the term "unrearranged" or "germline configuration" refers to the configuration wherein the V segment is not recombined so as to be immediately adjacent to a D or J segment.

As used herein, the term "vector" is intended to refer to a nucleic acid molecule capable of transporting another nucleic acid to which it has been linked. One type of vector is a "plasmid." which refers to a circular double stranded DNA loop into which additional DNA segments may be ligated. Another type of vector is a viral vector, wherein additional DNA segments may be ligated into the viral genome. Certain vectors are capable of autonomous replication in a host cell into which they are introduced (e.g., bacterial vectors having a bacterial origin of replication and episomal mammalian vectors). Other vectors (e.g., non-episomal mammalian vectors) can be integrated into the genome of a host cell upon introduction into the host cell, and thereby are replicated along with the host genome. Moreover, certain vectors are capable of directing the expression of genes to which they are operatively linked. Such vectors are referred to herein as "recombinant expression vectors" (or simply, "expression vectors") In general, expression vectors of utility in recombinant DNA techniques are often in the form of plasmids. In the present specification. "plasmid" and "vector" may be used interchangeably as the plasmid is the most commonly used form of vector. However, the invention is intended to include such other forms of expression vectors, such as viral vectors (e.g., replication defective retroviruses, adenoviruses and adeno-associated viruses), which serve equivalent functions.

As used herein, the term "VH" means a variable heavy domain.

As used herein, the term "VL" means a variable light domain.

Reference to particular amino acids may be made in respect of common 1-letter or 3-letter codes as commonly understood by persons skilled in the art. Any reference to an "X" amino acid is reference to a variable amino acid. Amino acids can be modified as described herein.

Unless otherwise defined, all technical and scientific terms used herein have the same meaning as commonly understood by one of ordinary skill in the art to which this disclosure pertains. Preferred methods and materials are described below, although methods and materials similar or equivalent to those described herein can also be used in the practice or testing of the presently disclosed methods and compositions. All publications, patent applications, patents, and other references mentioned herein are incorporated by reference in their entireties.

Anti-CD277 Antibodies and Antigen-Binding Fragments Thereof

Provided herein are isolated antibodies, or antigen-binding fragments thereof, which bind to human CD277. CD277 is a member of the butyrophilin subfamily 3 (BTN3), and shares sequence similarities and structural features with certain B7 family members. CD277 is expressed on numerous immune cell types including T cells, NK cells, and antigen-presenting cells such as macrophages and dendritic cells (see for e.g.: Messal et al. (2011) Eur. J. Immunol. 41 (12): 3443-54; and Cubillos-Ruiz et al. (2010) Oncotarget 1 (5) 329-38). An exemplary amino acid sequence for human CD277 is as follows: MKMASFLAFLLLN-FRVCLLLLQLLMPHSAQFSVLGPSGPILAMVGE-DADLPCHLFPTMS AETMELKWVSSSLRQVVNVY-ADGKEVEDRQSAPYRGRTSILRDGITAGKAALRIHN VT ASDSGKYLCYFQDGDFYEKALVELKVAAL-GSDLHVDVKGYKDGGIHLECRSTGWYPQ PQIQWSNNKGENIPTVEAPVVADGVGLYAVAASVI-MRGSSGEGVSCTIRSSLLGLEKTAS ISIADPFFR-SAQRWIAALAGTLPVLLLLLG-GAGYFLWQQQEEKKTQFRKKKREQELREM AWSTMKQEQSTRVKLLEELRWRSIQYASRGERHSAY NEWKKALFKPADVILDP33KTA NPILL-VSEDQRSVQRAKEPQDLPDNPERFNWHYCVLGCES-FISGRHYWEVEVGDRKEW HIGVCSKNVQRKGWVKMT-PENGFWTMGLTDGNKYRTLTEPRTNLKLPKPPKKVG VFL DYETGDISFYNAVDGSHIHT-FLDVSFSEALYPVFRILTLEPTALTICPA (SEQ ID NO: 2, Uniprot ID No. O00481).

In some embodiments, an anti-CD277 antibody or fragment thereof, described herein, activates cytokine production and/or proliferation of γδ T cells. In some embodiments, the antibody or antigen-binding fragment induces or enhances CD277-mediated γδ T cell stimulation in the absence of one or both of: (i) a phosphoantigen (e.g., in the absence of phosphoantigen accumulation, such as phosphoantigen accumulation resulting from treatment of a cell with zoledronate), and (ii) a co-stimulatory signal. In some embodiments, the antibody or antigen-binding fragment reduces CD277-mediated inhibition of γδ T cells in the absence of one or both of: (i) a phosphoantigen (e.g., in the absence of phosphoantigen accumulation, such as phosphoantigen accumulation resulting from treatment of a cell with zoledronate), and (ii) a co-stimulatory signal. Phosphoantigen accumulation within a cell (e.g., a T cell, such as a γδ T cell) may be promoted by a bisphosphonate, such as zoledronate. Thus, in some embodiments, an antibody or antigen-binding fragment thereof described herein can induce or enhance CD277-mediated γδ T cell stimulation in the absence of zoledronate, which by way of promoting accumulation of phosphoantigens in a cell, can itself promote CD277-mediated γδ T cell stimulation. In embodiments, the co-stimulatory signal results from CD3 engagement or CD28 engagement.

In some embodiments, the anti-CD277 antibody or fragment thereof co-stimulates T cells. In various embodiments, the anti-CD277 antibody or fragment thereof co-stimulates T cells together with CD3-TCR, and/or CD28-B7 engagement.

In some embodiments, the isolated antibody or antigen-binding fragment thereof induces or enhances CD277-mediated γδ T cell proliferation. In further embodiments, the isolated antibody or antigen-binding fragment thereof induces or enhances CD277-mediated cytokine production by a γδ T cell. The cytokine production may be IFNγ production.

In some embodiments, the isolated antibody or antigen-binding fragment thereof induces or enhances CD277-mediated αβ T cell proliferation. In further embodiments, the isolated antibody or antigen-binding fragment thereof induces or enhances CD277-mediated cytokine production by a αβ T cell. The cytokine production may be IFNγ production.

In some embodiments, the disclosure features an isolated antibody or antigen-binding fragment thereof that binds to human CD277, wherein the antibody or antigen-binding fragment reduces CD277-mediated inhibition of αβ T cells in the absence of one or both of: (i) a phosphoantigen (e.g., in the absence of phosphoantigen accumulation, such as phosphoantigen accumulation resulting from treatment of a cell with zoledronate), and (ii) a co-stimulatory signal. In some embodiments, the reduction of CD277-mediated inhibition of αβ T cells is CD277-mediated αβ T cell proliferation. In some embodiments, the reduction of CD277-mediated inhibition of αβ T cells is CD277-mediated cytokine production by a αβ T cell. In some embodiments, the cytokine production is IFNγ production.

In some embodiments, provided herein are isolated monoclonal antibodies or antigen binding fragments thereof, comprising heavy and light chain variable sequences as set forth in Tables 3 and 4.

In some embodiments, the anti-CD277 antibodies described herein comprise heavy and light chain CDRs selected from the group consisting of:
(a) heavy chain CDR1, CDR2 and CDR3 sequences set forth in SEQ ID NOs: 7-9, respectively, and light chain CDR1, CDR2 and CDR3 sequences set forth in SEQ ID NOs: 10-12, respectively;
(b) heavy chain CDR1. CDR2 and CDR3 sequences set forth in SEQ ID NOs: 43, 47 and 9, respectively, and light chain CDR1, CDR2 and CDR3 sequences set forth in SEQ ID NOs: 52, 58 and 62, respectively;
(c) heavy chain CDR1, CDR2 and CDR3 sequences set forth in SEQ ID NOs: 45, 49 and 9, respectively, and light chain CDR1, CDR2 and CDR3 sequences set forth in SEQ ID NOs: 57, 59 and 65, respectively;
(d) heavy chain CDR1, CDR2 and CDR3 sequences set forth in SEQ ID NOs: 44, 48 and 9 respectively, and light chain CDR1, CDR2 and CDR3 sequences set forth in SEQ ID NOs: 57, 61 and 64, respectively;
(e) heavy chain CDR1, CDR2 and CDR3 sequences set forth in SEQ ID NOs: 46, 50 and 9, respectively, and light chain CDR1, CDR2 and CDR3 sequences set forth in SEQ ID NOs: 56, 58 and 61, respectively;
(f) heavy chain CDR1, CDR2 and CDR3 sequences set forth in SEQ ID NOs: 46, 50 and 9, respectively, and light chain CDR1, CDR2 and CDR3 sequences set forth in SEQ ID NOs: 55, 60 and 62, respectively:
(g) heavy chain CDR1, CDR2 and CDR3 sequences set forth in SEQ ID NOs: 46, 50 and 9, respectively, and light chain CDR1, CDR2 and CDR3 sequences set forth in SEQ ID NOs: 54, 60 and 62, respectively;
(h) heavy chain CDR1, CDR2 and CDR3 sequences set forth in SEQ ID NOs: 43, 47 and 9, respectively, and light chain CDR1, CDR2 and CDR3 sequences set forth in SEQ ID NOs: 53, 59 and 63, respectively;
(i) heavy chain CDR1, CDR2 and CDR3 sequences set forth in SEQ ID NOs: 45, 49 and 9, respectively, and light chain CDR1, CDR2 and CDR3 sequences set forth in SEQ ID NOs: 53, 59 and 63, respectively;
(j) heavy chain CDR1, CDR2 and CDR3 sequences set forth in SEQ ID NOs: 44, 48 and 9, respectively, and light chain CDR1, CDR2 and CDR3 sequences set forth in SEQ ID NOs: 53, 59 and 63, respectively; and
(k) heavy chain CDR1, CDR2 and CDR3 sequences set forth in SEQ ID NOs: 43, 47 and 9, respectively, and light chain CDR1, CDR2 and CDR3 sequences set forth in SEQ ID NOs: 52, 58 and 62, respectively.

In some embodiments, the anti-CD277 antibodies described herein comprise heavy and light chain variable regions, wherein the heavy chain variable region comprises an amino acid sequence selected from the group consisting of SEQ ID NOs: 3, 32, 34, 36, 37, and 42; and wherein the light chain variable region comprises an amino acid sequence selected from the group consisting of SEQ ID NOs: 4, 33, 35, 38, 39, 40 and 41.

In some embodiments, the anti-CD277 antibodies described herein comprise a heavy chain variable region from an amino acid sequence selected from the group consisting of SEQ ID NOs: 3, 32, 34, 36, 37, and 42; and a light chain variable region from an amino acid sequence selected from the group consisting of SEQ ID NOs: 4, 33, 35, 38, 39, 40 and 41.

In some embodiments, the anti-CD277 antibodies described herein comprise heavy and light chain CDRs, wherein heavy chain CDR3 comprises the amino acid sequence set forth in SEQ ID NO: 9.

In some embodiments, the anti-CD277 antibodies described herein comprise heavy and light chain variable regions comprising amino acid sequences selected from the group consisting of:
(a) SEQ ID NO: 3 and 4, respectively;
(b) SEQ ID NO: 42 and 41, respectively;
(c) SEQ ID NO:36 and 41, respectively;
(d) SEQ ID NO: 34 and 40, respectively;
(e) SEQ ID NO: 37 and 33, respectively;
(f) SEQ ID NO: 37 and 39, respectively;
(g) SEQ ID NO: 37 and 38, respectively;
(h) SEQ ID NO: 32 and 35, respectively;
(i) SEQ ID NO: 36 and 35, respectively;
(j) SEQ ID NO: 34 and 35, respectively; and
(k) SEQ ID NO: 32 and 33, respectively.

In some embodiments, the anti-CD277 antibodies described herein comprise heavy and light chain variable regions of amino acid sequences selected from the group consisting of:
(a) SEQ ID NO: 3 and 4, respectively;
(b) SEQ ID NO: 42 and 41, respectively;
(c) SEQ ID NO:36 and 41, respectively;
(d) SEQ ID NO: 34 and 40, respectively;
(e) SEQ ID NO: 37 and 33, respectively;
(f) SEQ ID NO: 37 and 39, respectively;
(g) SEQ ID NO: 37 and 38, respectively:
(h) SEQ ID NO: 32 and 35, respectively;
(i) SEQ ID NO: 36 and 35, respectively:
(j) SEQ ID NO: 34 and 35, respectively; and
(k) SEQ ID NO: 32 and 33, respectively.

In some embodiments, the anti-CD277 antibodies described herein comprise heavy and light chain variable regions, wherein the heavy chain variable region comprises an amino acid sequence which is at least 90% identical to the amino acid sequence selected from the group consisting of SEQ ID NOs: 3, 32, 34, 36, 37, and 42; and wherein the light chain variable region comprises an amino acid sequence which is at least 90% identical to the amino acid sequence selected from the group consisting of SEQ ID NOs: 4, 33, 35, 38, 39, 40 and 41.

In some embodiments, the anti-CD277 antibodies described herein comprise heavy and light chain variable regions, wherein the heavy chain variable region comprises an amino acid sequence which is at least 90% identical to a heavy chain variable region of an amino acid sequence selected from the group consisting of SEQ ID NOs: 3, 32, 34, 36, 37, and 42; and wherein the light chain variable region comprises an amino acid sequence which is at least 90% identical to a light chain variable region of an amino acid sequence selected from the group consisting of SEQ ID NOs: 4, 33, 35, 38, 39, 40 and 41.

In some embodiments, the anti-CD277 antibodies described herein comprise heavy and light chain variable regions comprising amino acid sequences at least 90% identical to the amino acid sequences selected from the group consisting of:
(a) SEQ ID NO: 3 and 4, respectively;
(b) SEQ ID NO: 42 and 41, respectively;
(c) SEQ ID NO:36 and 41, respectively;
(d) SEQ ID NO: 34 and 40, respectively;
(e) SEQ ID NO: 37 and 33, respectively;
(f) SEQ ID NO: 37 and 39, respectively;
(g) SEQ ID NO: 37 and 38, respectively:
(h) SEQ ID NO: 32 and 35, respectively;
(i) SEQ ID NO: 36 and 35, respectively:
(j) SEQ ID NO: 34 and 35, respectively; and
(k) SEQ ID NO: 32 and 33, respectively.

In some embodiments, the anti-CD277 antibodies described herein comprise heavy and light chain variable regions comprising amino acid sequences at least 90% identical to the heavy and light chain variable regions of amino acid sequences selected from the group consisting of:
(a) SEQ ID NO: 3 and 4, respectively;
(b) SEQ ID NO: 42 and 41, respectively;
(c) SEQ ID NO:36 and 41, respectively;
(d) SEQ ID NO: 34 and 40, respectively;
(e) SEQ ID NO: 37 and 33, respectively;
(f) SEQ ID NO: 37 and 39, respectively;
(g) SEQ ID NO: 37 and 38, respectively;
(h) SEQ ID NO: 32 and 35, respectively;
(i) SEQ ID NO: 36 and 35, respectively;
(j) SEQ ID NO: 34 and 35, respectively; and
(k) SEQ ID NO: 32 and 33, respectively.

In some embodiments, the anti-CD277 antibodies described herein comprise heavy and light chain CDRs selected from the group consisting of:
(a) heavy chain CDR1, CDR2 and CDR3 sequences set forth in SEQ ID NOs: 7, 76, and 9, respectively, and light chain CDR1, CDR2 and CDR3 sequences set forth in SEQ ID NOs: 10-12, respectively;
(b) heavy chain CDR1, CDR2 and CDR3 sequences set forth in SEQ ID NOs: 43, 77, and 9, respectively, and light chain CDR1, CDR2 and CDR3 sequences set forth in SEQ ID NOs: 52, 81, and 62, respectively;
(c) heavy chain CDR1, CDR2 and CDR3 sequences set forth in SEQ ID NOs: 45, 79, and 9, respectively, and light chain CDR1, CDR2 and CDR3 sequences set forth in SEQ ID NOs: 57, 82, and 65, respectively;
(d) heavy chain CDR1, CDR2 and CDR3 sequences set forth in SEQ ID NOs: 44, 78, and 9 respectively, and light chain CDR1. CDR2 and CDR3 sequences set forth in SEQ ID NOs: 57, 84, and 64, respectively;
(e) heavy chain CDR1, CDR2 and CDR3 sequences set forth in SEQ ID NOs: 46, 80, and 9, respectively, and light chain CDR1, CDR2 and CDR3 sequences set forth in SEQ ID NOs: 56, 81, and 62, respectively;
(f) heavy chain CDR1, CDR2 and CDR3 sequences set forth in SEQ ID NOs: 46, 80, and 9, respectively, and light chain CDR1, CDR2 and CDR3 sequences set forth in SEQ ID NOs: 55, 83, and 62, respectively;
(g) heavy chain CDR1, CDR2 and CDR3 sequences set forth in SEQ ID NOs: 46, 80, and 9, respectively, and light chain CDR1, CDR2 and CDR3 sequences set forth in SEQ ID NOs: 54, 83, and 62, respectively;
(h) heavy chain CDR1, CDR2 and CDR3 sequences set forth in SEQ ID NOs: 43, 77, and 9, respectively, and light chain CDR1, CDR2 and CDR3 sequences set forth in SEQ ID NOs: 53, 82, and 63, respectively;
(i) heavy chain CDR1, CDR2 and CDR3 sequences set forth in SEQ ID NOs: 45, 79, and 9, respectively, and light chain CDR1, CDR2 and CDR3 sequences set forth in SEQ ID NOs: 53, 82, and 63, respectively:
(j) heavy chain CDR1, CDR2 and CDR3 sequences set forth in SEQ ID NOs: 44, 78, and 9, respectively, and light chain CDR1, CDR2 and CDR3 sequences set forth in SEQ ID NOs: 53, 82, and 63, respectively;
(k) heavy chain CDR1, CDR2 and CDR3 sequences set forth in SEQ ID NOs: 43, 77, and 9, respectively, and light chain CDR1, CDR2 and CDR3 sequences set forth in SEQ ID NOs: 52, 81, and 62, respectively; and
(l) heavy chain CDR1, CDR2 and CDR3 sequences set forth in SEQ ID NOs: 46, 50 and 9, respectively, and light chain CDR1, CDR2 and CDR3 sequences set forth in SEQ ID NOs: 56, 58 and 62, respectively.

In some embodiments, the anti-CD277 antibodies described herein comprise a heavy chain variable region from an amino acid sequence selected from the group consisting of SEQ ID NOs: 3, 87, 89, 91, 92, and 97; and a light chain variable region from an amino acid sequence selected from the group consisting of SEQ ID NOs: 4, 86, 88, 90, 93, 94, 95, and 96.

In some embodiments, the anti-CD277 antibodies or antigen-binding portions described herein comprise heavy and light chain variable regions of amino acid sequences selected from the group consisting of:
(a) SEQ ID NO: 3 and 86, respectively;
(b) SEQ ID NO: 97 and 96, respectively;
(c) SEQ ID NO: 91 and 96, respectively;
(d) SEQ ID NO: 89 and 95, respectively;
(e) SEQ ID NO: 92 and 88, respectively;
(f) SEQ ID NO: 92 and 94, respectively:
(g) SEQ ID NO: 92 and 93, respectively;
(h) SEQ ID NO: 87 and 90, respectively;
(i) SEQ ID NO: 91 and 90, respectively;
(j) SEQ ID NO: 89 and 90, respectively; and
(k) SEQ ID NO: 87 and 88, respectively.

In some embodiments, the anti-CD277 antibodies or antigen-binding portions described herein comprise a heavy chain variable region having an amino acid sequence which is at least 90% identical to the heavy chain variable region of an amino acid sequence selected from the group consisting of SEQ ID NOs: 3, 87, 89, 91, 92, and 97: a light chain variable region having an amino acid sequence which is at least 90% identical to the light chain variable region of an amino acid sequence selected from the group consisting of SEQ ID NOs: 4, 86, 88, 90, 93, 94, 95 and 96.

In some embodiments, the anti-CD277 antibodies described herein comprise a heavy chain comprising the amino acid sequence set forth in SEQ ID NO: 74, and a light chain comprising the amino acid sequence set forth in SEQ ID NO: 75.

In some embodiments, the anti-CD277 antibodies described herein the antibody comprise a heavy chain comprising an amino acid sequence at least 90% identical (e.g., at least 90%, at least 91%, at least 92%, at least 93%, at least 94%, at least 95, at least 96%, at least 97%, at least 98%, or at least 99% identical) to SEQ ID NO: 74, and a light chain comprising an amino acid sequence at least 90% identical (e.g., at least 90%, at least 91%, at least 92%, at least 93%, at least 94%, at least 95, at least 96%, at least 97%, at least 98%, or at least 99% identical) to SEQ ID NO: 75.

In some embodiments provided herein are anti-CD277 antibodies that specifically bind to human CD277 and comprise a heavy chain CDR3 having the amino acid sequence RHSXXIXYYYXXD (SEQ ID NO: 99), wherein X is any amino acid. In some embodiments provided herein are anti-CD277 antibodies that specifically bind to human CD277 and comprise a heavy chain CDR3 having the amino acid sequence RHSXMIGYYYXXD (SEQ ID NO: 100), wherein X is any amino acid. In some embodiments, X is any amino acid except for alanine.

In some embodiments provided herein are anti-CD277 antibodies that specifically bind to human CD277 and comprise a heavy chain CDR3 comprising the amino acid sequence $RHSX_1X_2IX_3YYYX_4X_5D$ (SEQ ID NO: 101), wherein $X_1$ is any amino acid, $X_2$ is a non-polar amino acid, wherein $X_3$ is a non-polar amino acid, wherein $X_4$ is any amino acid, and wherein $X_5$ is any amino acid. In some embodiments, the anti-CD277 antibodies comprise a heavy chain CDR3 comprising the amino acid sequence $RHSX_1X_2IX_3YYYX_4X_5D$ (SEQ ID NO: 101), wherein $X_1$ is any amino acid, $X_2$ is methionine, wherein $X_3$ is glycine, wherein $X_4$ is any amino acid, and wherein $X_5$ is any amino acid.

In some embodiments, mutation of residues R95, H96, S97, I100, Y100B, Y100C, Y100D, D101, or combinations thereof, of SEQ ID NO: 66, results in loss of binding to human CD277. In some embodiments, mutation of residues M99, G100A or combinations thereof, of SEQ ID NO: 66, to alanine, results in reduction of binding to human CD277. In some embodiments, mutation of residues M99, G100A or combinations thereof, of SEQ ID NO: 66, to any residue except alanine, results in an increase of binding to human CD277.

In some embodiments, the anti-CD277 antibodies described herein comprise heavy chain CDR1, CDR2 and CDR3 sequences set forth in SEQ ID NOs: 7-9, respectively, and light chain CDR1, CDR2 and CDR3 sequences set forth in SEQ ID NOs: 10-12, respectively. In some embodiments, the anti-CD277 antibodies described herein comprise heavy chain CDR1, CDR2 and CDR3 sequences set forth in SEQ ID NOs: 7, 76, and 9, respectively, and light chain CDR1, CDR2 and CDR3 sequences set forth in SEQ ID NOs: 10-12, respectively.

In some embodiments, the anti-CD277 antibodies described herein comprise heavy and light chain variable regions comprising amino acid sequences set forth in SEQ ID NOs: 3 and 4, respectively. In some embodiments, the anti-CD277 antibodies described herein comprise heavy and light chain variable regions comprising amino acid sequences set forth in SEQ ID NOs: 3 and 86, respectively.

In some embodiments, the anti-CD277 antibodies described herein comprise heavy and light chain variable regions, wherein the heavy chain variable region comprises an amino acid sequence which is at least 70%, at least 75%, at least 80%, at least 85%, at least 90%, at least 91%, at least 92%, at least 93%, at least 94%, at least 95%, at least 96%, at least 97%, at least 98%, or at least 99% identical to SEQ ID NO: 3; and wherein the light chain variable region comprises an amino acid sequence which is at least 70%, at least 75%, at least 80%, at least 85%, at least 90%, at least 91%, at least 92%, at least 93%, at least 94%, at least 95%, at least 96%, at least 97%, at least 98%, or at least 99% identical to SEQ ID NO: 4.

In some embodiments, the anti-CD277 antibodies described herein comprise heavy and light chain variable regions, wherein the heavy chain variable region comprises an amino acid sequence which is at least 70%, at least 75%, at least 80%, at least 85%, at least 90%, at least 91%, at least 92%, at least 93%, at least 94%, at least 95%, at least 96%, at least 97%, at least 98%, or at least 99% identical to SEQ ID NO: 3; and wherein the light chain variable region comprises an amino acid sequence which is at least 70%, at least 75%, at least 80%, at least 85%, at least 90%, at least 91%, at least 92%, at least 93%, at least 94%, at least 95%, at least 96%, at least 97%, at least 98%, or at least 99% identical to SEQ ID NO: 86.

In some embodiments, the anti-CD277 antibodies described herein comprise heavy and light chain variable regions, wherein the heavy chain variable region comprises an amino acid sequence which is at least 90% identical (e.g., at least 90%, at least 91%, at least 92%, at least 93%, at least 94%, at least 95, at least 96%, at least 97%, at least 98%, or at least 99% identical) to SEQ ID NO: 3; and wherein the light chain variable region comprises an amino acid sequence which is at least 90% identical (e.g., at least 90%, at least 91%, at least 92%, at least 93%, at least 94%, at least 95, at least 96%, at least 97%, at least 98%, or at least 99% identical) to SEQ ID NO: 4.

In some embodiments, the anti-CD277 antibodies described herein comprise heavy and light chain variable regions, wherein the heavy chain variable region comprises an amino acid sequence which is at least 90% identical (e.g., at least 90%, at least 91%, at least 92%, at least 93%, at least 94%, at least 95, at least 96%, at least 97%, at least 98%, or at least 99% identical) to SEQ ID NO: 3; and wherein the light chain variable region comprises an amino acid sequence which is at least 90% identical (e.g., at least 90%, at least 91%, at least 92%, at least 93%, at least 94%, at least 95, at least 96%, at least 97%, at least 98%, or at least 99% identical) to SEQ ID NO: 86.

In some such embodiments, the heavy chain variable region comprises an amino acid sequence that differs by 15 amino acids or less, 14 amino acids or less, 13 amino acids or less, 12 amino acids or less, 11 amino acids or less, 10 amino acids or less, 9 amino acids or less, 8 amino acids or less, 7 amino acids or less, 6 amino acids or less, 5 amino acids or less, 4 amino acids or less, 3 amino acids or less. 2 amino acids or less, or 1 amino acid from SEQ ID NO: 3. In some such embodiments, the light chain variable region comprises an amino acid sequence that differs by 15 amino acids or less, 14 amino acids or less, 13 amino acids or less, 12 amino acids or less, 11 amino acids or less, 10 amino acids or less, 9 amino acids or less, 8 amino acids or less, 7 amino acids or less, 6 amino acids or less, 5 amino acids or less, 4 amino acids or less, 3 amino acids or less, 2 amino acids or less, or 1 amino acid from SEQ ID NO: 4 or SEQ ID NO: 86.

In some embodiments, the CDRs of the antibody or antigen-binding portion thereof comprise about residues 24-34 (CDR1), 50-56 (CDR2), and 89-97 (CDR3) in the light chain variable domain of SEQ ID NO: 4, and 27-35 (CDR1), 49-60 (CDR2), and 93-102 (CDR3) in the heavy chain variable domain of SEQ ID NO: 3, when numbered according to Chothia numbering. In some embodiments, CDR2 in the light chain variable domain of SEQ ID NO: 4 or SEQ ID NO: 86 can comprise amino acids 49-56, when numbered according to Chothia numbering.

The disclosure also provides, in some embodiments, an antibody or antigen-binding portion thereof that comprises heavy chain CDRs of the heavy chain variable region of SEQ ID NO: 3, and light chain CDRs of the light chain variable region of SEQ ID NO: 4 or SEQ ID NO: 86, wherein the heavy and light chain CDR residues are numbered according to Kabat.

The disclosure also provides, in some embodiments, an antibody or antigen-binding portion thereof that comprises heavy chain CDRs of the heavy chain variable region of SEQ ID NO: 3, and light chain CDRs of the light chain variable region of SEQ ID NO: 4 or SEQ ID NO: 86, wherein the heavy and light chain CDR residues are numbered according to Chothia.

The disclosure also provides, in some embodiments, an antibody or antigen-binding portion thereof that comprises heavy chain CDRs of the heavy chain variable regions of SEQ ID NO: 3, and light chain CDRs of the light chain variable region of SEQ ID NO: 4 or SEQ ID NO: 86, wherein the heavy and light chain CDR residues are numbered according to MacCallum.

The disclosure also provides, in some embodiments, an antibody or antigen-binding portion thereof that comprises heavy chain CDRs of the heavy chain variable regions of SEQ ID NO: 3, and light chain CDRs of the light chain variable region of SEQ ID NO: 4 or SEQ ID NO: 86, wherein the heavy and light chain CDR residues are numbered according to AbM.

The disclosure also provides, in some embodiments, an antibody or antigen-binding portion thereof that comprises heavy chain CDRs of the heavy chain variable regions of SEQ ID NO: 3, and light chain CDRs of the light chain variable region of SEQ ID NO: 4 or SEQ ID NO: 86, wherein the heavy and light chain CDR residues are numbered according to IMGT.

In some embodiments, the anti-CD277 antibodies described herein comprise heavy and light chain variable regions, wherein the heavy chain variable region comprises an amino acid sequence which is at least 70%, at least 75%, at least 80%, at least 85%, at least 90%, at least 91%, at least 92%, at least 93° C., at least 94%, at least 95%, at least 96%, at least 97%, at least 98%, or at least 99% identical to SEQ ID NO: 3; and wherein the light chain variable region comprises an amino acid sequence which is at least 70%, at least 75%, at least 80%, at least 85%, at least 90%, at least 91%, at least 92%, at least 93%, at least 94%, at least 95%, at least 96%, at least 97%, at least 98%, or at least 99% identical to SEQ ID NO: 4 or SEQ ID NO: 86.

In some embodiments, the anti-CD277 antibodies described herein comprise heavy and light chain variable regions, wherein the heavy chain variable region comprises an amino acid sequence which is at least 90% identical (e.g., at least 90%, at least 91%, at least 92%, at least 93%, at least 94%, at least 95, at least 96%, at least 97%, at least 98%, or at least 99% identical) to SEQ ID NO: 3; and wherein the light chain variable region comprises an amino acid sequence which is at least 90% identical (e.g., at least 90%, at least 91%, at least 92%, at least 93%, at least 94%, at least 95, at least 96%, at least 97%, at least 98%, or at least 99% identical) to SEQ ID NO: 4 or SEQ ID NO: 86.

In some such embodiments, the heavy chain variable region comprises an amino acid sequence that differs by 15 amino acids or less, 14 amino acids or less, 13 amino acids or less, 12 amino acids or less, 11 amino acids or less, 10 amino acids or less, 9 amino acids or less, 8 amino acids or less, 7 amino acids or less, 6 amino acids or less, 5 amino acids or less, 4 amino acids or less, 3 amino acids or less, 2 amino acids or less, or 1 amino acid from SEQ ID NO: 3. In some such embodiments, the light chain variable region comprises an amino acid sequence that differs by 15 amino acids or less, 14 amino acids or less, 13 amino acids or less, 12 amino acids or less, 11 amino acids or less, 10 amino acids or less, 9 amino acids or less, 8 amino acids or less, 7 amino acids or less, 6 amino acids or less, 5 amino acids or less, 4 amino acids or less, 3 amino acids or less, 2 amino acids or less, or 1 amino acid from SEQ ID NO: 4 or SEQ ID NO: 86.

Methods of Producing Antibodies

The disclosure also features methods for producing any of the antibodies or antigen-binding fragments thereof described herein. In some embodiments, methods for preparing an antibody described herein can include immunizing a subject (e.g., a non-human mammal) with an appropriate immunogen. Suitable immunogens for generating any of the antibodies described herein are set forth herein. For example, to generate an antibody that binds to CD277, a skilled artisan can immunize a suitable subject (e.g., a nonhuman mammal such as a rat, a mouse, a gerbil, a hamster, a dog, a cat, a pig, a goat, a horse, or a non-human primate) with the extracellular domain of human CD277 (e.g., having SEQ ID NO: 13): QFSVLGPSGPILAMVGE-DADLPCHLFPTMSAETMELKWVSSSLRQVVNVY-ADGKEVED ROSAPYRGRTSILRDGITAGKAAL-RIHNVTASDSGKYLCYFQDGDFYEKALVELKVAAL GSDLHVDVKGYKDGGIHLE-CRSTGWYPQPQIQWSNNKGENIPTVEAPVVADGVG-LYAV AASVIMRGSSGEGVSCTIRSSLLGLEKTASI-SIADPFFRSAQRWIAALAG.

A suitable subject (e.g., a non-human mammal) can be immunized with the appropriate antigen along with subsequent booster immunizations a number of times sufficient to elicit the production of an antibody by the mammal. The immunogen can be administered to a subject (e.g., a non-human mammal) with an adjuvant. Adjuvants useful in producing an antibody in a subject include, but are not limited to, protein adjuvants; bacterial adjuvants, e.g., whole bacteria (BCG, *Corynebacterium parvum* or *Salmonella minnesota*) and bacterial components including cell wall skeleton, trehalose dimycolate, monophosphoryl lipid A, methanol extractable residue (MER) of tubercle *bacillus*, complete or incomplete Freund's adjuvant; viral adjuvants; chemical adjuvants, e.g., aluminum hydroxide, and iodoacetate and cholesteryl hemisuccinate. Other adjuvants that can be used in the methods for inducing an immune response include, e.g., cholera toxin and parapoxvirus proteins. See also Bieg et al. (1999) *Autoimmunity* 31 (1): 15-24. See also, e.g., Lodmell et al. (2000) *Vaccine* 18:1059-1066; Johnson et al. (1999) *J Med Chem* 42:4640-4649; Baldridge et al. (1999) *Methods* 19:103-107; and Gupta et al. (1995) *Vaccine* 13 (14): 1263-1276.

In some embodiments, the methods include preparing a hybridoma cell line that secretes a monoclonal antibody that binds to the immunogen. For example, a suitable mammal such as a laboratory mouse is immunized with a CD277 polypeptide as described above. Antibody-producing cells (e.g., B cells of the spleen) of the immunized mammal can be isolated two to four days after at least one booster immunization of the immunogen and then grown briefly in culture before fusion with cells of a suitable myeloma cell line. The cells can be fused in the presence of a fusion promoter such as, e.g., vaccinia virus or polyethylene glycol. The hybrid cells obtained in the fusion are cloned, and cell clones secreting the desired antibodies are selected. For example, spleen cells of Balb/c mice immunized with a suitable immunogen can be fused with cells of the myeloma cell line PAI or the myeloma cell line Sp2/0-Ag 14. After the fusion, the cells are expanded in suitable culture medium, which is supplemented with a selection medium, for example HAT medium, at regular intervals in order to prevent normal myeloma cells from overgrowing the desired hybridoma cells. The obtained hybrid cells are then screened for secretion of the desired antibodies (e.g., an antibody that binds to human CD277 and enhances CD277-mediated stimulation of γδ T cells).

In some embodiments, a skilled artisan can identify an antibody of interest from a non-immune biased library as described in, e.g., U.S. Pat. No. 6,300,064 (to Knappik et al.; Morphosys AG) and Schoonbroodt et al. (2005) *Nucleic Acids Res* 33 (9): e81.

In some embodiments, the methods described herein can involve, or be used in conjunction with, e.g., phage display technologies, bacterial display, yeast surface display, eukaryotic viral display, mammalian cell display, and cell-free (e.g., ribosomal display) antibody screening techniques (see, e.g., Etz et al. (2001) *J Bacteriol* 183:6924-6935; Cornelis (2000) *Curr Opin Biotechnol* 11:450-454; Klemm et al. (2000) *Microbiology* 146:3025-3032; Kieke et al. (1997) *Protein Eng* 10:1303-1310; Yeung et al. (2002) *Biotechnol Prog* 18:212-220; Boder et al. (2000) *Methods Enzymology* 328:430-444; Grabherr et al. (2001) *Comb Chem High Throughput Screen* 4:185-192; Michael et al. (1995) *Gene Ther* 2:660-668; Pereboev et al. (2001) *J Virol* 75:7107-7113; Schaffitzel et al. (1999) *J Immunol Methods* 231:119-135; and Hanes et al. (2000) *Nat Biotechnol* 18:1287-1292).

Methods for identifying antibodies using various phage display methods are known in the art. In phage display methods, functional antibody domains are displayed on the surface of phage particles which carry the polynucleotide sequences encoding them. Such phage can be utilized to display antigen-binding domains of antibodies, such as Fab, Fv, or disulfide-bond stabilized Fv antibody fragments, expressed from a repertoire or combinatorial antibody library (e.g., human or murine). Phage used in these methods are typically filamentous phage such as fd and M13. The antigen binding domains are expressed as a recombinantly fused protein to any of the phage coat proteins pIII, pVIII, or pIX. See, e.g., Shi et al. (2010) *JMB* 397:385-396. Examples of phage display methods that can be used to make the immunoglobulins, or fragments thereof, described herein include those disclosed in Brinkman et al. (1995) *J Immunol Methods* 182:41-50; Ames et al. (1995) *J Immunol Methods* 184:177-186; Kettleborough et al. (1994) *Eur J Immunol* 24:952-958; Persic et al. (1997) *Gene* 187:9-18; Burton et al. (1994) *Advances in Immunology* 57:191-280; and PCT publication nos. WO 90/02809, WO 91/10737, WO 92/01047, WO 92/18619, WO 93/11236, WO 95/15982, and WO 95/20401. Suitable methods are also described in, e.g., U.S. Pat. Nos. 5,698,426; 5,223,409; 5,403,484; 5,580,717; 5,427,908; 5,750,753; 5,821,047; 5,571,698; 5,427,908; 5,516,637; 5,780,225; 5,658,727; 5,733,743 and 5,969,108.

In some embodiments, the phage display antibody libraries can be generated using mRNA collected from B cells from the immunized mammals. For example, a splenic cell sample comprising B cells can be isolated from mice immunized with a CD277 polypeptide as described above. mRNA can be isolated from the cells and converted to cDNA using standard molecular biology techniques. See, e.g., Sambrook et al. (1989) "Molecular Cloning: A Laboratory Manual, 2nd Edition," Cold Spring Harbor Laboratory Press, Cold Spring Harbor, N.Y.; Harlow and Lane (1988), supra; Benny K. C. Lo (2004), supra; and Borreback (1995), supra. The cDNA coding for the variable regions of the heavy chain and light chain polypeptides of immunoglobulins are used to construct the phage display library. Methods for generating such a library are described in, e.g., Merz et al. (1995) *J Neurosci*

*Methods* 62 (1-2): 213-9; Di Niro et al. (2005) *Biochem J* 388 (Pt 3): 889-894; and Engberg et al. (1995) *Methods Mol Biol* 51:355-376.

In some embodiments, a combination of selection and screening can be employed to identify an antibody of interest from, e.g., a population of hybridoma-derived antibodies or a phage display antibody library. Suitable methods are known in the art and are described in, e.g., Hoogenboom (1997) *Trends in Biotechnology* 15:62-70; Brinkman et al. (1995), supra; Ames et al. (1995), supra; Kettleborough et al. (1994), supra; Persic et al. (1997), supra; and Burton et al. (1994), supra. For example, a plurality of phagemid vectors, each encoding a fusion protein of a bacteriophage coat protein (e.g., pIII, pVIII, or pIX of M13 phage) and a different antigen-combining region are produced using standard molecular biology techniques and then introduced into a population of bacteria (e.g., *E. coli*). Expression of the bacteriophage in bacteria can, in some embodiments, require use of a helper phage. In some embodiments, no helper phage is required (see, e.g., Chasteen et al., (2006) *Nucleic Acids Res* 34 (21): e145). Phage produced from the bacteria are recovered and then contacted to, e.g., a target antigen bound to a solid support (immobilized). Phage may also be contacted to antigen in solution, and the complex is subsequently bound to a solid support.

A subpopulation of antibodies screened using the above methods can be characterized for their specificity and binding affinity for a particular antigen (e.g., human CD277) using any immunological or biochemical based method known in the art. For example, specific binding of an antibody to CD277, may be determined for example using immunological or biochemical based methods such as, but not limited to, an ELISA assay. SPR assays, immunoprecipitation assay, affinity chromatography, and equilibrium dialysis as described above. Immunoassays which can be used to analyze immunospecific binding and cross-reactivity of the antibodies include, but are not limited to, competitive and noncompetitive assay systems using techniques such as Western blots, RIA, ELISA (enzyme linked immunosorbent assay), "sandwich" immunoassays, immunoprecipitation assays, immunodiffusion assays, agglutination assays, complement-fixation assays, immunoradiometric assays, fluorescent immunoassays, and protein A immunoassays. Such assays are routine and well known in the art.

In embodiments where the selected CDR amino acid sequences are short sequences (e.g., fewer than 10-15 amino acids in length), nucleic acids encoding the CDRs can be chemically synthesized as described in, e.g., Shiraishi et al. (2007) *Nucleic Acids Symposium Series* 51 (1): 129-130 and U.S. Pat. No. 6,995,259. For a given nucleic acid sequence encoding an acceptor antibody, the region of the nucleic acid sequence encoding the CDRs can be replaced with the chemically synthesized nucleic acids using standard molecular biology techniques. The 5' and 3' ends of the chemically synthesized nucleic acids can be synthesized to comprise sticky end restriction enzyme sites for use in cloning the nucleic acids into the nucleic acid encoding the variable region of the donor antibody.

In some embodiments, the anti-CD277 antibodies described herein comprise an altered heavy chain constant region that has reduced (or no) effector function relative to its corresponding unaltered constant region. Effector functions involving the constant region of the anti-CD277 antibody may be modulated by altering properties of the constant or Fc region. Altered effector functions include, for example, a modulation in one or more of the following activities: antibody-dependent cellular cytotoxicity (ADCC), complement-dependent cytotoxicity (CDC), apoptosis, binding to one or more Fc-receptors, and proinflammatory responses. Modulation refers to an increase, decrease, or elimination of an effector function activity exhibited by a subject antibody containing an altered constant region as compared to the activity of the unaltered form of the constant region. In particular embodiments, modulation includes situations in which an activity is abolished or completely absent.

An altered constant region with altered FcR binding affinity and/or ADCC activity and/or altered CDC activity is a polypeptide which has either an enhanced or diminished FcR binding activity and/or ADCC activity and/or CDC activity compared to the unaltered form of the constant region. An altered constant region which displays increased binding to an FcR binds at least one FcR with greater affinity than the unaltered polypeptide. An altered constant region which displays decreased binding to an FcR binds at least one FcR with lower affinity than the unaltered form of the constant region. Such variants which display decreased binding to an FcR may possess little or no appreciable binding to an FcR, e.g., 0 to 50% (e.g., less than 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1%) of the binding to the FcR as compared to the level of binding of a native sequence immunoglobulin constant or Fc region to the FcR. Similarly, an altered constant region that displays modulated ADCC and/or CDC activity may exhibit either increased or reduced ADCC and/or CDC activity compared to the unaltered constant region. For example, in some embodiments, the anti-CD277 antibody comprising an altered constant region can exhibit approximately 0 to 50% (e.g., less than 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1%) of the ADCC and/or CDC activity of the unaltered form of the constant region. An anti-CD277 antibody described herein comprising an altered constant region displaying reduced ADCC and/or CDC may exhibit reduced or no ADCC and/or CDC activity.

In some embodiments, an anti-CD277 antibody described herein exhibits reduced or no effector function. In some embodiments, an anti-CD277 antibody described herein comprises a hybrid constant region, or a portion thereof, such as a G2/G4 hybrid constant region (see e.g., Burton et al. (1992) *Adv Immun* 51:1-18; Canfield et al. (1991) *J Exp Med* 173:1483-1491; and Mueller et al. (1997) *Mol Inununol* 34 (6): 441-452). See above.

In some embodiments, an anti-CD277 antibody may contain an altered constant region exhibiting enhanced or reduced complement dependent cytotoxicity (CDC). Modulated CDC activity may be achieved by introducing one or more amino acid substitutions, insertions, or deletions in an Fc region of the antibody. See, e.g., U.S. Pat. No. 6,194,551. Alternatively or additionally, cysteine residue(s) may be introduced in the Fc region, thereby allowing interchain disulfide bond formation in this region. The homodimeric antibody thus generated may have improved or reduced internalization capability and/or increased or decreased complement-mediated cell killing. See, e.g., Caron et al. (1992) *J Exp Med* 176:1191-1195 and Shopes (1992) *Immunol* 148:2918-2922; PCT publication nos. WO 99/51642 and WO 94/29351; Duncan and Winter (1988) *Nature* 322:738-40; and U.S. Pat. Nos. 5,648,260 and 5,624,821.

Any of the antibodies described herein can be screened and/or tested for their ability to modulate any of the activities or functions ascribed to either CD277, either in vitro or in vivo, using any immunological or biochemical-based methods known in the art.

The antibodies or antigen-binding portions thereof that specifically bind CD277 described herein can comprise, in part, scaffold domains, proteins, or portions, e.g., molecules which do not provide target receptor-binding activity, but which can provide a portion or domain of the construct which provides spatial organization, structural support, a means of linking of multiple receptor-binding units, or other desired characteristics, e.g., improved half-life. Various scaffold technologies and compositions are known in the art and can be readily linked or conjugated to the antigen-binding units described herein. The scaffold domain, protein, or portion can be derived from an antibody or not derived from an antibody. Such scaffold proteins, and domains thereof, are, generally, obtained through combinatorial chemistry-based adaptation of preexisting antigen-binding proteins.

Non-antibody protein scaffolds can be considered to fall into two structural categories, domain-sized constructs (in the range of 6 to 20 kDa), and constrained peptides (in the 2-4 kDa range). Domain-sized non-antibody scaffolds include, but are not limited to, affibodies, affilins, anticalins, atrimers, DARPins, FN3 scaffolds (such as adnectins and centyrins), fynomers, Kunitz domains, pronectins and OBodies. Peptide-sized non-antibody scaffolds include, for example, avimers, bicyclic peptides and cysteine knots. These non-antibody scaffolds and the underlying proteins or peptides on which they are based or from which they have been derived are reviewed by, e.g., Simeon and Chen, Protein Cell 9 (1): 3-14 (2018); Vazquez-Lombardi ct al., Drug Discovery Today 20:1271-1283 (2015), and by Binz et al., Nature Biotechnol. 23:1257-1268 (2005), the contents of each of which are herein incorporated by reference in their entireties. Advantages of using non-antibody scaffolds include increased affinity, target neutralization, and stability. Various non-antibody scaffolds also can overcome some of the limitations of antibody scaffolds, e.g., in terms of tissue penetration, smaller size, and thermostability. Some non-antibody scaffolds can also permit easier construction, not being hindered, for example, by the light chain association issue when bispecific constructs are desired. Methods of constructing constructs on a non-antibody scaffold are known to those of ordinary skill in the art. While not formally on an antibody scaffold, such constructs often include antibody binding domains, whether in the form of single-domain antibodies, scFvs or other antibody binding-domain variants that provide specific target-binding capabilities.

Accordingly, in some embodiments of any of the aspects described herein, an anti-CD277 antibody described herein can comprise a non-antibody scaffold protein. One of skill in the art would appreciate that the scaffold portion of a non-antibody scaffold protein can include, in some embodiments, e.g., an adnectin scaffold or a portion derived from human tenth fibronectin type III domain (10Fn3); an anti-calin scaffold derived from human lipocalin (e.g., such as those described in, e.g., WO2015/104406); an avimer scaffold or a protein fragment derived from the A-domain of low density-related protein (LRP) and/or very low density lipoprotein receptor (VLDLR); a fynomer scaffold or portion of the SH3 domain of FYN tyrosine kinase; a kunitz domain scaffold or portion of Kunitz-type protease inhibitors, such as a human trypsin inhibitor, aprotinin (bovine pancreatic trypsin inhibitor), Alzheimer's amyloid precursor protein, and tissue factor pathway inhibitor; a knottin scaffold (cysteine knot miniproteins), such as one based on a trypsin inhibitor from *E. elaterium*; an affibody scaffold or all or part of the Z domain of *S. aureus* protein A; a β-Hairpin mimetic scaffold; a Designed ankyrin repeat protein (DARPin) scaffold or artificial protein scaffolds based on ankyrin repeat (AR) proteins; or any scaffold derived or based on human transferrin, human CTLA-4, human crystallin, and human ubiquitin. For example, the binding site of human transferrin for human transferrin receptor can be diversified to create a diverse library of transferrin variants, some of which have acquired affinity for different antigens. See, e.g., Ali et al. (1999) *J. Biol. Chem.* 274:24066-24073. The portion of human transferrin not involved with binding the receptor remains unchanged and serves as a scaffold, like framework regions of antibodies, to present the variant binding sites. The libraries are then screened, as an antibody library is, and in accordance with the methods described herein, against a target antigen of interest to identify those variants having optimal selectivity and affinity for the target antigen. See, e.g., Hey et al. (2005) *TRENDS Biotechnol.* 23 (10): 514-522.

Recombinant Antibody Expression and Purification

The antibodies or antigen-binding fragments thereof described herein can be produced using a variety of techniques known in the art of molecular biology and protein chemistry. For example, a nucleic acid encoding one or both of the heavy and light chain polypeptides of an antibody can be inserted into an expression vector that contains transcriptional and translational regulatory sequences, which include, e.g., promoter sequences, ribosomal binding sites, transcriptional start and stop sequences, translational start and stop sequences, transcription terminator signals, polyadenylation signals, and enhancer or activator sequences. The regulatory sequences include a promoter and transcriptional start and stop sequences. In addition, the expression vector can include more than one replication system such that it can be maintained in two different organisms, for example in mammalian or insect cells for expression and in a prokaryotic host for cloning and amplification.

Several possible vector systems are available for the expression of cloned heavy chain and light chain polypeptides from nucleic acids in mammalian cells. One class of vectors relies upon the integration of the desired gene sequences into the host cell genome. Cells which have stably integrated DNA can be selected by simultaneously introducing drug resistance genes such as *E. coli* gpt (Mulligan and Berg (1981) *Proc Natl Acad Sci USA* 78:2072) or Th5 neo (Southern and Berg (1982) *Mol Appl Genet* 1:327). The selectable marker gene can be either linked to the DNA gene sequences to be expressed, or introduced into the same cell by co-transfection (Wigler et al. (1979) *Cell* 16:77). A second class of vectors utilizes DNA elements which confer autonomously replicating capabilities to an extrachromosomal plasmid. These vectors can be derived from animal viruses, such as bovine papillomavirus (Sarver et al. (1982) *Proc Natl Acad Sci USA,* 79:7147), cytomegalovirus, polyoma virus (Deans et al. (1984) *Proc Natl Acad Sci USA* 81:1292), or SV40 virus (Lusky and Botchan (1981) *Nature* 293:79).

The expression vectors can be introduced into cells in a manner suitable for subsequent expression of the nucleic acid. The method of introduction is largely dictated by the targeted cell type, discussed below. Exemplary methods include CaPO4 precipitation, liposome fusion, cationic liposomes, electroporation, viral infection, dextran-mediated transfection, polybrene-mediated transfection, protoplast fusion, and direct microinjection.

Appropriate host cells for the expression of antibodies or antigen-binding fragments thereof include yeast, bacteria, insect, plant, and mammalian cells. Of particular interest are bacteria such as *E. coli*, fungi such as *Saccharomyces cerevisiae* and *Pichia pastoris*, insect cells such as SF9, mammalian cell lines (e.g., human cell lines), as well as primary cell lines.

In some embodiments, an antibody or fragment thereof can be expressed in, and purified from, transgenic animals (e.g., transgenic mammals). For example, an antibody can be produced in transgenic non-human mammals (e.g., rodents) and isolated from milk as described in, e.g., Houdebine (2002) *Curr Opin Biotechnol* 13 (6): 625-629; van Kuik-Romeijn et al. (2000) *Transgenic Res* 9 (2): 155-159; and Pollock et al. (1999) *J Imnumol Methods* 231 (1-2): 147-157.

The antibodies and fragments thereof can be produced from the cells by culturing a host cell transformed with the expression vector containing nucleic acid encoding the antibodies or fragments, under conditions, and for an amount of time, sufficient to allow expression of the proteins. Such conditions for protein expression will vary with the choice of the expression vector and the host cell, and will be easily ascertained by one skilled in the art through routine experimentation. For example, antibodies expressed in *E. coli* can be refolded from inclusion bodies (see, e.g., Hou et al. (1998) *Cytokine* 10:319-30). Bacterial expression systems and methods for their use are well known in the art (see Current Protocols in Molecular Biology, Wiley & Sons, and Molecular Cloning—A Laboratory Manual—$3^{rd}$ Ed., Cold Spring Harbor Laboratory Press, New York (2001)). The choice of codons, suitable expression vectors and suitable host cells will vary depending on a number of factors, and may be easily optimized as needed. An antibody (or fragment thereof) described herein can be expressed in mammalian cells or in other expression systems including but not limited to yeast, baculovirus, and in vitro expression systems (see, e.g., Kaszubska et al. (2000) *Protein Expression and Purification* 18:213-220).

Following expression, the antibodies and fragments thereof can be isolated. An antibody or fragment thereof can be isolated or purified in a variety of ways known to those skilled in the art depending on what other components are present in the sample. Standard purification methods include electrophoretic, molecular, immunological, and chromatographic techniques, including ion exchange, hydrophobic, affinity, and reverse-phase HPLC chromatography. For example, an antibody can be purified using a standard anti-antibody column (e.g., a protein-A or protein-G column). Ultrafiltration and diafiltration techniques, in conjunction with protein concentration, are also useful. See, e.g., Scopes (1994) "Protein Purification, 3rd edition," Springer-Verlag, New York City, New York. The degree of purification necessary will vary depending on the desired use. In some instances, no purification of the expressed antibody or fragments thereof will be necessary.

Methods for determining the yield or purity of a purified antibody or fragment thereof are known in the art and include, e.g., Bradford assay, UV spectroscopy, Biuret protein assay, Lowry protein assay, amido black protein assay, high pressure liquid chromatography (HPLC), mass spectrometry (MS), and gel electrophoretic methods (e.g., using a protein stain such as Coomassie Blue or colloidal silver stain).

Modification of the Antibodies or Antigen-Binding Fragments Thereof

The antibodies or antigen-binding fragments thereof can be modified following their expression and purification. The modifications can be covalent or noncovalent modifications. Such modifications can be introduced into the antibodies or fragments by, e.g., reacting targeted amino acid residues of the polypeptide with an organic derivatizing agent that is capable of reacting with selected side chains or terminal residues. Suitable sites for modification can be chosen using any of a variety of criteria including, e.g., structural analysis or amino acid sequence analysis of the antibodies or fragments.

In some embodiments, the antibodies or antigen-binding fragments thereof can be conjugated to a heterologous moiety. The heterologous moiety can be, e.g., a heterologous polypeptide, a therapeutic agent (e.g., a toxin or a drug), or a detectable label such as, but not limited to, a radioactive label, an enzymatic label, a fluorescent label, a heavy metal label, a luminescent label, or an affinity tag such as biotin or streptavidin. Suitable heterologous polypeptides include, e.g., an antigenic tag (e.g., FLAG (DYKDDDDK (SEQ ID NO: 14)), polyhistidine (6-His; HHHHHH (SEQ ID NO: 15), hemagglutinin (HA; YPYDVPDYA (SEQ ID NO: 16)), glutathione-S-transferase (GST), or maltose-binding protein (MBP)) for use in purifying the antibodies or fragments. Heterologous polypeptides also include polypeptides (e.g., enzymes) that are useful as diagnostic or detectable markers, for example, luciferase, a fluorescent protein (e.g., green fluorescent protein (GFP)), or chloramphenicol acetyl transferase (CAT). Suitable radioactive labels include, e.g., 32P, 33P, 14C, 125I, 131I, 35S, and 3H. Suitable fluorescent labels include, without limitation, fluorescein, fluorescein isothiocyanate (FITC), green fluorescent protein (GFP), DYLIGHT™ 488, phycoerythrin (PE), propidium iodide (PI), PerCP, PE-ALEXA FLUOR@ 700, Cy5, allophycocyanin, and Cy7. Luminescent labels include, e.g., any of a variety of luminescent lanthanide (e.g., europium or terbium) chelates. For example, suitable europium chelates include the europium chelate of diethylene triamine pentaacetic acid (DTPA) or tetraazacyclododecane-1,4,7,10-tetraacetic acid (DOTA). Enzymatic labels include, e.g., alkaline phosphatase. CAT, luciferase, and horseradish peroxidase.

Two proteins (e.g., an antibody and a heterologous moiety) can be crosslinked using any of a number of known chemical cross linkers. Examples of such cross linkers are those which link two amino acid residues via a linkage that includes a "hindered" disulfide bond. In these linkages, a disulfide bond within the cross-linking unit is protected (by hindering groups on either side of the disulfide bond) from reduction by the action, for example, of reduced glutathione or the enzyme disulfide reductase. One suitable reagent, 4-succinimidyloxycarbonyl-α-methyl-α(2-pyridyldithio) toluene (SMPT), forms such a linkage between two proteins utilizing a terminal lysine on one of the proteins and a terminal cysteine on the other. Heterobifunctional reagents that cross-link by a different coupling moiety on each protein can also be used. Other useful cross-linkers include, without limitation, reagents which link two amino groups (e.g., N-5-azido-2-nitrobenzoyloxysuccinimide), two sulfhydryl groups (e.g., 1,4-bis-maleimidobutane), an amino group and a sulfhydryl group (e.g., mmaleimidobenzoyl-N-hydroxysuccinimide ester), an amino group and a carboxyl group (e.g., 4-[p-azidosalicylamido|butylamine), and an amino group and a guanidinium group that is present in the side chain of arginine (e.g., p-azidophenyl glyoxal monohydrate).

In some embodiments, a radioactive label can be directly conjugated to the amino acid backbone of the antibody. Alternatively, the radioactive label can be included as part of a larger molecule (e.g., 125I in meta-[125I] iodophenyl-N-hydroxysuccinimide ([125I] mIPNHS) which binds to free amino groups to form meta-iodophenyl (mIP) derivatives of relevant proteins (see, e.g., Rogers et al. (1997) *J Nucl Med* 38:1221-1229) or chelate (e.g., to DOTA or DTPA) which is in turn bound to the protein backbone. Methods of conjugating the radioactive labels or larger molecules/chelates containing them to the antibodies or antigen-binding fragments described herein are known in the art. Such methods involve incubating the proteins with the radioactive label under conditions (e.g., pH, salt concentration, and/or temperature) that facilitate binding of the radioactive label or chelate to the protein (see, e.g., U.S. Pat. No. 6,001,329).

Methods for conjugating a fluorescent label (sometimes referred to as a "fluorophore") to a protein (e.g., an antibody) are known in the art of protein chemistry. For example, fluorophores can be conjugated to free amino groups (e.g., of lysines) or sulfhydryl groups (e.g., cysteines) of proteins using succinimidyl (NHS) ester or tetrafluorophenyl (TFP) ester moieties attached to the fluorophores. In some embodiments, the fluorophores can be conjugated to a heterobifunctional cross-linker moiety such as sulfo-SMCC. Suitable conjugation methods involve incubating an antibody protein, or fragment thereof, with the fluorophore under conditions that facilitate binding of the fluorophore to the protein. See, e.g., Welch and Redvanly (2003) "Handbook of Radiopharmaceuticals: Radiochemistry and Applications," John Wiley and Sons (ISBN 0471495603).

In some embodiments, the antibodies or fragments can be modified, e.g., with a moiety that improves the stabilization and/or retention of the antibodies in circulation, e.g., in blood, serum, or other tissues. For example, the antibody or fragment can be PEGylated as described in, e.g., Lee et al. (1999) *Bioconjug Chem* 10 (6): 973-8; Kinstler et al. (2002) *Advanced Drug Deliveries Reviews* 54:477-485; and Roberts et al. (2002) *Advanced Drug Delivery Reviews* 54:459-476 or HESylated (Fresenius Kabi, Germany; see, e.g., Pavisić et al. (2010) *Int J Pharm* 387 (1-2): 110-119). The stabilization moiety can improve the stability, or retention of, the antibody (or fragment) by at least about 1.5 (e.g., at about least 2, 5, 10, 15, 20, 25, 30, 40, or 50 or more) fold.

In some embodiments, the antibodies or antigen-binding fragments thereof described herein can be glycosylated. In some embodiments, an antibody or antigen-binding fragment thereof described herein can be subjected to enzymatic or chemical treatment, or produced from a cell, such that the antibody or fragment has reduced or absent glycosylation. Methods for producing antibodies with reduced glycosylation are known in the art and described in, e.g., U.S. Pat. No. 6,933,368; Wright et al. (1991) *EMBO J* 10 (10): 2717-2723; and Co et al. (1993) *Mol Immunol* 30:1361.

Pharmaceutical Compositions and Formulations

In certain embodiments, the disclosure provides for a pharmaceutical composition comprising an anti-CD277 antibody, or antigen-binding fragment thereof, with a pharmaceutically acceptable diluent, carrier, solubilizer, emulsifier, preservative and/or adjuvant.

In certain embodiments, acceptable formulation materials preferably are nontoxic to recipients at the dosages and concentrations employed. In certain embodiments, the formulation material(s) are for s.c. and/or I.V. administration. In certain embodiments, the pharmaceutical composition can contain formulation materials for modifying, maintaining or preserving, for example, the pH, osmolality, viscosity, clarity, color, isotonicity, odor, sterility, stability, rate of dissolution or release, adsorption or penetration of the composition. In certain embodiments, suitable formulation materials include, but are not limited to, amino acids (such as glycine, glutamine, asparagine, arginine or lysine); antimicrobials; antioxidants (such as ascorbic acid, sodium sulfite or sodium hydrogen-sulfite); buffers (such as borate, bicarbonate, Tris-HCl, citrates, phosphates or other organic acids); bulking agents (such as mannitol or glycine); chelating agents (such as ethylenediamine tetraacetic acid (EDTA)); complexing agents (such as caffeine, polyvinylpyrrolidone, beta-cyclodextrin or hydroxypropyl-beta-cyclodextrin); fillers; monosaccharides; disaccharides; and other carbohydrates (such as glucose, mannose or dextrins); proteins (such as serum albumin, gelatin or immunoglobulins); coloring, flavoring and diluting agents; emulsifying agents; hydrophilic polymers (such as polyvinylpyrrolidone); low molecular weight polypeptides; salt-forming counterions (such as sodium); preservatives (such as benzalkonium chloride, benzoic acid, salicylic acid, thimerosal, phenethyl alcohol, methylparaben, propylparaben, chlorhexidine, sorbic acid or hydrogen peroxide); solvents (such as glycerin, propylene glycol or polyethylene glycol); sugar alcohols (such as mannitol or sorbitol); suspending agents; surfactants or wetting agents (such as pluronics, PEG, sorbitan esters, polysorbates such as polysorbate 20, polysorbate 80, triton, tromethamine, lecithin, cholesterol, tyloxapal); stability enhancing agents (such as sucrose or sorbitol); tonicity enhancing agents (such as alkali metal halides, preferably sodium or potassium chloride, mannitol sorbitol); delivery vehicles; diluents; excipients and/or pharmaceutical adjuvants. (Remington's Pharmaceutical Sciences, 18th Edition, A. R. Gennaro, ed., Mack Publishing Company (1995). In certain embodiments, the formulation comprises PBS; 20 mM NaOAC, pH 5.2, 50 mM NaCl; and/or 10 mM NAOAC, pH 5.2, 9% Sucrose. In certain embodiments, the optimal pharmaceutical composition will be determined by one skilled in the art depending upon, for example, the intended route of administration, delivery format and desired dosage. See, for example, Remington's Pharmaceutical Sciences, supra. In certain embodiments, such compositions may influence the physical state, stability, rate of in vivo release and/or rate of in vivo clearance of an anti-CD277 antibody.

In certain embodiments, the primary vehicle or carrier in a pharmaceutical composition can be either aqueous or non-aqueous in nature. For example, in certain embodiments, a suitable vehicle or carrier can be water for injection, physiological saline solution or artificial cerebrospinal fluid, possibly supplemented with other materials common in compositions for parenteral administration. In certain embodiments, the saline comprises isotonic phosphate-buffered saline. In certain embodiments, neutral buffered saline or saline mixed with serum albumin are further exemplary vehicles. In certain embodiments, pharmaceutical compositions comprise Tris buffer of about pH 7.0-8.5, or acetate buffer of about pH 4.0-5.5, which can further include sorbitol or a suitable substitute therefore. In certain embodiments, a composition comprising an anti-CD277 antibody can be prepared for storage by mixing the selected composition having the desired degree of purity with optional formulation agents (Remington's Pharmaceutical Sciences, supra) in the form of a lyophilized cake or an aqueous solution. Further, in certain embodiments, a composition comprising an anti-CD277 antibody can be formulated as a lyophilizate using appropriate excipients such as sucrose.

In certain embodiments, the pharmaceutical composition can be selected for parenteral delivery. In certain embodiments, the compositions can be selected for inhalation or for delivery through the digestive tract, such as orally. The preparation of such pharmaceutically acceptable compositions is within the ability of one skilled in the art.

In certain embodiments, the formulation components are present in concentrations that are acceptable to the site of administration. In certain embodiments, buffers are used to maintain the composition at physiological pH or at a slightly lower pH, typically within a pH range of from about 5 to about 8.

In certain embodiments, when parenteral administration is contemplated, a therapeutic composition can be in the form of a pyrogen-free, parenterally acceptable aqueous solution comprising an anti-CD277 antibody in a pharmaceutically acceptable vehicle. In certain embodiments, a vehicle for parenteral injection is sterile distilled water in which an anti-CD277 antibody is formulated as a sterile, isotonic solution, and properly preserved. In certain embodiments, the preparation can involve the formulation of the desired molecule with an agent, such as injectable microspheres, bio-erodible particles, polymeric compounds (such as polylactic acid or polyglycolic acid), beads or liposomes, that can provide for the controlled or sustained release of the product which can then be delivered via a depot injection. In certain embodiments, hyaluronic acid can also be used, and can have the effect of promoting sustained duration in the circulation. In certain embodiments, implantable drug delivery devices can be used to introduce the desired molecule.

In certain embodiments, a pharmaceutical composition can be formulated for inhalation. In certain embodiments, an anti-CD277 antibody can be formulated as a dry powder for inhalation. In certain embodiments, an inhalation solution comprising an anti-CD277 antibody can be formulated with a propellant for aerosol delivery. In certain embodiments, solutions can be nebulized. Pulmonary administration is further described in PCT application No. PCT/US94/001875, which describes pulmonary delivery of chemically modified proteins.

In certain embodiments, it is contemplated that formulations can be administered orally. In certain embodiments, an anti-CD277 antibody that is administered in this fashion can be formulated with or without those carriers customarily used in the compounding of solid dosage forms such as tablets and capsules. In certain embodiments, a capsule can be designed to release the active portion of the formulation at the point in the gastrointestinal tract when bioavailability is maximized and pre-systemic degradation is minimized. In certain embodiments, at least one additional agent can be included to facilitate absorption of an anti-CD277 antibody. In certain embodiments, diluents, flavorings, low melting point waxes, vegetable oils, lubricants, suspending agents, tablet disintegrating agents, and binders can also be employed.

In certain embodiments, a pharmaceutical composition can involve an effective quantity of an anti-CD277 antibody in a mixture with non-toxic excipients which are suitable for the manufacture of tablets. In certain embodiments, by dissolving the tablets in sterile water, or another appropriate vehicle, solutions can be prepared in unit-dose form. In certain embodiments, suitable excipients include, but are not limited to, inert diluents, such as calcium carbonate, sodium carbonate or bicarbonate, lactose, or calcium phosphate; or binding agents, such as starch, gelatin, or acacia; or lubricating agents such as magnesium stearate, stearic acid, or talc.

Additional pharmaceutical compositions will be evident to those skilled in the art, including formulations involving an anti-CD277 antibody in sustained- or controlled delivery formulations. In certain embodiments, techniques for formulating a variety of other sustained- or controlled-delivery means, such as liposome carriers, bio-erodible microparticles or porous beads and depot injections, are also known to those skilled in the art. See for example, PCT Application No. PCT/US93/00829 which describes the controlled release of porous polymeric microparticles for the delivery of pharmaceutical compositions. In certain embodiments, sustained-release preparations can include semipermeable polymer matrices in the form of shaped articles, e.g. films, or microcapsules. Sustained release matrices can include polyesters, hydrogels, polylactides (U.S. Pat. No. 3,773,919 and EP 058,481), copolymers of L-glutamic acid and gamma ethyl-L-glutamate (Sidman et al., Biopolymers, 22:547-556 (1983)), poly(2-hydroxyethyl-methacrylate) (Langer et al., J. Biomed. Mater. Res., 15:167-277 (1981) and Langer, Chem. Tech., 12:98-105 (1982)), ethylene vinyl acetate (Langer et al., supra) or poly-D(−)-3-hydroxybutyric acid (EP 133,988). In certain embodiments, sustained release compositions can also include liposomes, which can be prepared by any of several methods known in the art. See, e.g., Eppstein et al, Proc. Natl. Acad. Sci. USA, 82:3688-3692 (1985); EP 036,676; EP 088,046 and EP 143,949.

The pharmaceutical composition to be used for in vivo administration typically is sterile. In certain embodiments, this can be accomplished by filtration through sterile filtration membranes. In certain embodiments, where the composition is lyophilized, sterilization using this method can be conducted either prior to or following lyophilization and reconstitution. In certain embodiments, the composition for parenteral administration can be stored in lyophilized form or in a solution. In certain embodiments, parenteral compositions generally are placed into a container having a sterile access port, for example, an intravenous solution bag or vial having a stopper pierceable by a hypodermic injection needle.

In certain embodiments, once the pharmaceutical composition has been formulated, it can be stored in sterile vials as a solution, suspension, gel, emulsion, solid, or as a dehydrated or lyophilized powder. In certain embodiments, such formulations can be stored either in a ready-to-use form or in a form (e.g., lyophilized) that is reconstituted prior to administration.

In certain embodiments, kits are provided for producing a single-dose administration unit. In certain embodiments, the kit can contain both a first container having a dried protein and a second container having an aqueous formulation. In certain embodiments, kits containing single and multi-chambered pre-filled syringes (e.g., liquid syringes and lyosyringes) are included.

In certain embodiments, the effective amount of a pharmaceutical composition comprising an anti-CD277 antibody to be employed therapeutically will depend, for example, upon the therapeutic context and objectives. One skilled in the art will appreciate that the appropriate dosage levels for treatment, according to certain embodiments, will thus vary depending, in part, upon the molecule delivered, the indication for which an anti-CD277 antibody is being used, the route of administration, and the size (body weight, body surface or organ size) and/or condition (the age and general health) of the patient. In certain embodiments, the clinician can titer the dosage and modify the route of administration to obtain the optimal therapeutic effect.

In certain embodiments, the frequency of dosing will take into account the pharmacokinetic parameters of an anti-CD277 antibody in the formulation used. In certain embodiments, a clinician will administer the composition until a dosage is reached that achieves the desired effect. In certain embodiments, the composition can therefore be administered as a single dose or as two or more doses (which may or may not contain the same amount of the desired molecule) over time, or as a continuous infusion via an implantation device or catheter. Further refinement of the appropriate dosage is routinely made by those of ordinary skill in the art and is within the ambit of tasks routinely performed by them. In certain embodiments, appropriate dosages can be ascertained through use of appropriate dose-response data.

In certain embodiments, the route of administration of the pharmaceutical composition is in accord with known methods, e.g. orally, through injection by intravenous, intraperitoneal, intracerebral (intra-parenchymal), intracerebroventricular, intramuscular, subcutaneously, intra-ocular, intraarterial, intraportal, or intralesional routes; by sustained release systems or by implantation devices. In certain embodiments, the compositions can be administered by bolus injection or continuously by infusion, or by implantation device. In certain embodiments, individual elements of the combination therapy may be administered by different routes.

In certain embodiments, the composition can be administered locally via implantation of a membrane, sponge or another appropriate material onto which the desired molecule has been absorbed or encapsulated. In certain embodiments, where an implantation device is used, the device can be implanted into any suitable tissue or organ, and delivery of the desired molecule can be via diffusion, timed-release bolus, or continuous administration. In certain embodiments, it can be desirable to use a pharmaceutical composition comprising an anti-CD277 antibody in an ex vivo manner. In such instances, cells, tissues and/or organs that have been removed from the patient are exposed to a pharmaceutical composition comprising an anti-CD277 antibody after which the cells, tissues and/or organs are subsequently implanted back into the patient.

In certain embodiments, an anti-CD277 antibody can be delivered by implanting certain cells that have been genetically engineered, using methods such as those described herein, to express and secrete the polypeptides. In certain embodiments, such cells can be animal or human cells, and can be autologous, heterologous, or xenogeneic. In certain embodiments, the cells can be immortalized. In certain embodiments, in order to decrease the chance of an immunological response, the cells can be encapsulated to avoid infiltration of surrounding tissues. In certain embodiments, the encapsulation materials are typically biocompatible, semi-permeable polymeric enclosures or membranes that allow the release of the protein product(s) but prevent the destruction of the cells by the patient's immune system or by other detrimental factors from the surrounding tissues.

Kits

A kit can include an anti-CD277 antibody as disclosed herein, and instructions for use. The kits may comprise, in a suitable container, an anti-CD277 antibody, one or more controls, and various buffers, reagents, enzymes and other standard ingredients well known in the art.

The container can include at least one vial, well, test tube, flask, bottle, syringe, or other container means, into which an anti-CD277 antibody may be placed, and in some instances, suitably aliquoted. Where an additional component is provided, the kit can contain additional containers into which this component may be placed. The kits can also include a means for containing an anti-CD277 antibody and any other reagent containers in close confinement for commercial sale. Such containers may include injection or blowmolded plastic containers into which the desired vials are retained. Containers and/or kits can include labeling with instructions for use and/or warnings.

Methods of Use

The compositions of the present invention have numerous in vitro and in vivo utilities. The above-described compositions are useful in, inter alia, methods for treating or preventing a variety of cancers in a subject. The compositions can be administered to a subject, e.g., a human subject, using a variety of methods that depend, in part, on the route of administration. The route can be, e.g., intravenous injection or infusion (IV), subcutaneous injection (SC), intraperitoneal (IP) injection, intramuscular injection (IM), or intrathecal injection (IT). The injection can be in a bolus or a continuous infusion.

Administration can be achieved by, e.g., local infusion, injection, or by means of an implant. The implant can be of a porous, non-porous, or gelatinous material, including membranes, such as sialastic membranes, or fibers. The implant can be configured for sustained or periodic release of the composition to the subject. See, e.g., U.S. Patent Application Publication No. 20080241223; U.S. Pat. Nos. 5,501,856; 4,863,457; and 3,710,795; EP488401; and EP 430539, the disclosures of each of which are incorporated herein by reference in their entirety. The composition can be delivered to the subject by way of an implantable device based on, e.g., diffusive, erodible, or convective systems, e.g., osmotic pumps, biodegradable implants, electrodiffusion systems, electroosmosis systems, vapor pressure pumps, electrolytic pumps, effervescent pumps, piezoelectric pumps, erosion-based systems, or electromechanical systems.

In some embodiments, an anti-CD277 antibody, or antigen-binding fragment thereof, is therapeutically delivered to a subject by way of local administration.

A suitable dose of an antibody, or antigen binding fragment thereof, described herein, which dose is capable of treating or preventing cancer in a subject, can depend on a variety of factors including, e.g., the age, sex, and weight of a subject to be treated and the particular inhibitor compound used. For example, a different dose of a whole anti-CD277 antibody may be required to treat a subject with cancer as compared to the dose of a CD277-binding Fab' antibody fragment required to treat the same subject. Other factors affecting the dose administered to the subject include, e.g., the type or severity of the cancer. For example, a subject having metastatic melanoma may require administration of a different dosage of an anti-CD277 antibody than a subject with glioblastoma. Other factors can include, e.g., other medical disorders concurrently or previously affecting the subject, the general health of the subject, the genetic disposition of the subject, diet, time of administration, rate of excretion, drug combination, and any other additional therapeutics that are administered to the subject. It should also be understood that a specific dosage and treatment regimen for any particular subject will also depend upon the judgment of the treating medical practitioner (e.g., doctor or nurse). Suitable dosages are described herein.

A pharmaceutical composition can include a therapeutically effective amount of an anti-CD277 antibody, or antigen-binding fragment thereof, described herein. Such effective amounts can be readily determined by one of ordinary skill in the art based, in part, on the effect of the administered antibody, or the combinatorial effect of the antibody and one or more additional active agents, if more than one agent is used. A therapeutically effective amount of an antibody or fragment thereof described herein can also vary according to factors such as the disease state, age, sex, and weight of the individual, and the ability of the antibody (and one or more additional active agents) to elicit a desired response in the individual, e.g., reduction in tumor growth. For example, a therapeutically effective amount of an anti-CD277 antibody can inhibit (lessen the severity of or eliminate the occurrence of) and/or prevent a particular disorder, and/or any one of the symptoms of the particular disorder known in the art or described herein. A therapeutically effective amount is also one in which any toxic or detrimental effects of the composition are outweighed by the therapeutically beneficial effects.

Suitable human doses of any of the antibodies described herein can further be evaluated in, e.g., Phase I dose escalation studies. See, e.g., van Gurp et al. (2008) *Am J Transplantation* 8(8): 1711-1718; Hanouska et al. (2007) *Clin Cancer Res* 13 (2, part 1): 523-531; and Hetherington et al. (2006) *Antimicrobial Agents and Chemotherapy* 50 (10): 3499-3500.

In some embodiments, the composition contains any of the antibodies described herein and one or more (e.g., two, three, four, five, six, seven, eight, nine, 10, or 11 or more) additional therapeutic agents such that the composition as a whole is therapeutically effective. For example, a composition can contain an anti-CD277 antibody described herein and an alkylating agent, wherein the antibody and agent are each at a concentration that when combined are therapeutically effective for treating or preventing a cancer (e.g., melanoma) in a subject.

Toxicity and therapeutic efficacy of such compositions can be determined by known pharmaceutical procedures in cell cultures or experimental animals (e.g., animal models of any of the cancers described herein). These procedures can be used, e.g., for determining the LD50 (the dose lethal to 50% of the population) and the ED50 (the dose therapeutically effective in 50% of the population). The dose ratio between toxic and therapeutic effects is the therapeutic index and it can be expressed as the ratio LD50/ED50. An antibody described herein that exhibits a high therapeutic index is preferred. While compositions that exhibit toxic side effects may be used, care should be taken to design a delivery system that targets such compounds to the site of affected tissue and to minimize potential damage to normal cells and, thereby, reduce side effects.

The data obtained from the cell culture assays and animal studies can be used in formulating a range of dosage for use in humans. The dosage of such antibodies described herein lies generally within a range of circulating concentrations of the antibodies or antagonists that include the $ED_{50}$ with little or no toxicity. The dosage may vary within this range depending upon the dosage form employed and the route of administration utilized. For an anti-CD277 antibody described herein, the therapeutically effective dose can be estimated initially from cell culture assays. A dose can be formulated in animal models to achieve a circulating plasma concentration range that includes the IC50 (i.e., the concentration of the antibody which achieves a half-maximal inhibition of symptoms) as determined in cell culture. Such information can be used to more accurately determine useful doses in humans. Levels in plasma may be measured, for example, by high performance liquid chromatography. In some embodiments, e.g., where local administration (e.g., to the eye or a joint) is desired, cell culture or animal modeling can be used to determine a dose required to achieve a therapeutically effective concentration within the local site.

In some embodiments, the methods can be performed in conjunction with other therapies for cancer. For example, the composition can be administered to a subject at the same time, prior to, or after, radiation, surgery, targeted or cytotoxic chemotherapy, chemoradiotherapy, hormone therapy, immunotherapy, gene therapy, cell transplant therapy, precision medicine, genome editing therapy, or other pharmacotherapy.

As described above, the compositions described herein (e.g., anti-CD277 antibody compositions) can be used to treat a variety of cancers such as but not limited to: Kaposi's sarcoma, leukemia, acute lymphocytic leukemia, acute myelocytic leukemia, myeloblasts promyelocyte myelomonocytic monocytic erythroleukemia, chronic leukemia, chronic myelocytic (granulocytic) leukemia, chronic lymphocytic leukemia, mantle cell lymphoma, primary central nervous system lymphoma, Burkitt's lymphoma and marginal zone B cell lymphoma, Polycythemia vera Lymphoma, Hodgkin's disease, non-Hodgkin's disease, multiple myeloma, Waldenstrom's macroglobulinemia, heavy chain disease, solid tumors, sarcomas, and carcinomas, fibrosarcoma, myxosarcoma, liposarcoma, chrondrosarcoma, osteogenic sarcoma, osteosarcoma, chordoma, angiosarcoma, endotheliosarcoma, lymphangiosarcoma, lymphangioendotheliosarcoma, synovioma, mesothelioma. Ewing's tumor, leiomyosarcoma, rhabdomyosarcoma, colon sarcoma, colorectal carcinoma, pancreatic cancer, breast cancer, ovarian cancer, prostate cancer, squamous cell carcinoma, basal cell carcinoma, adenocarcinoma, sweat gland carcinoma, sebaceous gland carcinoma, papillary carcinoma, papillary adenocarcinomas, cystadenocarcinoma, medullary carcinoma, bronchogenic carcinoma, renal cell carcinoma, hepatoma, bile duct carcinoma, choriocarcinoma, seminoma, embryonal carcinoma, Wilm's tumor, cervical cancer, uterine cancer, testicular tumor, lung carcinoma, small cell lung carcinoma, non-small cell lung carcinoma, bladder carcinoma, epithelial carcinoma, glioma, astrocytoma, medulloblastoma, craniopharyngioma, ependymoma, pinealoma, hemangioblastoma, acoustic neuroma, oligodendroglioma, menangioma, melanoma, neuroblastoma, retinoblastoma, nasopharyngeal carcinoma, esophageal carcinoma, basal cell carcinoma, biliary tract cancer, bladder cancer, bone cancer, brain and central nervous system (CNS) cancer, cervical cancer, choriocarcinoma, colorectal cancers, connective tissue cancer, cancer of the digestive system, endometrial cancer, esophageal cancer, eye cancer, head and neck cancer, gastric cancer, intraepithelial neoplasm, kidney cancer, larynx cancer, liver cancer, lung cancer (small cell, large cell), melanoma, neuroblastoma; oral cavity cancer (for example lip, tongue, mouth and pharynx), ovarian cancer, pancreatic cancer, retinoblastoma, rhabdomyosarcoma, rectal cancer; cancer of the respiratory system, sarcoma, Kaposi's Sarcoma, skin cancer, stomach cancer, testicular cancer, thyroid cancer, uterine cancer, and cancer of the urinary system. In some embodiments of the methods and uses described herein, the cancer is a solid tumor. In some embodiments of the methods and uses described herein, the cancer is ovarian cancer.

In some embodiments, an anti-CD277 antibody described herein can be administered to a subject as a combination therapy with another treatment, e.g., another treatment for a cancer. For example, the combination therapy can include administering to the subject (e.g., a human patient) one or more additional agents that provide a therapeutic benefit to a subject who has, or is at risk of developing, cancer.

Chemotherapeutic agents suitable for co-administration with compositions of the present invention include, for example: taxol, cytochalasin B, gramicidin D, cthidium bromide, emetine, mitomycin, etoposide, tenoposide, vincristine, vinblastine, colchicin, doxorubicin, daunorubicin, dihydroxyanthrancindione, mitoxantrone, mithramycin, actinomycin D, 1-dehydrotestosterone, glucocorticoids, procaine, tetracaine, lidocaine, propranolol, and puromycin and analogs or homologs thereof. Further agents include, for example, antimetabolites (e.g., methotrexate, 6-mercaptopurine, 6-thioguanine, cytarabine, 5-fluorouracil decarbazine), alkylating agents (e.g. mechlorethamine, thioTEPA, chlorambucil, melphalan, carmustine (BSNU), lomustine (CCNU), cyclophosphamide, busulfan, dibromomannitol, streptozotocin, mitomycin C, cis-dichlordiamine platinum (II) (DDP), procarbazine, altretamine, cisplatin, carboplatin, oxaliplatin, nedaplatin, satraplatin, or triplatin tetranitrate), anthracycline (e.g. daunorubicin (formerly daunomycin) and doxorubicin), antibiotics (e.g. dactinomcin (formerly actinomycin), bleomycin, mithramycin, and anthramycin (AMC)), and anti-mitotic agents (e.g. vincristine and vinblastine) and temozolomide. In some embodiments, an anti-CD277 antibody and the one or more additional active agents are administered at the same time. In other embodiments, the anti-CD277 antibody is administered first in time and the one or more additional active agents are administered second in time. In some embodiments, the one or more additional active agents are administered first in time and the anti-CD277 antibody is administered second in time.

In some embodiments, an anti-CD277 antibody, or an antigen-binding fragment thereof, described herein can replace or augment a previously or currently administered therapy. For example, upon treating with an anti-CD277 antibody, or antigen-binding fragment thereof, administration of the one or more additional active agents can cease or diminish, e.g., be administered at lower levels. In some embodiments, administration of the previous therapy can be maintained. In some embodiments, a previous therapy will be maintained until the level of the anti-CD277 antibody reaches a level sufficient to provide a therapeutic effect. The two therapies can be administered in combination.

Monitoring a subject (e.g., a human patient) for an improvement in a cancer, as defined herein, means evaluating the subject for a change in a disease parameter, e.g., a reduction in tumor growth. In some embodiments, the evaluation is performed at least one (1) hour, e.g., at least 2, 4, 6, 8, 12, 24, or 48 hours, or at least I day, 2 days, 4 days, 10 days, 13 days, 20 days or more, or at least 1 week, 2 weeks, 4 weeks, 10 weeks. 13 weeks, 20 weeks or more, after an administration. The subject can be evaluated in one or more of the following periods: prior to beginning of treatment; during the treatment; or after one or more elements of the treatment have been administered. Evaluation can include evaluating the need for further treatment, e.g., evaluating whether a dosage, frequency of administration, or duration of treatment should be altered. It can also include evaluating the need to add or drop a selected therapeutic modality, e.g., adding or dropping any of the treatments for a cancer described herein.

Herein, it has been determined that certain antibodies, such as mAb1, can activate cytokine production and proliferation of T cells (both αβ T cells and γδ T cells) and thereby may be used to overcome the immunosuppressive mechanisms observed in cancer patients.

Accordingly, aspects of the disclosure include a method for treating cancer in a subject. The method includes: administering to the subject a therapeutically-effective amount of an antibody or antigen-binding fragment thereof that binds to human CD277, wherein the antibody or antigen-binding fragment thereof induces or enhances CD277-mediated γδ T cell stimulation or reduces CD277-mediated γδ T cell inhibition in the absence of one or both of: (i) a phosphoantigen (e.g., in the absence of phosphoantigen accumulation, such as phosphoantigen accumulation resulting from treatment of a cell with zoledronate), and (ii) a costimulatory signal, to thereby treat the cancer.

In some embodiments, an anti-CD277 antibody described herein induces or enhances CD277-mediated γδ T cell stimulation. In some embodiments, an anti-CD277 antibody described herein stimulates γδ T cell proliferation and reduces or inhibits αβ T cell activation. In some embodiments, an anti-CD277 antibody described herein stimulates γδ T cells and inhibits or reduces tumor cell aggregation and metastasis in a subject. The disclosure further provides a method for treating cancer in a subject by stimulating γδ T cells in a subject by administering an anti-CD277 antibody, or antigen binding fragment thereof.

In some embodiments, any of the foregoing methods comprise administering to a subject an antibody that binds to CD277, or an antigen binding portion thereof as described herein.

In some embodiments, γδ T cell stimulation results in γδ T cell activation, proliferation, and/or cytokine production, including, but not limited to, IFNγ production. Increased T cell activation and/or proliferation can be determined by numerous methods known to those persons skilled in the art (see, for e.g. Kruisbeek et al. (2004) Current Protocols in Immunology, 3.12.1-3.12.20). In some embodiments, increased cytokine production involves enhanced IFNγ production, which can be determined by numerous methods including, but not limited to, an ELISA assay. Increased γδ T cell activation, proliferation and/or increased cytokine production from such γδ T cells can be useful biological outputs for targeting a cancer.

In some embodiments, the antibody that binds to CD277, or an antigen-binding fragment thereof, reduces the CD277-mediated inhibition of αβ T cells. In some embodiments, the reduction of the CD277-mediated inhibition of αβ T cells results in αβ T cell activation, proliferation, and/or cytokine production, including, but not limited to, IFNγ production.

In some embodiments, the γδ T cell stimulation and the reduction of CD277-mediated inhibition of αβ T cells occurs in the absence of one or both of: (i) a phosphoantigen and (ii) a co-stimulatory signal, wherein the co-stimulatory signal results from engagement with CD3 or CD28.

In a particular aspect of the disclosure, an anti-CD277 antibody, such as mAb1, can be used in combination with phosphoantigens. Indeed, phosphoantigens have been shown to activate the cytolytic function of T cells. Without wishing to be bound by theory, it is believed that the use of mAb1 in combination with phosphoantigens can have a synergistic effect. Phosphoantigens have been described in the art (see, for e.g.: WO2007057440 and WO2008059052).

In a particular aspect of the disclosure, anti-CD277 antibodies, such as mAb1, can be used in to treat cancer.

Aspects of the invention will be illustrated in view of the following figures and examples.

EXAMPLES

Example 1: CD277 Antibody Generation

Cd277 Antigen Preparation

Protein reagent biotinylation was done using the EZ-Link Sulfo-NHS Biotinylation Kit, Thermo Scientific, Cat #21425. The CD277 antigens were concentrated to ~1 mg/mL and buffer exchanged into PBS before addition of 1:7.5 molar ratio biotinylation reagent (EZ-Link Sulfo-NHS-Biotinylation Kit, Thermo Scientific, Cat #21425.). The mixture was held at 4° C. overnight prior to another buffer exchange to remove free biotin in the solution. Biotinylation was confirmed through Streptavidin sensor binding of the labeled proteins on a ForteBio.

Library Interrogation and Selection Methodology for Isolation of Anti-CD277 Antibodies Naive Library Selections Eight naïve human synthetic yeast-based antibody libraries each of ~$10^9$ diversity were designed, generated, and propagated as described previously (see, e.g.: WO2009036379; WO2010105256; WO2012009568; Xu et al., Protein Eng Des Sel. 2013 October; 26 (10): 663-70, all of which are incorporated herein by reference). Eight parallel selections were performed, using the eight naïve libraries against biotinylated human CD277 Fc fusion.

For the first two rounds of selection, a magnetic bead sorting technique utilizing the Miltenyi MACS system was performed, essentially as described (Siegel et al., J Immunol Methods. 2004 March; 286 (1-2): 141-53, which is incorporated herein by reference). Briefly, yeast cells (~$10^{10}$ cells/library) were incubated with 10 mL of 10 nM biotinylated human CD277 Fc fusion antigen for 15 min at room temperature in FACS wash buffer PBS with 0.1% BSA. After washing once with 50 mL ice-cold wash buffer, the cell pellet was resuspended in 40 mL wash buffer, and 500 µl Streptavidin MicroBeads (Miltenyi Biotec, Bergisch Gladbach, Germany. Cat #130-048-101) were added to the yeast and incubated for 15 min at 4° C. Next, the yeast were pelleted, resuspended in 5 mL wash buffer, and loaded onto a MACS LS column (Miltenyi Biotec, Bergisch Gladbach, Germany. Cat. #130-042-401). After the 5 mL was loaded, the column was washed three times with 3 ml FACS wash buffer. The column was then removed from the magnetic field, and the yeast were eluted with 5 mL of growth media and then grown overnight.

After the two rounds of MACS, four rounds of sorting were performed using flow cytometry (FACS), which are described in the following three paragraphs.

Selection Strategy Employing 8 Parallel Selections with Fc Antigen

The eight libraries from the MACS selections were taken through four rounds of FACS selections. Approximately $1\times10^8$ yeast per library were pelleted, washed three times with wash buffer, and incubated with 10 nM of biotinylated human CD277 Fe fusion antigen for 10 min at room temperature. Yeast were then washed twice and stained with goat anti-human F(ab)$_2$ kappa-FITC diluted 1:100 (Southern Biotech, Birmingham, Alabama, Cat #2062-02) and either streptavidin-Alexa Fluor 633 (Life Technologies, Grand Island, NY, Cat #S21375) diluted 1:500, or Extravidin-phycoerthyrin (Sigma-Aldrich, St Louis, Cat #E4011) diluted 1:50, secondary reagents for 15 min at 4° C. After washing twice with ice-cold wash buffer, the cell pellets were resuspended in 0.4 mL wash buffer and transferred to strainer-capped sort tubes. Sorting was performed using a FACS ARIA sorter (BD Biosciences) and sort gates were determined to select only CD277 binding. The human-CD277 selected populations from the first round of FACS were brought forward into the next round.

The second through fourth round of FACS for the above selected populations involved positive sorts for binders to human and/or cyno CD277 reagents; or negative sorts to decrease polyspecific reagent binders (Xu et al., PEDS. 2013 October; 26 (10): 663-70). Depending on the amount of polyspecific binding or target binding of a specific selection output, a positive sort followed a negative sort or vice versa, to enrich for a full binding population with limited amount of polyspecific binding. The outputs of these rounds were plated and isolates were picked for sequencing and characterization. One of the isolates characterized was mAb1, detailed herein.

Affinity Maturation of Clones Identified in Naïve Selections

Heavy chains from the second FACS sorting round output against biotinylated human CD277 Fc fusion were used to prepare light chain diversification libraries. These libraries were used for four additional selection rounds. The first of these selection rounds utilized Miltenyi MACs beads conjugated with 10 nM biotinylated human CD277 Fc fusion as antigen.

Subsequent to the MACs bead selections, three rounds of FACS sorting were performed. The first of these rounds used biotinylated cyno CD277 Fc fusion at 10 nM. The second FACS round for the above involved negative sorts to decrease polyspecific reagent binders as described above. The third and final round of FACS selection was done using biotinylated human monomeric CD277 at 5 nM. Individual colonies from each FACS selection round described above were picked for sequencing characterization.

IgG and Fab Production and Purification

Yeast clones were grown to saturation and then induced for 48 h at 30° C. with shaking. After induction, yeast cells were pelleted and the supernatants were harvested for purification. IgGs were purified using a Protein A column and eluted with acetic acid. pH 2.0. Fab fragments were generated by papain digestion and purified over CaptureSelect IgG-CH1 affinity matrix (LifeTechnologies, Cat #1943200250).

Affinity Measurements of CD277 Antibodies

Affinity of the CD277 antibodies was determined by measuring their $K_D$ on ForteBio Octet. ForteBio affinity measurements were performed generally as previously described (Estep et al., MAbs. 2013 March-April; 5 (2): 270-8). Briefly, ForteBio affinity measurements were performed by loading IgGs on-line onto AHQ sensors. Sensors were equilibrated off-line in assay buffer for 30 min and then monitored on-line for 60 seconds for baseline establishment. For avid binding measurement, sensors with loaded IgGs were exposed to 100 nM antigen (human or cyno CD277) for 3 min, afterwards they were transferred to assay buffer for 3 min for off-rate measurement. Monovalent binding measurements were obtained by loading human CD277 Fc fusion on AHQ sensors followed by exposure to 200 nM antibody Fab in solution.

Kinetics data were fit using a 1:1 binding model in the data analysis software provided by ForteBio.

Octet Red384 Epitope Binning

Epitope binning of the antibodies was performed on a Forte Bio Octet Red384 system (Pall Forte Bio Corporation, Menlo Park, CA) using a standard sandwich format binning assay. CD277 control antibody IgGs were loaded onto AHQ sensors and unoccupied Fc-binding sites on the sensor were blocked with a non-relevant human IgG1 antibody. The sensors were then exposed to 100 nM target antigen followed by Adimab IgG antibody. Data were processed using ForteBio's Data Analysis Software 7.0. Additional binding by the second antibody after antigen association indicates an unoccupied epitope (non-competitor), while no binding indicates epitope blocking (competitor).

Based on the foregoing methods, a series of anti-CD277 antibodies were generated. Of particular interest, a particular anti-CD277 monoclonal antibody (referred to herein as mAb1) was identified. mAb1 is comprised of the following amino acid sequences:
  VH FR1: QVQLVQSGAEVKKPGASVKVSCKASG (SEQ ID NO: 66)
  VH CDR1: YTFTGYYMH (SEQ ID NO: 7)
  VH FR2: WVRQAPGQGLEWMG (SEQ ID NO: 67)
  VH CDR2: WINPNSGGTKYAQKFQG (SEQ ID NO: 8)
  VH FR3: RVTMTRDTSISTAYMELSRLRSDDTAVYYC (SEQ ID NO: 68)
  VH CDR3: ARRHSDMIGYYYGMDV (SEQ ID NO: 9)
  VH FR4: WGQGTTVTVSS (SEQ ID NO: 69)
  VL FR1: DIQMTQSPSSVSASVGDRVTITC (SEQ ID NO: 70)
  VL CDR1: RASQGISSWLA (SEQ ID NO: 10)
  VL FR2: WYQQKPGKAPKLLIY (SEQ ID NO: 71)
  VL CDR2: AASSLQS (SEQ ID NO: 11)
  VL FR3: GVPSRFSGSGSGTDFTLTISSLQPEDFATYYC (SEQ ID NO: 72)
  VL CDR3: QQATDFPPT (SEQ ID NO: 12)
  VL FR4: FGGGTKVEIK (SEQ ID NO: 73)

Example 2: Characterization of CD277/BTN3A1 Expression in Dissociated Ovarian Tumors and the Periphery The materials outlined in Table I were used in the Examples as described herein.

TABLE 1

Materials used in Examples

| Reagent | Catalogue/Lot Number | Source |
|---|---|---|
| K32/BTN-K32 cells | n/a | Wistar |
| Human PBMCs/Purified T cells | n/a | UPenn Human Immunology Core |
| RPMI | 10-040 CM | Corning |
| Penicillin/streptomycin | MT30002C | Corning |
| Fetal calf serum (FCS) | 03-600-511 | Fisher |
| L-Glutamine | MT25005CI | Corning |
| Sodium Pyruvate | 25-000-CI | Corning |
| Anti-human CD3 (OKT3) | BE0001-2 | BioXcell |
| Anti-human CD28 (15E8) | CBL517 | Millipore |
| Recombinant human IL-2 | 200-02 | Peprotech |
| Cell Trace Violet | C34557 | Biolegend |
| Zoledronic Acid (Zoledronate) | 1724827 | Sigma |

Human PBMCs and immunopurified CD4+ and CD8+ T cells were obtained from the University of Pennsylvania's human immunology core. These cells were then stained with cell trace violet per the manufacturer's procedure, and were then suspended in RPMI+10% FCS (R10) at a concentration of $1e^6$/ml. Concurrently, K32 and BTN-K32 cells were suspended in R10 at a concentration of $1e^5$ cells/ml, and were then coated with 2 µg/ml anti-CD3 and 1 µg/ml anti-CD28 for 20 minutes at room temperature. K32 and BTN-K32 were then equally divided and were incubated for 20 minutes at room temperature with CD277-specific antibodies (1ug/ml) provided by Compass. Equal volumes of K32/BTN-K32 cells were mixed with PBMCs/purified CD4+ and CD8+ T cells. Cells were then plated in a 96-well U-bottom plate in a total volume of 200 µl and then incubated at 37° C., 5% $CO_2$ for 6 days. After this incubation period, cell culture supernatants were collected and subjected to a human IFN-γ ELISA (Biolegend); PBMCs/purified T cells were subjected to analysis by flow cytometry to determine dilution of cell trace violet. In experiments in which zoledronate-pulsed K32/BTN-K32 cells were used, K32 and/or BTN-K32 cells were harvested and plated at $1e^6$/ml in R10 in a 24-well plate. 10 µM zoledronate was then pulsed into the culture and the cells incubated for 24 hours at 37° C., 5% $CO_2$. These cells were then washed twice and prepped for the proliferation assay as described herein.

The expression of CD277 was evaluated on infiltrating leukocytes and tumor cells from the dissociated ovarian tumors obtained from four patients by using flow cytometry. The expression of CD277 was also determined on peripheral leukocytes among these patients. As shown in FIGS. 1A-1C, CD277 was highly expressed on multiple lineages of tumor-infiltrating leukocytes; leukocytes observed in the periphery from these tumor-bearing patients express CD277 with the same intensity observed within the TME.

Figure 2:
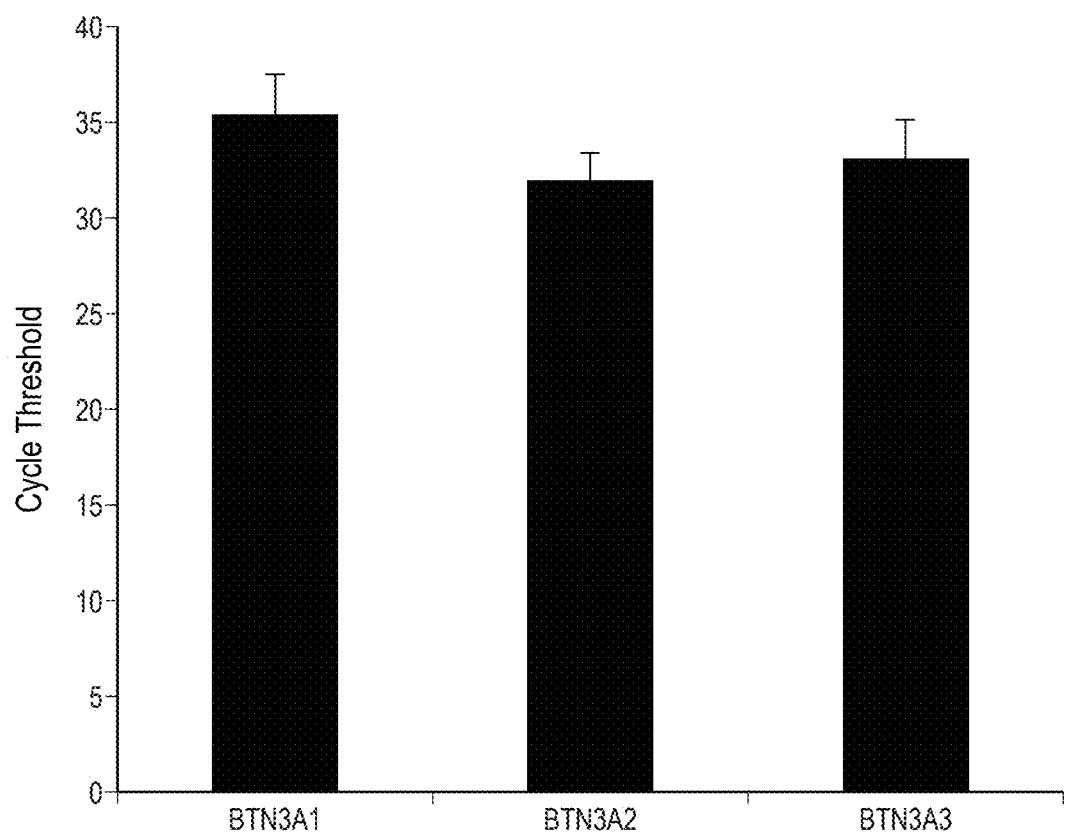
FIG. 2 depicts expression data for three BTN3A members.

Due to the promiscuity of the CD277 epitope within the butyrophilin subfamily 3, quantitative real-time PCR was employed to quantify levels of BTN3A1, BTN3A2, and BTN3A3 mRNA within ovarian tumors. As shown in FIG. 2, it was observed that the levels of mRNA expression of BTN3A family were similar.

Example 3: Characterization of Anti-CD277 Monoclonal Antibodies to Influence αβT Cell Effector Function in the Presence of BTN3A1

Figure 3A:
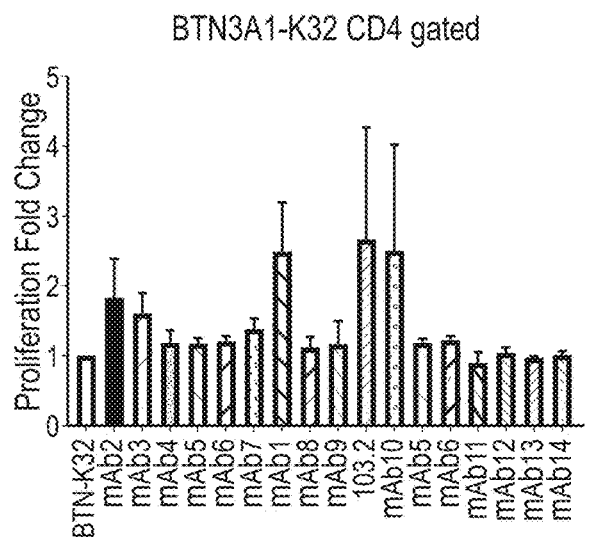
FIG. 3A depicts proliferation fold change data for peripheral blood mononuclear cells (PBMCs) stimulated with BTNA31-K32 cells, and gated for CD4 expression, in the presence of a panel of anti-CD277 antibodies.
Figure 3C:
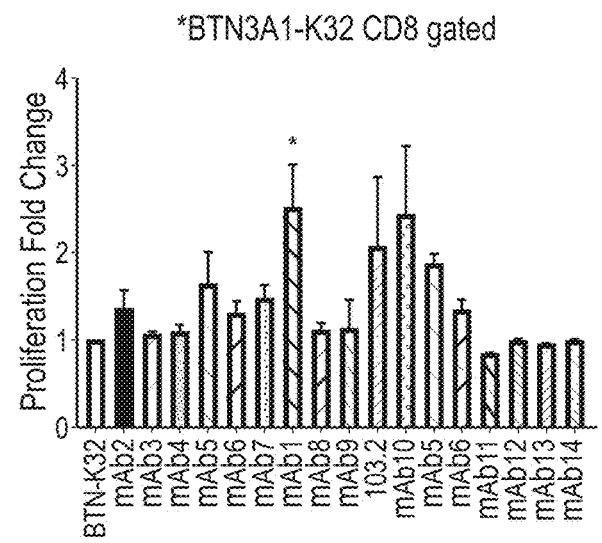
FIG. 3C depicts proliferation fold change data for PBMCs stimulated with BTNA31-K32 cells, and gated for CD8 expression, in the presence of a panel of anti-CD277 antibodies.
Figure 3B:
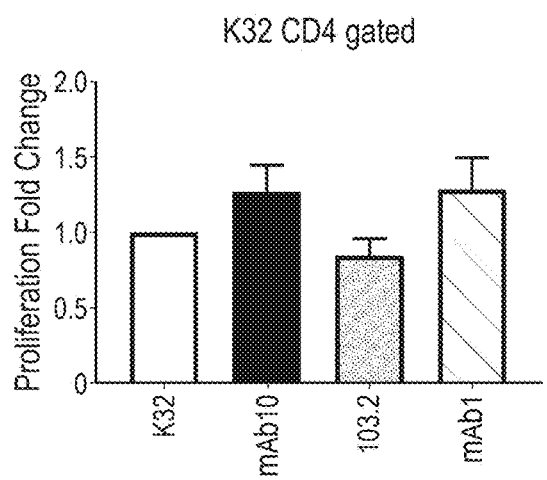
FIG. 3B depicts proliferation fold change data for PBMCs stimulated with K32 cells, and gated for CD4 expression, in the presence of a panel of anti-CD277 antibodies.
Figure 3D:
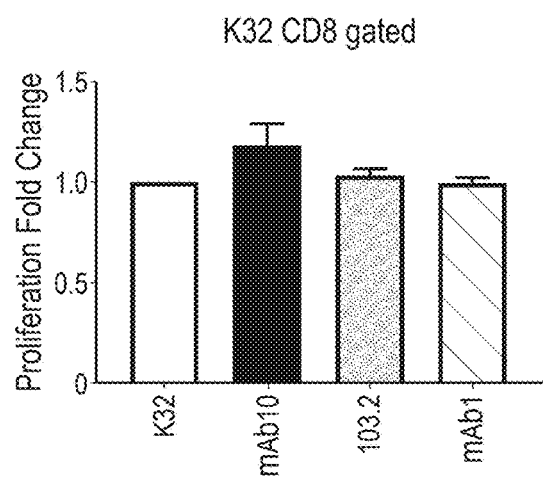
FIG. 3D depicts proliferation fold change data for PBMCs stimulated with K32 cells, and gated for CD8 expression, in the presence of a panel of anti-CD277 antibodies.

A co-culture system was used to evaluate the suppressive function of K32 cells ectopically expressing human BTN3A1. Total PBMCs or negatively immunopurified CD4+ or CD8+ T cells isolated from healthy donors were cultured in the presence of anti-CD3 (OKT3; 2 µg/ml) and anti-CD28 (15E8; 1 µg/ml) coated K32 cells or K32 cells ectopically expressing human BTN3A1 (BTN-K32) at a 10:1 T cell:K32 ratio, along with BTN3A1-specific antibodies provided by Compass (1 µg/ml). As shown in FIG. 3A, among gated CD4+ T cells within total PBMCs, the application of mAb1 within this in vitro co-culture system improves the proliferative function of gated CD4+ T cells by at least about 1.5 fold (FIG. 3A). Additionally, gated CD8+ T cells also demonstrate enhanced proliferation of at least about 1.5 fold upon the addition of mAb1; this rescue of proliferation achieved statistical significance (FIG. 3C, Right; p<0.05). Importantly, addition of mAb1 did not significantly alter proliferation of gated CD4+ or CD8+ T cells upon stimulation by K32 cells (FIGS. 3B and 3D).

Figure 4A:
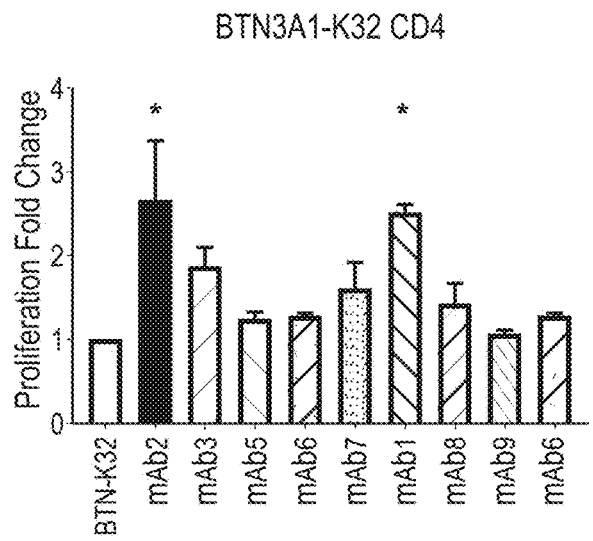
FIG. 4A depicts proliferation fold change data for purified CD4+ T cells stimulated with BTNA31-K32 in the presence of a panel of anti-CD277.
Figure 4C:
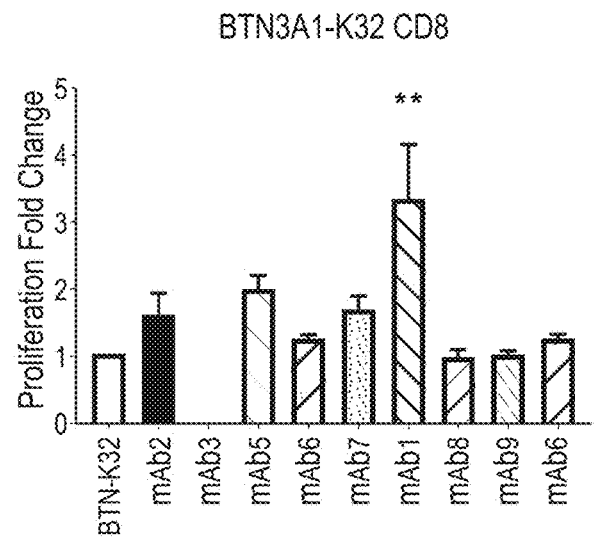
FIG. 4C depicts proliferation fold change data for purified CD8+ T cells stimulated with BTNA31-K32 cells in the presence of a panel of anti-CD277 antibodies.
Figure 4B:
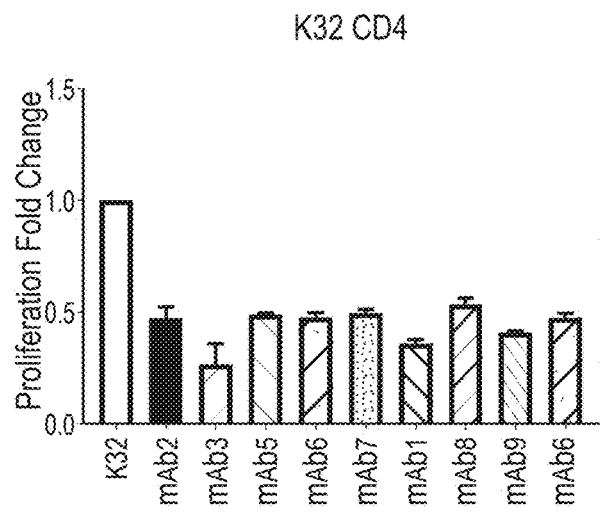
FIG. 4B depicts proliferation fold change data for purified CD4+ T cells stimulated with K32 cells in the presence of a panel of anti-CD277 antibodies.
Figure 4D:
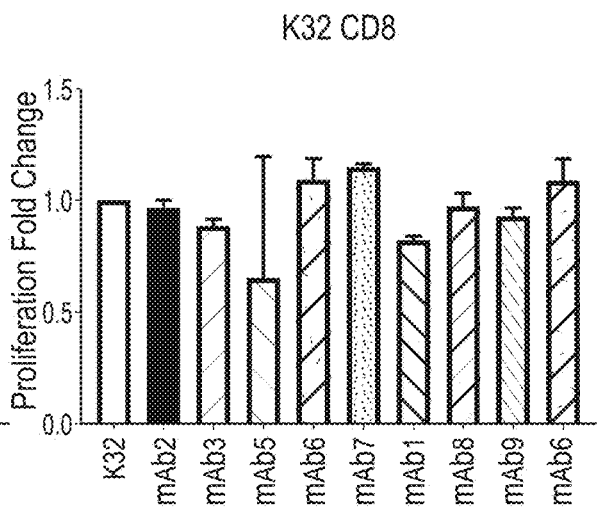
FIG. 4D depicts proliferation fold change data for purified CD8+ T cells stimulated with K32 cells in the presence of a panel of anti-CD277 antibodies.

The rescue of T cell proliferation by mAb1 was verified by using negatively immunopurified CD4+ and CD8+ T cells from two healthy patients. FIG. 4A demonstrates that mAb1 significantly improved CD4+ T cell proliferation by at least about 1.5 fold in the presence of BTN3A1. Purified CD8+ T cells stimulated in the presence of BTN3A1 demonstrated a significant at least about 2-fold increase of proliferation upon the addition of mAb1 (FIG. 4C). The addition of these antibodies did not induce non-specific increases in proliferation by T cell when stimulated of K32 cells in the absence of BTN3A1 (FIGS. 3B, 3D & 4B, 4D), however these antibodies may induce a degree proliferative suppression among CD4+ T cells (FIG. 4B).

Example 4: Evaluation of the Modulation of the Release of IFN-γ Upon Antibody-Mediated Neutralization of BTN3A1

Figure 5A:
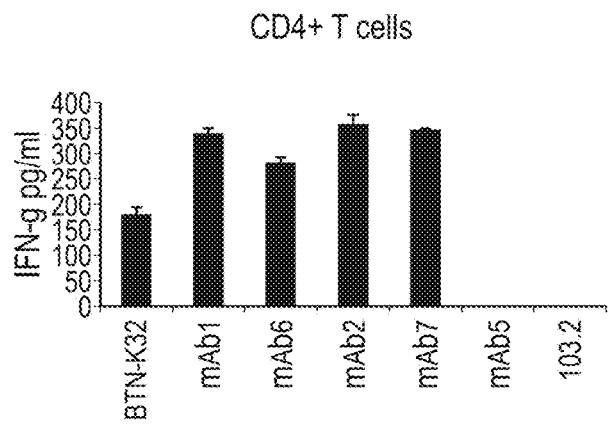
FIG. 5A depicts levels of IFN-γ for purified CD4+ T cells stimulated with BTNA31-K32 cells in the presence of a panel of anti-CD277 antibodies.
Figure 5C:
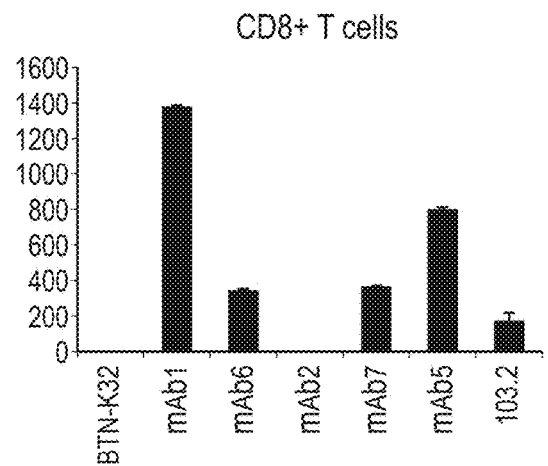
FIG. 5C depicts levels of IFN-γ for purified CD8+ T cells stimulated with BTNA31-K32 cells in the presence of a panel of anti-CD277 antibodies.
Figure 5B:
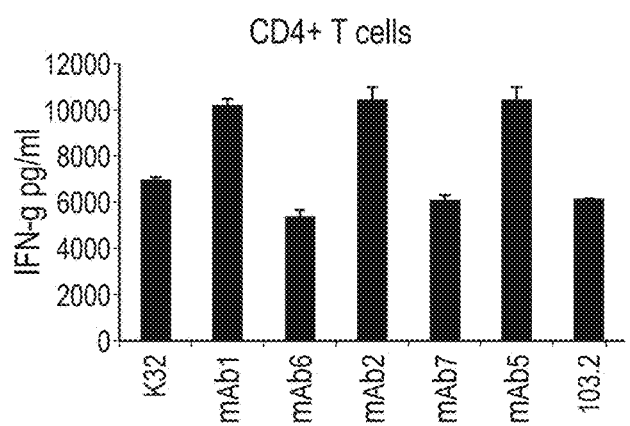
FIG. 5B depicts levels of IFN-γ for purified CD4+ T cells stimulated with K32 cells in the presence of a panel of anti-CD277 antibodies.
Figure 5D:
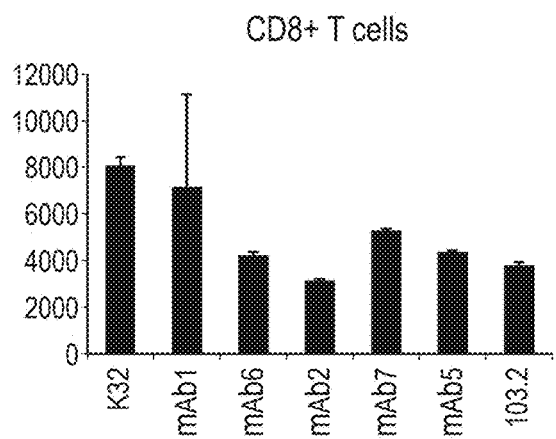
FIG. 5D depicts levels of IFN-γ for purified CD8+ T cells stimulated with K32 cells in the presence of a panel of anti-CD277 antibodies.

IFN-γ release was used to characterize the improved functionality of immunopurified CD4+ and CD8+ T cells stimulated in the presence of BTN-K32 cells upon the addition of BTN3A1 neutralizing antibodies. As shown in FIG. 5A, the mAb1 was able to enhance the release of IFN-γ by more than at least about 2-fold over baseline for CD4+ T cells. Impressively, mAb1 was shown to improve the release of IFN-γ from CD8+ T cells by about 1300-fold (FIG. 5C). Specificity controls demonstrated some alteration in IFN-γ release upon the addition of antibody for CD4+ T cells, but the differences were less than about 1.5-fold (FIGS. 5B and 5D).

Figure 6A:
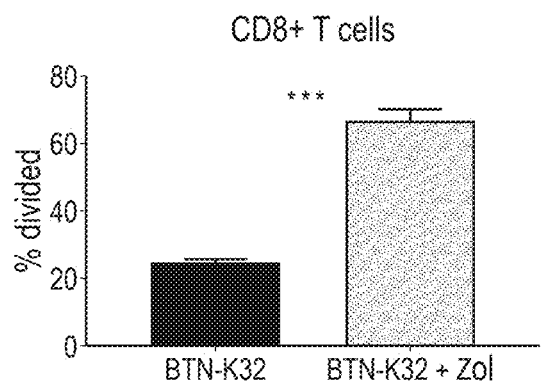
FIGS. 6A-6D depict T cell proliferation data for purified CD8+ T cells stimulated with BTNA31-K32 cells with and without the presence of zoledronate (FIG. 6A), purified CD8+ T cells stimulated with K32 cells with and without the presence of zoledronate (FIG. 6B), purified CD4+ T cells stimulated with BTNA31-K32 cells with and without the presence of zoledronate (FIG. 6C), and purified CD4+ T cells stimulated with K32 cells with and without the presence of zoledronate (FIG. 6D).
Figure 6C:
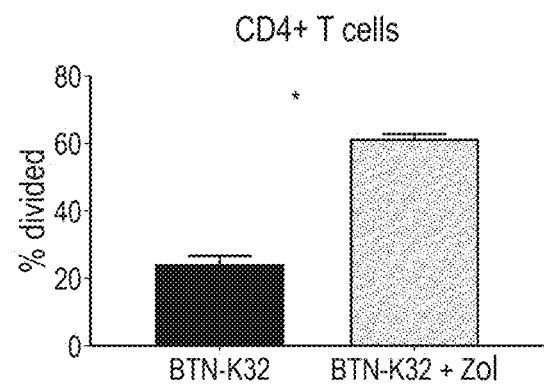
Figure 6B:
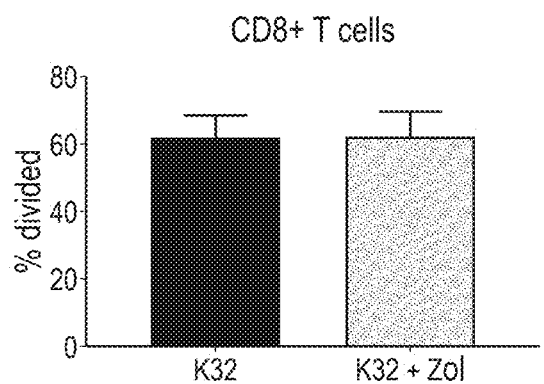
Figure 6D:
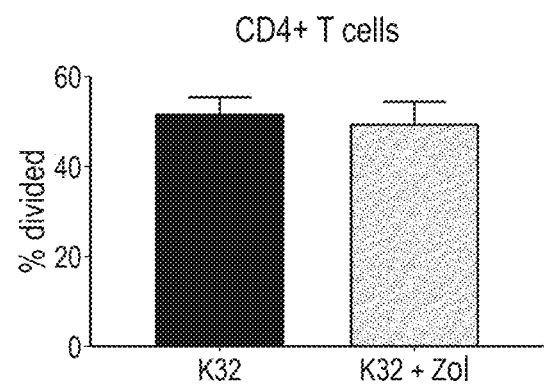

Example 5: The Phosphoantigen, Zoledronate, Completely Restores the Proliferative Function of CD4+ and CD8+ T Cells Immunopurified CD4+ and CD8+ T cells were cultured independently in the presence of K32 or BTN-K32 cells that had been treated overnight with 10 μM zoledronate, and then coated with anti-CD3 and anti-CD28 antibodies. As shown in FIGS. 6A-6D pulsing BTN-K32 cells with zoledronate abrogates the suppressive function of BTN3A1 on both CD4+ and CD8+ T cells (FIGS. 6A and 6C). As expected, no significant differences were observed when stimulating T cells with zoledronate-treated K32 cells (FIGS. 6B and 6D). Furthermore, pre-incubation of BTN-K32 cells with zoledronate dramatically improved the release of IFN-γ in purified CD4+ and CD8+ T cells from two donors (FIGS. 7A, 7B and 7C, 7D) as compared with controls (FIGS. 7E, 7F).

Example 6: Zoledronate-Pulsed BTN-K32 Cells Induce the Expansion of γδ T Cells and their Release of IFN-γ

Total PBMCs were cultured in the presence BTN-K32 cells pulsed, or not, with 10 μM zoledronate. Gated γδ T cells demonstrated a significant at least about 15-fold increase in proliferation in the presence of zoledronate-pulsed BTN-K32 cells (FIG. 8). Furthermore, the addition of mAb1 induced significant proliferation of gated γδ T cells stimulated by unpulsed BTN-K32 cells. Immunopurified γδ T cells also demonstrated a significant increase in the release of IFN-γ in the presence of zoledronate-pulsed BTN-K32 cells.

Example 7: BTN3a-Specific Antibodies Induce αβ T Cell Proliferation Among Total PBMCs in the Absence of Zoledronate or Supplied Costimulatory Signals 1 and 2

As shown in FIG. 9, BTNA3A-specific antibodies, including mAb], were shown to induce gated CD4+ and CD8+ T cell proliferation in the absence of zoledronate or supplied signals 1 (CD3) and 2 (CD28). Specifically, PBMCs were cultured in the presence of BTN3-K32 cells in the absence of CD3 or CD28 mAb. Anti-CD277 (1 μg/ml) and recombinant IL-2 (100 U/ml) were added at the initiation of the cultures and proliferation assessed at day 6 by measurement of cell-trace violet signal on gated CD4 and CD8+ T cells.

Example 8: Identification of Critical Binding Residues Comprising Heavy Chain CDR3 (CDRH3) of Anti-CD277 Antibodies To determine which amino acid residues within CDRH3 are critical for the binding of mAb1 to human CD277 polypeptides, alanine scanning was performed. A set of polynucleotides encoding derivatives of the mAb1 open reading frame was generated, wherein each derivative contained a single alanine residue substitution at a wild-type amino acid residue position comprising CDRH3. Positions R95 through D101 of SEQ ID NO: 3 were each mutated to alanine by replacing the wild-type codon with the alanine codon GCC. The amino acid sequences of each CDRH3 of each mAb1 alanine-substituted derivative are set forth in SEQ ID NOs: 18-31. The polynucleotides encoding each of the 13 mAb1 alanine-substituted derivatives were individually cloned into an expression vector (aglyco-IgG1, DID-2600) via Gibson Assembly. Each mAb1 alanine-substituted derivative was expressed and purified using standard techniques known in the art. Binding affinities of each mAb1 alanine-substituted derivative for human CD277 were determined via Wasatch SPR kinetics measurements and equilibrium cell-binding assays.

The retention, weakening, or loss of binding affinity resulting from mutations to alanine informed the determination of which residues were required for CD277 binding and which residues tolerated mutations. FIG. 10 summarizes the binding data for alanine scanning of CDRH3 with wild-type amino acid identity indicated at each position. CDRH3 positions are color-coded based on the effects of mutating the position to alanine, as shown. This analysis resulted in the following consensus sequence: RHSXMI-GYYYXXD (SEQ ID NO: 100). When bolded residues in the consensus sequence were mutated to alanine there was a complete loss of binding and these residues were therefore necessary for mAb1 binding to CD277. When Italicized residues are mutated to alanine the IgG is still able to bind CD277 but with a weaker affinity indicating these residues play some role in binding but are relatively tolerant of mutations. When residue positions denoted with an X are mutated to alanine there is little to no change in binding affinity. Thus, these residues tolerate mutations and are not critical to the binding interaction.

Example 9: Affinity Maturation of Anti-CD277 Antibody mAb1

Affinity matured anti-CD277 antibodies were generated using 2 mutant libraries. The first library contained mutations in the heavy chain CDR1, and CDR2. The second library contained mutations in the light chain CDR1, CDR2 and CDR3. The mutant libraries went through 3 rounds of phage panning aimed at increasing affinity for human CD277. In each round, an off-rate competition step was employed after initial binding to biotinylated antigens (i.e., 1 hour incubation with excess unlabeled antigen or parental IgG at 37° C.). After the final round of panning clones were picked, their sequences analyzed, and unique clones were assayed via Wasatch SPR binding kinetics and cell-binding equilibrium assays.

The resulting anti-CD277 antibodies from different selection rounds were plotted on $k_d/k_a$ double log plots. Apparent association and dissociation kinetic rate constants ($k_a$ and $k_d$ values) were determined on an SPRi reader (MX96, Carterra) in a running buffer of PBS-C 0.01%. Anti-human CD137 antibodies were covalently printed on a Carboxymethyldextran hydrogel 50 L chip (Xantec bioanalytics) on a CFM (Carterra). Freshly mixed activating reagents (150 ml 0.4 M EDC and 150 ml 0.1 M sulfo-NHS in H2O) were used to activate the surface of the SPR substrate for 7 minutes. Antibodies at 10 mg/ml in acetic acid buffer pH 4.5 were used for printing for 15 minutes. The printed chip was then quenched on SPRi reader (MX96, Carterra) with I M ethanolamine for 15 minutes. For kinetics analysis, purified recombinant his tagged human CD137 (0, 2.05, 5.12, 12.8, 32, 80, 200, 500 nM) was injected sequentially. For each concentration, there was 5 minutes of association followed by 10 minutes of dissociation. Data were processed and analyzed in SPR Inspection Tool and Scrubber softwares. The kinetic data were referenced with the interstitial reference spots and double-referenced to a buffer cycle, and then fit globally to a 1:1 binding model to determine their apparent association and dissociation kinetic rate constants ($k_a$ and $k_d$ values). The ratio $k_d/k_a$ was used to derive the $K_D$ value of each antigen/mAb interaction, i.e. $K_D = k_d/k_a$.

Table 2 provides the resulting ka, kd, Rmax and KD values, along with the corresponding sequences.

ectopically express both BTN3A1 and NY-ESO1. Overexpression of BTN3A1 and NY-ESO1 compared to parental OVCAR3 was confirmed by western blots (data not shown).

In parallel, sequences encoding an HLA A2-restricted T cell receptor (TCR) that recognizes SLLMWITQC (SEQ ID NO: 102), corresponding to residues 157 to 165 of NY-ESO1 was synthesized (IDT) and ligated into the pBMN-I-GFP retroviral vector, followed by viral packaging. Human donor αβ T cells were successfully transduced to express this specific TCR. Presence of transduced cells was confirmed by flow cytometry (data not shown).

Engineered OVCAR3 tumor cells were then used to challenge immunodeficient NSG mice. Specifically, 5×10$^6$ OVCAR3 cells premixed 1:1 with growth factor-reduced matrigel were injected subcutaneously into the axillary flank. Once tumors reached ~75 mm$^3$, mice received 1×10$^6$ NY-ESO1 TCR-transduced αβ T cells intravenously, or mock (empty vector) αβ T cells. Approximately 6 hours after the T cell transfer, administration of antibody mAb1 or IgG control antibody intraperitoneally at 100 μg was initiated and continued every third day until the study end-point. Two separate studies were conducted. Tumor volume was calculated (Length*(Width^2)/2) using dial calipers.

Figure 11A:
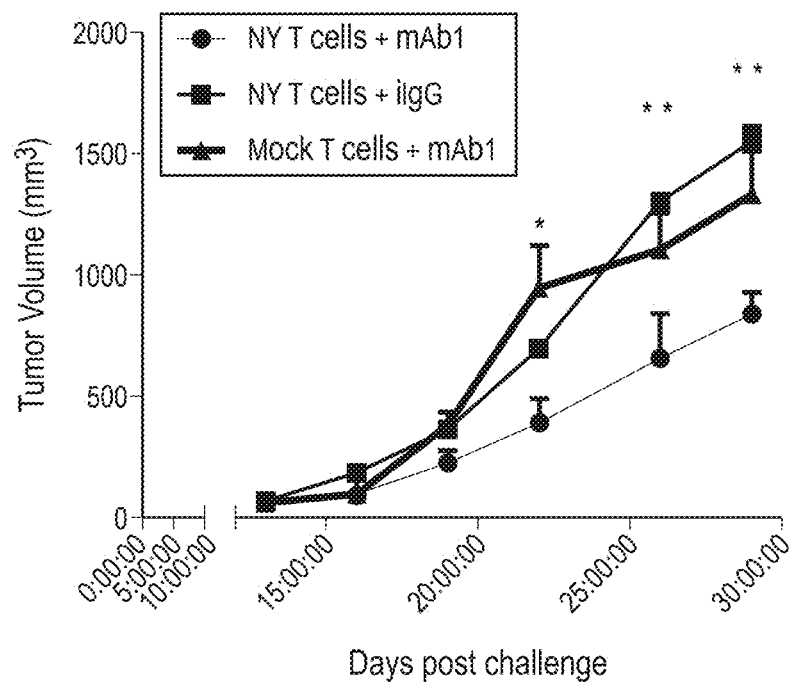
FIGS. 11A and 11B are graphs showing OVCAR3 tumor volume in mice treated with anti-CD277 antibody mAb1 with or without NY-ESO1 TCR-transduced αβ T cells, or IgG control with NY-ESO1 TCR-transduced αβ T cells from two separate studies.
Figure 11B:
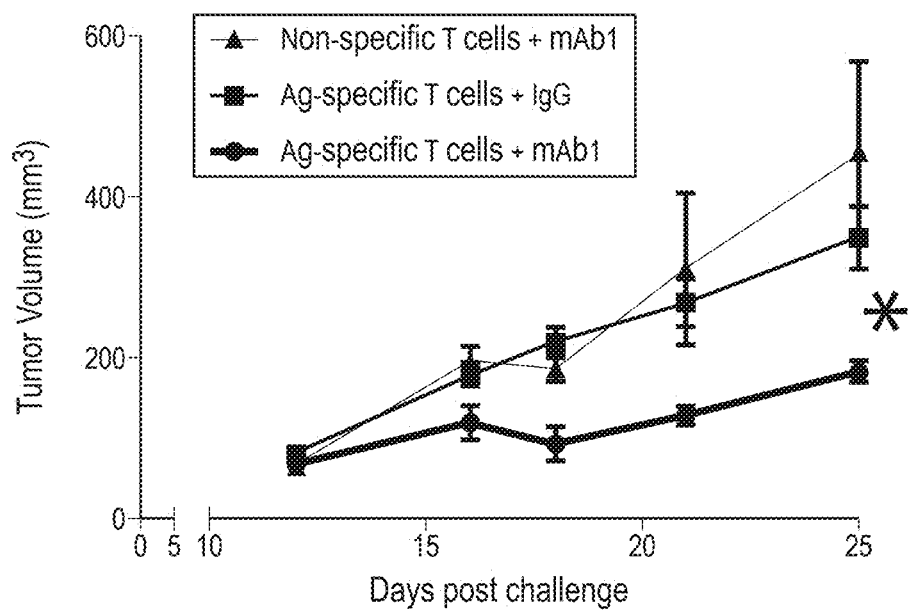
Figure 11C:
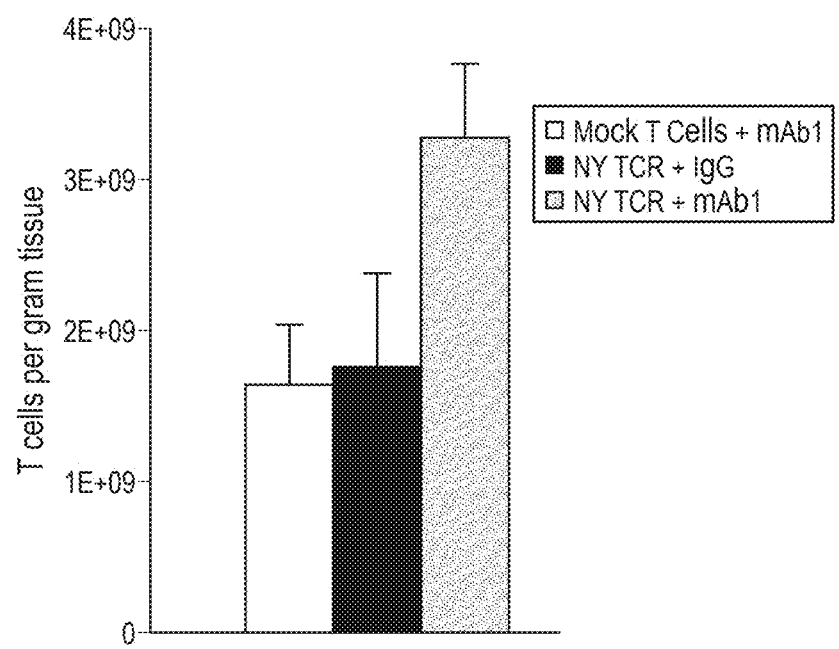
FIG. 11C is a bar graph showing the number of T cells per gram of tissue derived from mice having OVCAR3 tumors 30 days after treatment with anti-CD277 antibody mAb1 with or without NY-ESO1 TCR-transduced αβ T cells, or IgG control with NY-ESO1 TCR-transduced αβ T cells.

FIGS. 11A and 11B show inhibition of tumor volume growth when antibody mAb1 was administered to mice with NY-ESO-1 TCR-transduced of T cells compared to control antibody and compared to mice that received mAb1 with mock αβ T cells. Further, analysis of the tumors at day 30 indicated that antibody mAb1 increased antigen-specific T cell infiltration into BTN3A1+OVCAR3 tumor microenvironment (FIG. 11C).

Overall, these results indicated that CD277 neutralization enhanced the anti-tumor activity of NY-ESO-1-specific human T cells.

TABLE 2

| Antibody | Heavy Chain | Light Chain | ka | kd | Rmax | KD |
| --- | --- | --- | --- | --- | --- | --- |
| mAb11 | SEQ ID NO: 42 | SEQ ID NO: 41 | 1.82E+04 | 9.36E−05 | 64.22 | 5.13E−09 |
| mAb10 | SEQ ID NO: 36 | SEQ ID NO: 41 | 1.71E+04 | 8.03E−05 | 78.38 | 4.69E−09 |
| mAb9 | SEQ ID NO: 34 | SEQ ID NO: 40 | 1.42E+04 | 9.71E−05 | 70.34 | 6.82E−09 |
| mAb8 | SEQ ID NO: 37 | SEQ ID NO: 33 | 2.28E+04 | 1.38E−04 | 93.67 | 6.05E−09 |
| mAb7 | SEQ ID NO: 37 | SEQ ID NO: 39 | 2.37E+04 | 1.59E−04 | 93.90 | 6.69E−09 |
| mAb6 | SEQ ID NO: 37 | SEQ ID NO: 38 | 2.71E+04 | 1.18E−04 | 84.82 | 4.37E−09 |
| mAb5 | SEQ ID NO: 32 | SEQ ID NO: 35 | 1.93E+04 | 2.50E−04 | 55.08 | 1.29E−08 |
| mAb4 | SEQ ID NO: 36 | SEQ ID NO: 35 | 1.88E+04 | 1.90E−04 | 76.76 | 1.01E−08 |
| mAb3 | SEQ ID NO: 34 | SEQ ID NO: 35 | 1.81E+04 | 1.21E−04 | 73.38 | 6.71E−09 |
| mAb2 | SEQ ID NO: 32 | SEQ ID NO: 33 | 1.83E+04 | 4.89E−05 | 97.27 | 2.68E−09 |
| mAb1 | SEQ ID NO: 3 ($V_H$) | SEQ ID NO: 4 or 86 ($V_L$) | 2.30E+04 | 3.84E−04 | 56.16 | 1.67E−08 |

Example 10: In Vivo Anti-Tumor Response with Anti-CD277 Antibody mAb1

To determine whether anti-CD277 antibodies can control tumor growth by enhancing the activity of antigen specific T cells in vivo, a subcutaneous model of xenograft human ovarian cancer that over-expresses CD277 and a model antigen, was utilized.

Specifically, OVCAR3 cells were engineered to over-express CD277 (BTN3A1) and NY-ESO1 by lentiviral infection. Sequences encoding the open-reading frame of BTN3A1 and NYESO-1 were synthesized (IDT) and then ligated into pLVX lentiviral vectors (Takara). After viral packaging, human OVCAR3 tumor cells were transduced to

Example 11: In Vivo Anti-Tumor Response with Anti-CD277 mAb1 in Adoptive Transfer Model To determine the effect of anti-CD277 antibodies on in vivo activity of γδ T cells in the tumor microenvironment, OVCAR3 xenografts with an adoptive γδ T cell transfer model was utilized.

Figure 12A:
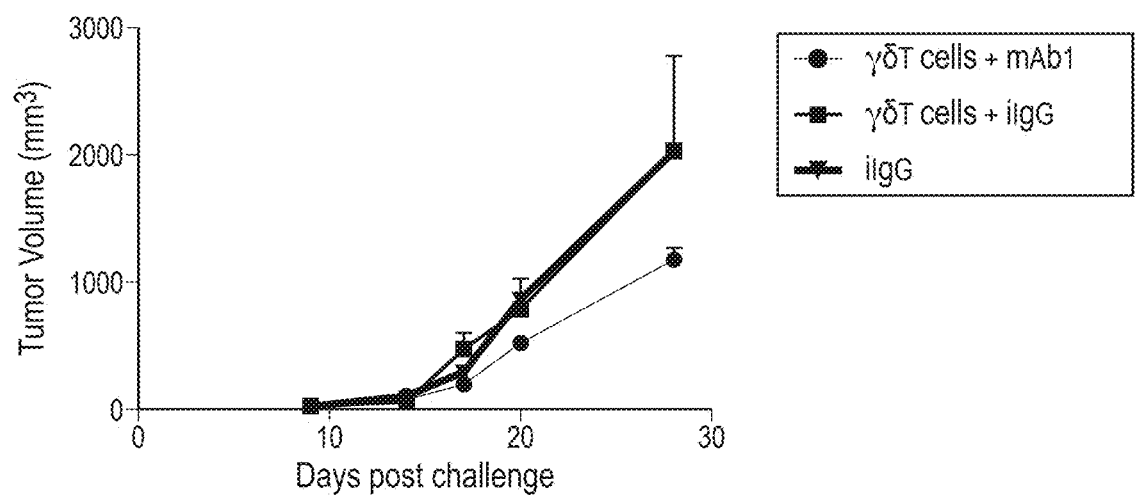
FIG. 12A is graph showing OVCAR3 tumor volume in mice that received γδ T cells in addition to anti-CD277 antibody mAb1 or IgG control, or IgG control alone. FIG.
Figure 12B:
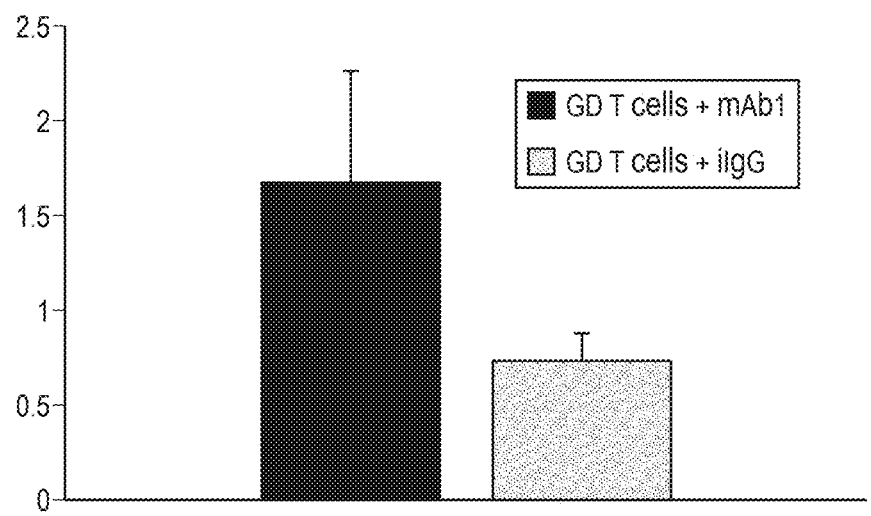

Specifically, NSG mice were challenged with 5×10$^6$ BTN3A1+NYESO1+OVCAR3 cells as described above. In addition, Vγ9δ2 γδ T cells from the apheresis of healthy donors were expanded using zolendronate (1 μM) and IL-2 (200U/ml). After 10 days of expansion, γδ T cells were negatively immunopurified (StemCell Technologies). The purity of Vγ9 cells was greater than 95%. Once tumors reached ~75 mm³, the γδ T cells were serum-starved in HBSS for 4 hours, and then administered intravenously (1×10⁶ cells) to the tumor-bearing mice Approximately 6 hours after T cell transfer, administration of antibody mAb1 or IgG control antibody intraperitoneally at 100 µg was initiated and continued every third day until the study end-point. Tumor volume was calculated (Length* (Width^2)/2) using dial calipers. Decreased tumor volume was observed with mAb1 (FIG. 12A). Analysis of the tumors at the end of the study revealed increased accumulation of γδ T cells within ovarian tumors in response to treatment with antibody mAb1 (FIG. 12B).

Overall, these results indicated anti-CD277 antibodies increase the expansion of γδ T cells at tumor beds.

TABLE 3

Antibody Combinations

| mAb | Heavy Chain | Light Chain | $V_H$ CDR CDR1 | CDR2 | CDR3 | $V_L$ CDR CDR1 | CDR2 | CDR3 |
|---|---|---|---|---|---|---|---|---|
| mAb1 | 3 ($V_H$) | 4 ($V_L$) | 7 | 8 | 9 | 10 | 11 | 12 |
| mAb2 | 32 | 33 | 43 | 47 | 9 | 52 | 58 | 62 |
| mAb3 | 34 | 35 | 44 | 48 | 9 | 53 | 59 | 63 |
| mAb4 | 36 | 35 | 45 | 49 | 9 | 53 | 59 | 63 |
| mAb5 | 32 | 35 | 43 | 47 | 9 | 53 | 59 | 63 |
| mAb6 | 37 | 38 | 46 | 50 | 9 | 54 | 60 | 62 |
| mAb7 | 37 | 39 | 46 | 50 | 9 | 55 | 60 | 62 |
| mAb8 | 37 | 33 | 46 | 50 | 9 | 56 | 58 | 61 |
| mAb9 | 34 | 40 | 44 | 48 | 9 | 57 | 61 | 64 |
| mAb10 | 36 | 41 | 45 | 49 | 9 | 57 | 59 | 65 |
| mAb11 | 42 | 41 | 43 | 47 | 9 | 57 | 59 | 65 |
| mAb12 | 3 | 33 | 7 | 8 | 9 | 52 | 58 | 62 |
| mAb13 | 3 | 35 | 7 | 8 | 9 | 53 | 59 | 63 |
| mAb14 | 3 | 38 | 7 | 8 | 9 | 54 | 60 | 62 |
| mAb15 | 3 | 39 | 7 | 8 | 9 | 55 | 60 | 62 |
| mAb16 | 3 | 40 | 7 | 8 | 9 | 57 | 61 | 64 |
| mAb17 | 3 | 41 | 7 | 8 | 9 | 57 | 59 | 65 |
| mAb18 | 32 | 38 | 43 | 47 | 9 | 54 | 60 | 62 |
| mAb19 | 32 | 39 | 43 | 47 | 9 | 55 | 60 | 62 |
| mAb20 | 32 | 40 | 43 | 47 | 9 | 57 | 61 | 64 |
| mAb21 | 32 | 41 | 43 | 47 | 9 | 57 | 59 | 65 |
| mAb22 | 34 | 33 | 44 | 48 | 9 | 52 | 58 | 62 |
| mAb23 | 34 | 38 | 44 | 48 | 9 | 54 | 60 | 62 |
| mAb24 | 34 | 39 | 44 | 48 | 9 | 55 | 60 | 62 |
| mAb25 | 34 | 41 | 44 | 48 | 9 | 57 | 59 | 65 |
| mAb26 | 36 | 33 | 45 | 49 | 9 | 52 | 58 | 62 |
| mAb27 | 36 | 38 | 45 | 49 | 9 | 54 | 60 | 62 |
| mAb28 | 36 | 39 | 45 | 49 | 9 | 55 | 60 | 62 |
| mAb29 | 36 | 40 | 45 | 49 | 9 | 57 | 61 | 64 |
| mAb30 | 37 | 35 | 46 | 50 | 9 | 53 | 59 | 63 |
| mAb31 | 37 | 40 | 46 | 50 | 9 | 57 | 61 | 64 |
| mAb32 | 37 | 41 | 46 | 50 | 9 | 57 | 59 | 65 |
| mAb33 | 42 | 33 | 43 | 47 | 9 | 52 | 58 | 62 |
| mAb34 | 42 | 35 | 43 | 47 | 9 | 53 | 59 | 63 |
| mAb35 | 42 | 38 | 43 | 47 | 9 | 54 | 60 | 62 |
| mAb36 | 42 | 39 | 43 | 47 | 9 | 55 | 60 | 62 |
| mAb37 | 42 | 40 | 43 | 47 | 9 | 57 | 61 | 64 |
| mAb38 | 32 | 4 | 43 | 47 | 9 | 10 | 11 | 12 |
| mAb39 | 34 | 4 | 44 | 48 | 9 | 10 | 11 | 12 |
| mAb40 | 36 | 4 | 45 | 49 | 9 | 10 | 11 | 12 |
| mAb41 | 37 | 4 | 46 | 50 | 9 | 10 | 11 | 12 |
| mAb42 | 42 | 4 | 43 | 47 | 9 | 10 | 11 | 12 |

TABLE 4

Sequence Listing

| SEQ ID NO | Description | Sequence |
|---|---|---|
| 1 | Human IgG1 | ASTKGPSVFPLAPSSKSTSGGTAALGCLVKDYFPEPVTVSWNSGAL TSGVHTFPAVLQSSGLYSLSSVVTVPSSSLGTQTYICNVNHKPSNT KVDKKVEPKSCDKTHTCPPCPAPELLGGPSVFLFPPKPKDTLMISR TPEVTCVVVDVSHEDPEVKFNWYVDGVEVHNAKTKPREEQYNSTYR VVSVLTVLHQDWLNGKEYKCKVSNKALPAPIEKTISKAKGQPREPQ VYTLPPSRDELTKNQVSLTCLVKGFYPSDIAVEWESNGQPENNYKT TPPVLDSDGSFFLYSKLTVDKSRWQQGNVFSCSVMHEALHNHYTQK SLSLSPGK |
| 2 | CD277 | MKMASFLAFLLLNFRVCLLLLQLLMPHSAQFSVLGPSGPILAMVGE DADLPCHLFPTMSAETMELKWVSSSLRQVVNVYADGKEVEDRQSAP YRGRTSILRDGITAGKAALRIHNVTASDSGKYLCYFQDGDFYEKAL VELKVAALGSDLHVDVKGYKDGGIHLECRSTGWYPQPQIQWSNNKG ENIPTVEAPVVADGVGLYAVAASVIMRGSSGEGVSCTIRSSLLGLE KTASISIADPFFRSAQRWIAALAGTLPVLLLLLGGAGYELWQQQEE KKTQFRKKKREQELREMAWSTMKQEQSTRVKLLEELRWRSIQYASR GERHSAYNEWKKALFKPADVILDPKTANPILLVSEDQRSVQRAKEP QDLPDNPERFNWHYCVLGCESFISGRHYWEVEVGDRKEWHIGVCSK NVQRKGWVKMTPENGEWTMGLTDGNKYRTLTEPRTNLKLPKPPKKV GVFLDYETGDISFYNAVDGSHIHTFLDVSFSEALYPVFRILTLEPT ALTICPA |
| 3 | $V_{H1}$ amino acid sequence | QVQLVQSGAEVKKPGASVKVSCKASGYTFTGYYMHWVRQAPGQGLE WMGWINPNSGGTKYAQKFQGRVTMTRDTSISTAYMELSRLRSDDTA VYYCARRHSDMIGYYYGMDVWGQGTTVTVSS |
| 4 | $V_{L1}$ amino acid sequence | DIQMTQSPSSVSASVGDRVTITCRASQGISSWLAWYQQKPGKAPKL IYAASSLQSGVPSRFSGSGSGTDFTLTISSLQPEDFATYYCQQATD FPPTFGGGTKVEIK |
| 5 | $V_{H1}$ nucleic acid sequence | CAAGTCCAGCTTGTGCAATCCGGGGCAGAGGTTAAAAAGCCCGGGG CTTCCGTCAAGGTATCATGTAAGGCTTCAGGATATACATTCACAGG GTACTATATGCACTGGGTGCGTCAGGCACCCGGGCAGGGCTTGGAA |

TABLE 4-continued

Sequence Listing

| SEQ ID NO | Description | Sequence |
|---|---|---|
| | | TGGATGGGGTGGATAAACCCAAATAGTGGAGGCACTAAATATGCTC AAAAGTTCCAAGGGCGGGTGACTATGACCAGGGACACCAGTATCTC CACCGCCTATATGGAACTGTCACGACTCAGATCAGACGATACCGCT GTATATTACTGCGCTCGTAGACACTCAGACATGATTGGATACTACT ATGGAATGGACGTATGGGGCCAAGGGACTACAGTTACAGTCTCTAG C |
| 6 | V$_{L1}$ nucleic acid sequence | GACATACAGATGACACAAAGCCCAAGCAGCGTCAGCGCAAGTGTCG GTGACCGCGTCACAATAACTTGTCGGGCTAGTCAAGGAATAAGCTC TTGGCTCGCCTGGTATCAACAAAAACCTGGCAAAGCACCCAAGCTG TTGATCTACGCAGCCAGCTCACTTCAGAGCGGAGTGCCCAGTCGCT TCTCTGGTTCCGGCTCAGGTACTGATTTCACACTTACTATTTCATC ACTGCAACCCGAGGATTTCGCAACATATTACTGTCAACAGGCCACA GACTTTCCACCAACTTTTGGTGGAGGCACAAAGGTCGAAATTAAA |
| 7 | HCDR1 | YTFTGYYMH |
| 8 | HCDR2 | WINPNSGGTKYAQKFQG |
| 9 | HCDR3 | ARRHSDMIGYYYGMDV |
| 10 | LCDR1 | RASQGISSWLA |
| 11 | LCDR2 | AASSLQS |
| 12 | LCDR3 | QQATDEPPT |
| 13 | CD277 Extracellular Domain | QFSVLGPSGPILAMVGEDADLPCHLFPTMSAETMELKWVSSSLRQV VNVYADGKEVEDRQSAPYRGRTSILRDGITAGKAALRIHNVTASDS GKYLCYFQDGDFYEKALVELKVAALGSDLHVDVKGYKDGGIHLECR STGWYPQPQIQWSNNKGENIPTVEAPVVADGVGLYAVAASVIMRGS SGEGVSCTIRSSLLGLEKTASISIADPFFRSAQRWIAALAG |
| 14 | FLAG | DYKDDDDK |
| 15 | Polyhistidine (6-His) | HHHHHH |
| 16 | Hemagglutinin (HA) | YPYDVPDYA |
| 17 | Human IgG4 mutant (S228P/C-terminal K truncation) | ASTKGPSVFPLAPCSRSTSESTAALGCLVKDYFPEPVTVSWNSGAL TSGVHTFPAVLQSSGLYSLSSVVTVPSSSLGTKTYTCNVDHKPSNT KVDKRVESKYGPPCPPCPAPEFLGGPSVFLFPPKPKDTLMISRTPE VTCVVVDVSQEDPEVQFNWYVDGVEVHNAKTKPREEQFNSTYRVVS VLTVLHQDWLNGKEYKCKVSNKGLPSSIEKTISKAKGQPREPQVYT LPPSQEEMTKNQVSLTCLVKGFYPSDIAVEWESNGQPENNYKTTPP VLDSDGSFFLYSRLTVDKSRWQEGNVFSCSVMHEALHNHYTQKSLS LSLG |
| 18 | HCDR3.1 | ARAHSDMIGYYYGMDV |
| 19 | HCDR3.2 | ARRASDMIGYYYGMDV |
| 20 | HCDR3.3 | ARRHADMIGYYYGMDV |
| 21 | HCDR3.4 | ARRHSAMIGYYYGMDV |
| 22 | HCDR3.5 | ARRHSDAIGYYYGMDV |
| 23 | HCDR3.6 | ARRHSDMAGYYYGMDV |
| 24 | HCDR3.7 | ARRHSDMIAYYYGMDV |
| 25 | HCDR3.8 | ARRHSDMIGAYYGMDV |
| 26 | HCDR3.9 | ARRHSDMIGYAYGMDV |
| 27 | HCDR3.10 | ARRHSDMIGYYAGMDV |
| 28 | HCDR3.11 | ARRHSDMIGYYYAMDV |
| 29 | HCDR3.12 | ARRHSDMIGYYYGADV |
| 30 | HCDR3.13 | ARRHSDMIGYYYGMAV |

TABLE 4-continued

Sequence Listing

| SEQ ID NO | Description | Sequence |
|---|---|---|
| 31 | HCDR3.14 | ARRHSDMIGYYYGMDA |
| 32 | Heavy chain 2 amino acid sequence | QVQLVQSGAEVKKPGASVKVSCKASGYTFSNYYIHWVRQAPGQGLE WMGWINANSGGTKYAQKFQGRVTMTRDTSISTAYMELSRLRSDDTA VYYCARRHSDMIGYYYGMDVWGQGTTVTVSSASTKGPSVFPLAPSS KSTSGGTAALGCLVKDYFPEPVTVSWNSGALTSGVHTFPAVLQSSG LYSLSSVVTVPSSSLGTQTYICNVNHKPSNTKVDKKVEPKSCDKTH TCPPCPAPELLGGPSVFLFPPKPKDTLMISRTPEVTCVVVDVSHED PEVKFNWYVDGVEVHNAKTKPREEQYASTYRVVSVLTVLHQDWLNG KEYKCKVSNKALPAPIEKTISKAKGQPREPQVYTLPPSRDELTKNQ VSLTCLVKGFYPSDIAVEWESNGQPENNYKTTPPVLDSDGSFFLYS KLTVDKSRWQQGNVFSCSVMHEALHNHYTQKSLSLSPG |
| 33 | Light chain 2 amino acid sequence | DIQMTQSPSSLSASVGDRVTITCRASQSIDRYLNWYQQKPGKAPKL LIYAASRLQSGVPSRESGSGSGTDFTLTISSLQPEDFATYYCQQAN SFPPTFGQGTRLEIKRTVAAPSVFIFPPSDEQLKSGTASVVCLLNN FYPREAKVQWKVDNALQSGNSQESVTEQDSKDSTYSLSSTLTLSKA DYEKHKVYACEVTHQGLSSPVTKSENRGEC |
| 34 | Heavy chain 3 amino acid sequence | QVQLVQSGAEVKKPGASVKVSCKASGYTFNGYYIHWVRQAPGQGLE WMGWINSNSGGTKYAQKFQGRVTMTRDTSISTAYMELSRLRSDDTA VYYCARRHSDMIGYYYGMDVWGQGTTVTVSSASTKGPSVFPLAPSS KSTSGGTAALGCLVKDYFPEPVTVSWNSGALTSGVHTFPAVLQSSG LYSLSSVVTVPSSSLGTQTYICNVNHKPSNTKVDKKVEPKSCDKTH TCPPCPAPELLGGPSVFLFPPKPKDTLMISRTPEVTCVVVDVSHED PEVKFNWYVDGVEVHNAKTKPREEQYASTYRVVSVLTVLHQDWLNG KEYKCKVSNKALPAPIEKTISKAKGQPREPQVYTLPPSRDELTKNQ VSLTCLVKGFYPSDIAVEWESNGQPENNYKTTPPVLDSDGSFFLYS KLTVDKSRWQQGNVFSCSVMHEALHNHYTQKSLSLSPG |
| 35 | Light chain 3 amino acid sequence | DIQMTQSPSSVSASVGDRVTITCRASQGISSWLAWYQQKPGKAPKL LIYAASSLQSGVPSRFSGSGSGTDFTLTISSLQPEDFATYYCQQAT DFPPTFGGGTKVEIKRTVAAPSVFIFPPSDEQLKSGTASVVCLLNN FYPREAKVQWKVDNALQSGNSQESVTEQDSKDSTYSLSSTLTLSKA DYEKHKVYACEVTHQGLSSPVTKSENRGEC |
| 36 | Heavy chain 4 amino acid sequence | QVQLVQSGAEVKKPGASVKVSCKASGYTFTNYYMHWVRQAPGQGLE WMGWINVNSGVTKYAQKFQGRVTMTRDTSISTAYMELSRLRSDDTA VYYCARRHSDMIGYYYGMDVWGQGTTVTVSSASTKGPSVFPLAPSS KSTSGGTAALGCLVKDYFPEPVTVSWNSGALTSGVHTFPAVLQSSG LYSLSSVVTVPSSSLGTQTYICNVNHKPSNTKVDKKVEPKSCDKTH TCPPCPAPELLGGPSVFLFPPKPKDTLMISRTPEVTCVVVDVSHED PEVKFNWYVDGVEVHNAKTKPREEQYASTYRVVSVLTVLHQDWLNG KEYKCKVSNKALPAPIEKTISKAKGQPREPQVYTLPPSRDELTKNQ VSLTCLVKGFYPSDIAVEWESNGQPENNYKTTPPVLDSDGSFFLYS KLTVDKSRWQQGNVFSCSVMHEALHNHYTQKSLSLSPG |
| 37 | Heavy chain 5 amino acid sequence | QVQLVQSGAEVKKPGASVKVSCKASGYTFTGYYMHWVRQAPGQGLE WMGWINPNSGGTKYAQKFQGRVTMTRDTSISTAYMELSRLRSDDTA VYYCARRHSDMIGYYYGMDVWGQGTTVTVSSASTKGPSVFPLAPSS KSTSGGTAALGCLVKDYFPEPVTVSWNSGALTSGVHTFPAVLQSSG LYSLSSVVTVPSSSLGTQTYICNVNHKPSNTKVDKKVEPKSCDKTH TCPPCPAPELLGGPSVFLFPPKPKDTLMISRTPEVTCVVVDVSHED PEVKFNWYVDGVEVHNAKTKPREEQYASTYRVVSVLTVLHQDWLNG KEYKCKVSNKALPAPIEKTISKAKGQPREPQVYTLPPSRDELTKNQ VSLTCLVKGFYPSDIAVEWESNGQPENNYKTTPPVLDSDGSFFLYS KLTVDKSRWQQGNVFSCSVMHEALHNHYTQKSLSLSPG |
| 38 | Light chain 4 amino acid sequence | DIQMTQSPSSLSASVGDRVTITCRASQSISLFLNWYQQKPGKAPKL LIYTASSLQSGVPSRFSGSGSGTDFTLTISSLQPEDFATYYCQQAN SFPPTFGGGTKVDIKRTVAAPSVFIFPPSDEQLKSGTASVVCLLNN FYPREAKVQWKVDNALQSGNSQESVTEQDSKDSTYSLSSTLTLSKA DYEKHKVYACEVTHQGLSSPVTKSENRGEC |
| 39 | Light chain 5 amino acid sequence | DIQMTQSPSSLSASVGDRVTITCRASQDISVYLNWYQQKPGKAPKL LIYTASSLQSGVPSRFSGSGSGTDFTLTISSLQPEDFATYYCQQAN SFPPTFGGGTKVDIKRTVAAPSVFIFPPSDEQLKSGTASVVCLLNN FYPREAKVQWKVDNALQSGNSQESVTEQDSKDSTYSLSSTLTLSKA DYEKHKVYACEVTHQGLSSPVTKSENRGEC |

TABLE 4-continued

Sequence Listing

| SEQ ID NO | Description | Sequence |
|---|---|---|
| 40 | Light chain 6 amino acid sequence | DIQLTQSPSSLSASVGDRVTITCRASQSISSYLNWYQQKPGKVPKLLIYAASTLQSGVPSRFSGSGSGTDFTLTISSLQPEDFATYSCQQTNSFPPTFGQGTKVEIKRTVAAPSVFIFPPSDEQLKSGTASVVCLLNNFYPREAKVQWKVDNALQSGNSQESVTEQDSKDSTYSLSSTLTLSKADYEKHKVYACEVTHQGLSSPVTKSFNRGEC |
| 41 | Light chain 7 amino acid sequence | DIQMTQSPSSLSASVGDRVTITCRASQSISSYLNWYQQKPGKAPKLLIYAASSLQSGVPSRFSGSGSGTDFTLTISSLQPEDFATYYCQQANTFPPTFGQGTRLEIKRTVAAPSVFIFPPSDEQLKSGTASVVCLLNNFYPREAKVQWKVDNALQSGNSQESVTEQDSKDSTYSLSSTLTLSKADYEKHKVYACEVTHQGLSSPVTKSENRGEC |
| 42 | Heavy chain 6 amino acid sequence | QVQLVQSGAEVKKPGASVKVSCKASGYTFSNYYIHWVRQAPGQGLEWMGWINANSGGTKYAQKFQGRVTMTRDTSISTAYMELSRLRSDDTAVYYCARRHSDMIGYYYGMDVWGQGTTVTVSSASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPKSCDKTHTCPPCPAPELLGGPSVFLFPPKPKDTLMISRTPEVTCVVVDVSHEDPEVKFNWYVDGVEVHNAKTKPREEQYASTYRVVSVLTVLHQDWLNGKEYKCKVSNKALPAPIEKTISKAKGQPREPQVYTLPPSRDELTKNQVSLTCLVKGFYPSDIAVEWESNGQPENNYKTTPPVLDSDGSFFLYSKLTVDKSRWQQGNVFSCSVMHEALHNHYTQKSLSLSPG |
| 43 | HCDR1.1 | YTFSNYYIH |
| 44 | HCDR1.2 | YTFNGYYIH |
| 45 | HCDR1.3 | YTFTNYYMH |
| 46 | HCDR1.4 | YTFTGYYMH |
| 47 | HCDR2.1 | WINANSGGTK |
| 48 | HCDR2.2 | WINSNSGGTK |
| 49 | HCDR2.3 | WINVNSGVTK |
| 50 | HCDR2.4 | WINPNSGGTK |
| 52 | LCDR1.1 | RASQSIDRYLN |
| 53 | LCDR1.2 | RASQGISSWLA |
| 54 | LCDR1.3 | RASQSISLELN |
| 55 | LCDR1.4 | RASQDISVYLN |
| 56 | LCDR1.5 | RASQSIDRYLN |
| 57 | LCDR1.6 | RASQSISSYLN |
| 58 | LCDR2.1 | YAASRLQS |
| 59 | LCDR2.2 | YAASSLQS |
| 60 | LCDR2.3 | YTASSLQS |
| 61 | LCDR2.4 | YAASTLQS |
| 62 | LCDR3.1 | QQANSFPPT |
| 63 | LCDR3.2 | QQATDFPPT |
| 64 | LCDR3.3 | QQTNSFPPT |
| 65 | LCDR3.4 | QQANTEPPT |
| 66 | VHFR1 | QVQLVQSGAEVKKPGASVKVSCKASG |
| 67 | VHFR2 | WVRQAPGQGLEWMG |
| 68 | VHFR3 | RVTMTRDTSISTAYMELSRLRSDDTAVYYC |
| 69 | VHFR4 | WGQGTTVTVSS |

TABLE 4-continued

Sequence Listing

| SEQ ID NO | Description | Sequence |
|---|---|---|
| 70 | VLFR1 | DIQMTQSPSSVSASVGDRVTITC |
| 71 | VLFR2 | WYQQKPGKAPKLLIY |
| 72 | VLFR3 | GVPSRFSGSGSGTDFTLTISSLQPEDFATYYC |
| 73 | VLFR4 | FGGGTKVEIK |
| 74 | mAb1 heavy chain | QVQLVQSGAEVKKPGASVKVSCKASGYTFTGYYMHWVRQAPGQGLE WMGWINPNSGGTKYAQKFQGRVTMTRDTSISTAYMELSRLRSDDTA VYYCARRHSDMIGYYYGMDVWGQGTTVTVSSASTKGPSVFPLAPSS KSTSGGTAALGCLVKDYFPEPVTVSWNSGALTSGVHTFPAVLQSSG LYSLSSVVTVPSSSLGTQTYICNVNHKPSNTKVDKKVEPKSCDKTH TCPPCPAPELLGGPSVFLFPPKPKDTLMISRTPEVTCVVVDVSHED PEVKFNWYVDGVEVHNAKTKPREEQYASTYRVVSVLTVLHQDWLNG KEYKCKVSNKALPAPIEKTISKAKGQPREPQVYTLPPSRDELTKNQ VSLTCLVKGFYPSDIAVEWESNGQPENNYKTTPPVLDSDGSFFLYS KLTVDKSRWQQGNVFSCSVMHEALHNHYTQKSLSLSPG |
| 75 | mAb1 light chain | DIQMTQSPSSVSASVGDRVTITCRASQGISSWLAWYQQKPGKAPKL LIYAASSLQSGVPSRFSGSGSGTDFTLTISSLQPEDFATYYCQQAT DFPPTFGGGTKVEIKRTVAAPSVFIFPPSDEQLKSGTASVVCLLNN FYPREAKVQWKVDNALQSGNSQESVTEQDSKDSTYSLSSTLTLSKA DYEKHKVYACEVTHQGLSSPVTKSENRGEC |
| 76 | HCDR2.a | GWINPNSGGTKYA |
| 77 | HCDR2.1a | GWINANSGGTKYA |
| 78 | HCDR2.2a | GWINSNSGGTKYA |
| 79 | HCDR2.3a | GWINVNSGVTKYA |
| 80 | HCDR2.4a | GWINPNSGGTKYA |
| 81 | LCDR2.1a | AASRLQS |
| 82 | LCDR2.2a | AASSLQS |
| 83 | LCDR2.3a | TASSLQS |
| 84 | LCDR2.4a | AASTLQS |
| 85 | VHFR3.a | QKFQGRVTMTRDTSISTAYMELSRLRSDDTAVYYC |
| 86 | $V_{L1a}$ amino acid sequence | DIQMTQSPSSVSASVGDRVTITCRASQGISSWLAWYQQKPGKAPKL LIYAASSLQSGVPSRFSGSGSGTDFTLTISSLQPEDFATYYCQQAT DFPPTFGGGTKVEIK |
| 87 | $V_{H2}$ amino acid sequence | QVQLVQSGAEVKKPGASVKVSCKASGYTFSNYYIHWVRQAPGQGLE WMGWINANSGGTKYAQKFQGRVTMTRDTSISTAYMELSRLRSDDTA VYYCARRHSDMIGYYYGMDVWGQGTTVTVSS |
| 88 | $V_{L2}$ amino acid sequence | DIQMTQSPSSLSASVGDRVTITCRASQSIDRYLNWYQQKPGKAPKL LIYAASRLQSGVPSRESGSGSGTDFTLTISSLQPEDFATYYCQQAN SFPPTFGQGTRLEIK |
| 89 | $V_{H3}$ amino acid sequence | QVQLVQSGAEVKKPGASVKVSCKASGYTENGYYIHWVRQAPGQGLE WMGWINSNSGGTKYAQKFQGRVTMTRDTSISTAYMELSRLRSDDTA VYYCARRHSDMIGYYYGMDVWGQGTTVTVSS |
| 90 | $V_{L3}$ amino acid sequence | DIQMTQSPSSVSASVGDRVTITCRASQGISSWLAWYQQKPGKAPKL LIYAASSLQSGVPSRFSGSGSGTDFTLTISSLQPEDFATYYCQQAT DFPPTFGGGTKVEIK |
| 91 | $V_{H4}$ amino acid sequence | QVQLVQSGAEVKKPGASVKVSCKASGYTFTNYYMHWVRQAPGQGLE WMGWINVNSGVTKYAQKFQGRVTMTRDTSISTAYMELSRLRSDDTA VYYCARRHSDMIGYYYGMDVWGQGTTVTVSS |
| 92 | $V_{H5}$ amino acid sequence | QVQLVQSGAEVKKPGASVKVSCKASGYTFTGYYMHWVRQAPGQGLE WMGWINPNSGGTKYAQKFQGRVTMTRDTSISTAYMELSRLRSDDTA VYYCARRHSDMIGYYYGMDVWGQGTTVTVSS |

TABLE 4-continued

Sequence Listing

| SEQ ID NO | Description | Sequence |
|---|---|---|
| 93 | V$_{L4}$ amino acid sequence | DIQMTQSPSSLSASVGDRVTITCRASQSISLFLNWYQQKPGKAPKL LIYTASSLQSGVPSRFSGSGSGTDFTLTISSLQPEDFATYYCQQAN SFPPTFGGGTKVDIK |
| 94 | V$_{L5}$ amino acid sequence | DIQMTQSPSSLSASVGDRVTITCRASQDISVYLNWYQQKPGKAPKL LIYTASSLQSGVPSRFSGSGSGTDFTLTISSLQPEDFATYYCQQAN SFPPTFGGGTKVDIK |
| 95 | V$_{L6}$ amino acid sequence | DIQLTQSPSSLSASVGDRVTITCRASQSISSYLNWYQQKPGKVPKL LIYAASTLQSGVPSRFSGSGSGTDFTLTISSLQPEDFATYSCQQTN SFPPTFGQGTKVEIK |
| 96 | V$_{L7}$ amino acid sequence | DIQMTQSPSSLSASVGDRVTITCRASQSISSYLNWYQQKPGKAPKL LIYAASSLQSGVPSRFSGSGSGTDFTLTISSLQPEDFATYYCQQAN TFPPTFGQGTRLEIK |
| 97 | V$_{H6}$ amino acid sequence | QVQLVQSGAEVKKPGASVKVSCKASGYTFSNYYIHWVRQAPGQGLE WMGWINANSGGTKYAQKFQGRVTMTRDISISTAYMELSRLRSDDTA VYYCARRHSDMIGYYYGMDVWGQGTTVTVSS |
| 98 | VHFR2.a | WVRQAPGQGLEWM |

The invention claimed is:
1. An isolated antibody that specifically binds human CD277, or an antigen-binding portion thereof, wherein the antibody or antigen binding portion thereof comprises heavy and light chain CDRs selected from the group consisting of:
 (a) heavy chain CDR1, CDR2 and CDR3 sequences set forth in SEQ ID NOs: 7-9, respectively, and light chain CDR1, CDR2 and CDR3 sequences set forth in SEQ ID NOs: 10-12, respectively;
 (b) heavy chain CDR1, CDR2 and CDR3 sequences set forth in SEQ ID NOs: 43, 47 and 9, respectively, and light chain CDR1, CDR2 and CDR3 sequences set forth in SEQ ID NOs: 52, 58 and 62, respectively;
 (c) heavy chain CDR1, CDR2 and CDR3 sequences set forth in SEQ ID NOs: 45, 49 and 9, respectively, and light chain CDR1, CDR2 and CDR3 sequences set forth in SEQ ID NOs: 57, 59 and 65, respectively;
 (d) heavy chain CDR1, CDR2 and CDR3 sequences set forth in SEQ ID NOs: 44, 48 and 9 respectively, and light chain CDR1, CDR2 and CDR3 sequences set forth in SEQ ID NOs: 57, 61 and 64, respectively;
 (e) heavy chain CDR1, CDR2 and CDR3 sequences set forth in SEQ ID NOs: 46, 50 and 9, respectively, and light chain CDR1, CDR2 and CDR3 sequences set forth in SEQ ID NOs: 56, 58 and 61, respectively;
 (f) heavy chain CDR1, CDR2 and CDR3 sequences set forth in SEQ ID NOs: 46, 50 and 9, respectively, and light chain CDR1, CDR2 and CDR3 sequences set forth in SEQ ID NOs: 55, 60 and 62, respectively;
 (g) heavy chain CDR1, CDR2 and CDR3 sequences set forth in SEQ ID NOs: 46, 50 and 9, respectively, and light chain CDR1, CDR2 and CDR3 sequences set forth in SEQ ID NOs: 54, 60 and 62, respectively;

(h) heavy chain CDR1, CDR2 and CDR3 sequences set forth in SEQ ID NOs: 43, 47 and 9, respectively, and light chain CDR1, CDR2 and CDR3 sequences set forth in SEQ ID NOs: 53, 59 and 63, respectively;
(i) heavy chain CDR1, CDR2 and CDR3 sequences set forth in SEQ ID NOs: 45, 49 and 9, respectively, and light chain CDR1, CDR2 and CDR3 sequences set forth in SEQ ID NOs: 53, 59 and 63, respectively;
(j) heavy chain CDR1, CDR2 and CDR3 sequences set forth in SEQ ID NOs: 44, 48 and 9, respectively, and light chain CDR1, CDR2 and CDR3 sequences set forth in SEQ ID NOs: 53, 59 and 63, respectively; and
(k) heavy chain CDR1, CDR2 and CDR3 sequences set forth in SEQ ID NOs: 43, 47 and 9, respectively, and light chain CDR1, CDR2 and CDR3 sequences set forth in SEQ ID NOs: 52, 58 and 62, respectively.

2. The isolated antibody of claim 1, wherein the antibody or antigen-binding portion thereof comprises a heavy chain variable region amino acid sequence selected from the group consisting of SEQ ID NOs: 3, 32, 34, 36, 37, and 42, and a light chain variable region amino acid sequence selected from the group consisting of SEQ ID NOs: 4, 33, 35, 38, 39, 40 and 41.

3. The isolated antibody of claim 1, wherein the antibody or antigen-binding portion thereof comprises heavy and light chain variable region amino acid sequences selected from the group consisting of:
(a) SEQ ID NO: 3 and 4, respectively;
(b) SEQ ID NO: 42 and 41, respectively;
(c) SEQ ID NO: 36 and 41, respectively;
(d) SEQ ID NO: 34 and 40, respectively;
(e) SEQ ID NO: 37 and 33, respectively;
(f) SEQ ID NO: 37 and 39, respectively;
(g) SEQ ID NO: 37 and 38, respectively;
(h) SEQ ID NO: 32 and 35, respectively;
(i) SEQ ID NO: 36 and 35, respectively;
(j) SEQ ID NO: 34 and 35, respectively; and
(k) SEQ ID NO: 32 and 33, respectively.

4. The isolated antibody of claim 1, wherein the antibody or antigen binding portion thereof comprises heavy and light chain variable regions, wherein the heavy chain variable region comprises an amino acid sequence which is at least 90% identical to the heavy chain variable region amino acid sequence selected from the group consisting of SEQ ID NOs: 3, 32, 34, 36, 37, and 42; and wherein the light chain variable region comprises an amino acid sequence which is at least 90% identical to the light chain variable region amino acid sequence selected from the group consisting of SEQ ID NOs: 4, 33, 35, 38, 39, 40 and 41.

5. The isolated antibody of claim 1, wherein the antibody or antigen binding portion thereof comprises heavy and light chain variable regions at least 90% identical to the heavy and light chain variable region amino acid sequences selected from the group consisting of:
(a) SEQ ID NO: 3 and 4, respectively;
(b) SEQ ID NO: 42 and 41, respectively;
(c) SEQ ID NO: 36 and 41, respectively;
(d) SEQ ID NO: 34 and 40, respectively;
(e) SEQ ID NO: 37 and 33, respectively;
(f) SEQ ID NO: 37 and 39, respectively;
(g) SEQ ID NO: 37 and 38, respectively;
(h) SEQ ID NO: 32 and 35, respectively;
(i) SEQ ID NO: 36 and 35, respectively;
(j) SEQ ID NO: 34 and 35, respectively; and
(k) SEQ ID NO: 32 and 33, respectively.

6. The isolated antibody of claim 1, wherein the antibody or antigen-binding portion thereof comprises heavy and light chain CDRs, wherein
(i) heavy chain CDR1 comprises SEQ ID NO: 7;
(ii) heavy chain CDR2 comprises SEQ ID NO: 8;
(iii) heavy chain CDR3 comprises SEQ ID NO: 9;
(iv) light chain CDR1 comprises SEQ ID NO: 10;
(v) light chain CDR2 comprises SEQ ID NO: 11; and
(vi) light chain CDR3 comprises SEQ ID NO: 12.

7. The isolated antibody of claim 1, wherein the antibody or antibody binding portion thereof comprises a heavy chain variable region comprising the amino acid sequence set forth in SEQ ID NO: 3, and a light chain variable region comprising the amino acid sequence set forth in SEQ ID NO: 4 or SEQ ID NO: 86.

8. The isolated antibody of claim 1, wherein the antibody or antibody binding portion thereof comprises a heavy chain variable region comprising an amino acid sequence at least 90% identical to SEQ ID NO: 3, and a light chain variable region comprises an amino acid sequence at least 90% identical to SEQ ID NO: 4 or SEQ ID NO: 86.

9. The isolated antibody of claim 1, wherein the antibody or antibody binding portion thereof comprises a heavy chain region comprising the amino acid sequence set forth in SEQ ID NO: 74, and a light chain region comprising the amino acid sequence set forth in SEQ ID NO: 75.

10. The isolated antibody of claim 1, wherein the antibody or antibody binding portion thereof comprises a heavy chain region comprising an amino acid sequence at least 90% identical to SEQ ID NO: 74, and a light chain region comprising an amino acid sequence at least 90% identical to SEQ ID NO: 75.

11. A pharmaceutical composition comprising an isolated antibody or antigen-binding portion thereof, of claim 1, and a pharmaceutically acceptable carrier.

12. A nucleic acid comprising a nucleotide sequence encoding the light chain, heavy chain, or both light and heavy chains of the isolated antibody, or antigen binding portion thereof, of claim 1.

* * * * *